United States Patent
Fujisaki

(10) Patent No.: US 8,543,157 B1
(45) Date of Patent: Sep. 24, 2013

(54) COMMUNICATION DEVICE WHICH NOTIFIES ITS PIN-POINT LOCATION OR GEOGRAPHIC AREA IN ACCORDANCE WITH USER SELECTION

(76) Inventor: Iwao Fujisaki, Tokyo (JP)

( * ) Notice: Subject to any disclaimer, the term of this patent is extended or adjusted under 35 U.S.C. 154(b) by 612 days.

(21) Appl. No.: 12/117,949

(22) Filed: May 9, 2008

(51) Int. Cl.
*H04M 1/00* (2006.01)

(52) U.S. Cl.
USPC .......... 455/550.1; 455/404.2; 455/412.1; 455/412.2; 455/457; 455/456.1; 379/32.05; 379/201.11; 379/207.12; 379/142.1; 379/201.07

(58) Field of Classification Search
USPC .......... 455/404.2, 412.1–412.2, 413, 414.1, 455/415, 456.1–456.3, 457; 379/32.05, 88.19, 379/88.21, 142.1, 201.07, 201.08, 201.11, 379/207.12
See application file for complete search history.

(56) References Cited

U.S. PATENT DOCUMENTS

| | | | |
|---|---|---|---|
| 4,934,773 A | 6/1990 | Becker | |
| 4,937,570 A | 6/1990 | Matsukawa et al. | |
| 5,113,427 A | 5/1992 | Ryoichi et al. | |
| 5,272,638 A | 12/1993 | Martin et al. | |
| 5,345,272 A | 9/1994 | Ersoz et al. | |
| 5,353,376 A | 10/1994 | Oh et al. | |
| 5,388,147 A | 2/1995 | Grimes | |
| 5,404,579 A | 4/1995 | Obayashi et al. | |
| 5,405,152 A | 4/1995 | Katanics et al. | |
| 5,414,461 A | 5/1995 | Kishi et al. | |
| 5,418,837 A | 5/1995 | Johansson et al. | |
| 5,438,357 A | 8/1995 | McNelley | |
| 5,442,453 A | 8/1995 | Takagi et al. | |
| 5,446,904 A | 8/1995 | Belt et al. | |
| 5,479,476 A | 12/1995 | Finke-Anlauff | |
| 5,530,472 A | 6/1996 | Bregman et al. | |
| 5,532,741 A | 7/1996 | Tsutsumi | |
| 5,542,557 A | 8/1996 | Koyama et al. | |
| 5,543,789 A | 8/1996 | Behr et al. | |
| 5,550,754 A | 8/1996 | McNelley et al. | |
| 5,559,554 A | 9/1996 | Uekane et al. | |
| 5,625,675 A | 4/1997 | Katsumaru et al. | |
| 5,629,741 A | 5/1997 | Hopper | |
| 5,648,768 A | 7/1997 | Bouve | |
| 5,675,630 A | 10/1997 | Beatty | |
| 5,687,331 A | 11/1997 | Volk et al. | |
| 5,732,383 A | 3/1998 | Foladare et al. | |
| 5,758,280 A | 5/1998 | Kimura | |
| 5,772,586 A | 6/1998 | Heinonen et al. | |
| 5,778,304 A | 7/1998 | Grube et al. | |
| 5,786,846 A | 7/1998 | Hiroaki | |

(Continued)

FOREIGN PATENT DOCUMENTS

| | | | |
|---|---|---|---|
| JP | H11/195137 A1 | 7/1999 | |
| JP | 2005/216149 A1 | 8/2005 | |
| WO | WO03001457 A1 | 1/2003 | |

OTHER PUBLICATIONS

Hi Corporation's company history (http://www.hicorp.co.jp/english/corporate/history.html).

(Continued)

*Primary Examiner* — Wayne Cai

(57) ABSTRACT

The communication device comprising a pin-point location notifying implementer, a geographic area notifying implementer, a location dependent program activating implementer, a multiple answering machine implementer, a time dependent answering machine implementer, an audiovisual storage implementer, a street address icon displaying implementer, and an audiovisual multiple recording/replaying implementer.

3 Claims, 1 Drawing Sheet

(56) References Cited

U.S. PATENT DOCUMENTS

| | | |
|---|---|---|
| 5,802,460 A | 9/1998 | Parvulescu et al. |
| 5,805,672 A | 9/1998 | Barkat et al. |
| 5,812,930 A | 9/1998 | Zavrel |
| 5,825,408 A | 10/1998 | Yuyama et al. |
| 5,844,824 A | 12/1998 | Newman et al. |
| 5,902,349 A | 5/1999 | Endo et al. |
| 5,903,706 A | 5/1999 | Wakabayashi et al. |
| 5,916,024 A | 6/1999 | Von Kohorn |
| 5,918,180 A | 6/1999 | Dimino |
| 5,924,040 A | 7/1999 | Trompower |
| 5,959,661 A | 9/1999 | Isono |
| 6,009,336 A | 12/1999 | Harris et al. |
| 6,011,973 A | 1/2000 | Valentine et al. |
| 6,034,715 A | 3/2000 | Ishida et al. |
| 6,043,752 A | 3/2000 | Hisada et al. |
| 6,069,648 A | 5/2000 | Suso et al. |
| 6,073,034 A | 6/2000 | Jacobsen et al. |
| 6,081,265 A | 6/2000 | Nakayama et al. |
| 6,085,112 A | 7/2000 | Kleinschmidt et al. |
| 6,094,237 A | 7/2000 | Hashimoto |
| 6,115,597 A | 9/2000 | Kroll et al. |
| 6,128,594 A | 10/2000 | Gulli et al. |
| 6,144,848 A | 11/2000 | Walsh et al. |
| 6,148,212 A | 11/2000 | Park et al. |
| 6,161,134 A | 12/2000 | Wang et al. |
| 6,167,283 A | 12/2000 | Korpela et al. |
| 6,192,343 B1 | 2/2001 | Morgan et al. |
| 6,195,089 B1 | 2/2001 | Chaney et al. |
| 6,198,942 B1 | 3/2001 | Hayashi et al. |
| 6,202,060 B1 | 3/2001 | Tran |
| 6,216,013 B1 | 4/2001 | Moore et al. |
| 6,216,158 B1 | 4/2001 | Luo et al. |
| 6,222,482 B1 | 4/2001 | Gueziec |
| 6,223,029 B1 | 4/2001 | Stenman et al. |
| 6,225,944 B1 | 5/2001 | Hayes |
| 6,236,832 B1 | 5/2001 | Ito |
| 6,243,039 B1 | 6/2001 | Elliot |
| 6,249,720 B1 | 6/2001 | Kubota et al. |
| 6,253,075 B1 | 6/2001 | Beghtol et al. |
| 6,265,988 B1 | 7/2001 | LeMense et al. |
| 6,285,317 B1 | 9/2001 | Ong |
| 6,285,757 B1 | 9/2001 | Carroll et al. |
| 6,292,666 B1 | 9/2001 | Siddiqui et al. |
| 6,292,747 B1 | 9/2001 | Amro et al. |
| 6,311,011 B1 | 10/2001 | Kuroda |
| 6,311,077 B1 | 10/2001 | Bien |
| 6,332,122 B1 | 12/2001 | Ortega et al. |
| 6,333,684 B1 | 12/2001 | Kang |
| 6,363,320 B1 | 3/2002 | Chou |
| 6,366,651 B1 | 4/2002 | Griffith et al. |
| 6,366,782 B1 | 4/2002 | Fumarolo et al. |
| 6,374,221 B1 | 4/2002 | Haimi-Cohen |
| 6,385,465 B1 | 5/2002 | Yoshioka |
| 6,385,466 B1 | 5/2002 | Hirai et al. |
| 6,385,541 B1 | 5/2002 | Blumberg et al. |
| 6,385,654 B1 | 5/2002 | Tanaka |
| 6,405,033 B1 | 6/2002 | Kennedy, III et al. |
| 6,411,198 B1 | 6/2002 | Hirai et al. |
| 6,411,822 B1 | 6/2002 | Kraft |
| 6,415,138 B2 | 7/2002 | Sirola et al. |
| 6,421,470 B1 | 7/2002 | Nozaki et al. |
| 6,421,602 B1 | 7/2002 | Bullock et al. |
| 6,430,498 B1 | 8/2002 | Maruyama et al. |
| 6,438,380 B1 | 8/2002 | Bi et al. |
| 6,442,404 B1 | 8/2002 | Sakajiri |
| 6,445,802 B1 | 9/2002 | Dan |
| 6,477,387 B1 | 11/2002 | Jackson et al. |
| 6,486,867 B1 | 11/2002 | Kopp et al. |
| 6,487,422 B1 | 11/2002 | Lee |
| 6,507,643 B1 | 1/2003 | Groner |
| 6,510,325 B1 | 1/2003 | Mack, II et al. |
| 6,512,919 B2 | 1/2003 | Ogasawara |
| 6,518,956 B1 | 2/2003 | Sato |
| 6,519,566 B1 | 2/2003 | Boyer et al. |
| 6,526,293 B1 | 2/2003 | Matsuo |
| 6,528,533 B2 | 3/2003 | Lauffer |
| 6,529,742 B1 | 3/2003 | Yang |
| 6,532,035 B1 | 3/2003 | Saari et al. |
| 6,538,558 B2 | 3/2003 | Sakazume et al. |
| 6,542,750 B2 | 4/2003 | Hendrey et al. |
| 6,542,814 B2 | 4/2003 | Polidi et al. |
| 6,549,215 B2 | 4/2003 | Jouppi |
| 6,553,309 B2 | 4/2003 | Uchida et al. |
| 6,553,310 B1 | 4/2003 | Lopke |
| 6,567,745 B2 | 5/2003 | Fuchs et al. |
| 6,567,984 B1 | 5/2003 | Allport |
| 6,600,975 B2 | 7/2003 | Moriguchi et al. |
| 6,606,504 B1 | 8/2003 | Mooney et al. |
| 6,611,753 B1 | 8/2003 | Millington |
| 6,615,186 B1 | 9/2003 | Kolls |
| 6,618,704 B2 | 9/2003 | Kanevsky et al. |
| 6,622,018 B1 | 9/2003 | Erekson |
| 6,630,958 B2 | 10/2003 | Tanaka et al. |
| 6,631,271 B1 | 10/2003 | Logan |
| 6,647,251 B1 | 11/2003 | Siegle et al. |
| 6,650,877 B1 | 11/2003 | Tarbouriech et al. |
| 6,650,894 B1 | 11/2003 | Berstis et al. |
| 6,658,272 B1 | 12/2003 | Lenchik et al. |
| 6,658,461 B1 | 12/2003 | Mazo |
| 6,662,023 B1 | 12/2003 | Helle |
| 6,665,711 B1 | 12/2003 | Boyle et al. |
| 6,668,177 B2 | 12/2003 | Salmimaa et al. |
| 6,681,120 B1 | 1/2004 | Kim |
| 6,687,515 B1 | 2/2004 | Kosaka |
| 6,690,932 B1 | 2/2004 | Barnier et al. |
| 6,694,143 B1 | 2/2004 | Beamish et al. |
| 6,701,148 B1 | 3/2004 | Wilson et al. |
| 6,701,162 B1 | 3/2004 | Everett |
| 6,707,942 B1 | 3/2004 | Cortopassi et al. |
| 6,711,399 B1 | 3/2004 | Granier |
| 6,725,022 B1 | 4/2004 | Clayton et al. |
| 6,728,531 B1 | 4/2004 | Lee et al. |
| 6,728,533 B2 | 4/2004 | Ishii |
| 6,738,643 B1 | 5/2004 | Harris |
| 6,738,711 B2 | 5/2004 | Ohmura et al. |
| 6,763,226 B1 | 7/2004 | McZeal, Jr. |
| 6,772,174 B1 | 8/2004 | Pettersson |
| 6,775,361 B1 | 8/2004 | Arai et al. |
| 6,779,030 B1 | 8/2004 | Dugan et al. |
| 6,782,412 B2 | 8/2004 | Brophy et al. |
| 6,788,928 B2 | 9/2004 | Kohinata et al. |
| 6,795,715 B1 | 9/2004 | Kubo et al. |
| 6,812,954 B1 | 11/2004 | Priestman et al. |
| 6,813,501 B2 | 11/2004 | Kinnunen et al. |
| 6,819,939 B2 | 11/2004 | Masamura |
| 6,820,055 B2 | 11/2004 | Saindon et al. |
| 6,836,654 B2 | 12/2004 | Decotignie |
| 6,850,209 B2 | 2/2005 | Mankins et al. |
| 6,865,372 B2 | 3/2005 | Mauney et al. |
| 6,870,828 B1 | 3/2005 | Giordano, III |
| 6,876,379 B1 | 4/2005 | Fisher |
| 6,883,000 B1 | 4/2005 | Gropper |
| 6,888,927 B1 | 5/2005 | Cruickshank et al. |
| 6,891,525 B2 | 5/2005 | Ogoro |
| 6,895,084 B1 | 5/2005 | Saylor et al. |
| 6,895,256 B2 | 5/2005 | Harma et al. |
| 6,895,259 B1 | 5/2005 | Blank nee Keller et al. |
| 6,898,321 B1 | 5/2005 | Knee et al. |
| 6,898,765 B2 | 5/2005 | Matthews, III et al. |
| 6,901,383 B1 | 5/2005 | Ricketts et al. |
| 6,904,298 B2 | 6/2005 | Arai et al. |
| 6,912,544 B1 | 6/2005 | Weiner |
| 6,922,212 B2 | 7/2005 | Nakakubo et al. |
| 6,922,630 B2 | 7/2005 | Maruyama et al. |
| 6,937,868 B2 | 8/2005 | Himmel et al. |
| 6,947,728 B2 | 9/2005 | Tagawa et al. |
| 6,954,645 B2 | 10/2005 | Tsai et al. |
| 6,958,675 B2 | 10/2005 | Maeda et al. |
| 6,961,559 B1 | 11/2005 | Chow et al. |
| 6,968,184 B2 | 11/2005 | Criss et al. |
| 6,968,206 B1 | 11/2005 | Whitsey-Anderson |
| 6,970,178 B2 | 11/2005 | Tanioka et al. |
| 6,970,703 B2 | 11/2005 | Fuchs et al. |
| 6,973,628 B2 | 12/2005 | Asami |

| | | | | | |
|---|---|---|---|---|---|
| 6,992,699 B1 | 1/2006 | Vance et al. | 8,145,040 B2 | 3/2012 | Toyoshima |
| 6,999,757 B2 | 2/2006 | Bates et al. | 8,208,954 B1 | 6/2012 | Fujisaki |
| 6,999,802 B2 | 2/2006 | Kim | 2001/0000249 A1 | 4/2001 | Oba et al. |
| 7,003,598 B2 | 2/2006 | Kavanagh | 2001/0005826 A1 | 6/2001 | Shibuya |
| 7,007,239 B1 | 2/2006 | Hawkins et al. | 2001/0011293 A1 | 8/2001 | Murakami et al. |
| 7,012,999 B2 | 3/2006 | Ruckart | 2001/0029425 A1 | 10/2001 | Myr |
| 7,019,770 B1 | 3/2006 | Katz | 2001/0035829 A1 | 11/2001 | Yu et al. |
| 7,028,077 B2 | 4/2006 | Toshimitsu et al. | 2001/0037191 A1 | 11/2001 | Furuta et al. |
| 7,030,880 B2 | 4/2006 | Tanioka et al. | 2001/0041590 A1 | 11/2001 | Silberfenig et al. |
| 7,035,666 B2 | 4/2006 | Silberfenig et al. | 2001/0048364 A1 | 12/2001 | Kalthoff et al. |
| 7,058,356 B2 | 6/2006 | Slotznick | 2001/0049470 A1 | 12/2001 | Mault et al. |
| 7,076,052 B2 | 7/2006 | Yoshimura | 2002/0002044 A1 | 1/2002 | Naruse et al. |
| 7,081,832 B2 | 7/2006 | Nelson et al. | 2002/0002705 A1 | 1/2002 | Byrnes et al. |
| 7,085,578 B2 | 8/2006 | Barclay et al. | 2002/0004701 A1 | 1/2002 | Nakano |
| 7,085,739 B1 | 8/2006 | Winter et al. | 2002/0006804 A1 | 1/2002 | Mukai et al. |
| 7,089,298 B2 | 8/2006 | Nyman et al. | 2002/0009978 A1 | 1/2002 | Dukach et al. |
| 7,106,846 B2 | 9/2006 | Nguyen et al. | 2002/0016724 A1 | 2/2002 | Yang et al. |
| 7,107,081 B1 | 9/2006 | Fujisaki | 2002/0019225 A1 | 2/2002 | Miyashita |
| 7,113,981 B2 | 9/2006 | Slate | 2002/0026348 A1 | 2/2002 | Fowler et al. |
| 7,117,152 B1 | 10/2006 | Mukherji et al. | 2002/0028690 A1 | 3/2002 | McKenna et al. |
| 7,117,504 B2 | 10/2006 | Smith et al. | 2002/0031120 A1 | 3/2002 | Rakib |
| 7,126,951 B2 | 10/2006 | Belcea et al. | 2002/0034292 A1 | 3/2002 | Tuoriniemi |
| 7,127,238 B2 | 10/2006 | Vandermeijden et al. | 2002/0036231 A1 | 3/2002 | Monaghan et al. |
| 7,127,271 B1 | 10/2006 | Fujisaki | 2002/0036642 A1 | 3/2002 | Kwon et al. |
| 7,130,630 B1 | 10/2006 | Enzmann et al. | 2002/0037738 A1 | 3/2002 | Wycherley et al. |
| 7,139,555 B2 | 11/2006 | Apfel | 2002/0038219 A1 | 3/2002 | Yanay et al. |
| 7,142,810 B2 | 11/2006 | Oesterling | 2002/0039914 A1 | 4/2002 | Hama et al. |
| 7,142,890 B2 | 11/2006 | Irimajiri et al. | 2002/0041262 A1 | 4/2002 | Mukai et al. |
| 7,146,179 B2 | 12/2006 | Parulski et al. | 2002/0047787 A1 | 4/2002 | Mikkola et al. |
| 7,190,880 B2 | 3/2007 | Cookson et al. | 2002/0049630 A1 | 4/2002 | Furuta et al. |
| 7,218,916 B2 | 5/2007 | Nonami | 2002/0049742 A1 | 4/2002 | Chan et al. |
| 7,224,792 B2 | 5/2007 | Fusco | 2002/0052754 A1 | 5/2002 | Joyce et al. |
| 7,224,851 B2 | 5/2007 | Kinjo | 2002/0054068 A1 | 5/2002 | Ellis et al. |
| 7,224,987 B1 | 5/2007 | Bhela et al. | 2002/0055350 A1 | 5/2002 | Gupte et al. |
| 7,231,231 B2 | 6/2007 | Kokko et al. | 2002/0055872 A1 | 5/2002 | LaBrie et al. |
| 7,233,781 B2 | 6/2007 | Hunter et al. | 2002/0058497 A1 | 5/2002 | Jeong |
| 7,233,795 B1 | 6/2007 | Ryden | 2002/0058531 A1 | 5/2002 | Terasaki et al. |
| 7,239,742 B2 | 7/2007 | Ohtani et al. | 2002/0061767 A1 | 5/2002 | Sladen et al. |
| 7,245,293 B2 | 7/2007 | Hoshino et al. | 2002/0065037 A1 | 5/2002 | Messina et al. |
| 7,251,255 B1 | 7/2007 | Young | 2002/0065604 A1 | 5/2002 | Sekiyama |
| 7,254,408 B2 | 8/2007 | Kim | 2002/0066115 A1 | 5/2002 | Wendelrup |
| 7,260,416 B2 | 8/2007 | Shippee | 2002/0068558 A1 | 6/2002 | Janik |
| 7,266,186 B1 | 9/2007 | Henderson | 2002/0068585 A1 | 6/2002 | Chan et al. |
| 7,274,952 B2 | 9/2007 | Hayashi | 2002/0068599 A1 | 6/2002 | Rodriguez et al. |
| 7,277,711 B2 | 10/2007 | Nyu | 2002/0072395 A1 | 6/2002 | Miramontes |
| 7,321,783 B2 | 1/2008 | Kim et al. | 2002/0077808 A1 | 6/2002 | Liu et al. |
| 7,346,373 B2 | 3/2008 | Kim | 2002/0080163 A1 | 6/2002 | Morey |
| 7,372,447 B1 | 5/2008 | Jacobsen et al. | 2002/0082059 A1 | 6/2002 | Nariai et al. |
| 7,383,067 B2 | 6/2008 | Phillips et al. | 2002/0085700 A1 | 7/2002 | Metcalf |
| 7,426,264 B1 | 9/2008 | Henderson | 2002/0094806 A1 | 7/2002 | Kamimura |
| 7,433,845 B1 | 10/2008 | Flitcroft et al. | 2002/0097984 A1 | 7/2002 | Abecassis |
| 7,444,168 B2 | 10/2008 | Nakagawa et al. | 2002/0098857 A1 | 7/2002 | Ishii |
| 7,450,709 B2 | 11/2008 | Gonzalez et al. | 2002/0102960 A1 | 8/2002 | Lechner |
| 7,451,084 B2 | 11/2008 | Funakura | 2002/0103872 A1 | 8/2002 | Watanabe |
| 7,489,768 B1 | 2/2009 | Strietzel | 2002/0104095 A1 | 8/2002 | Nguyen et al. |
| 7,532,879 B1 | 5/2009 | Fujisaki | 2002/0110246 A1 | 8/2002 | Gosior et al. |
| 7,551,899 B1 | 6/2009 | Nicolas et al. | 2002/0115469 A1 | 8/2002 | Rekimoto et al. |
| 7,593,712 B2 | 9/2009 | Moton, Jr. et al. | 2002/0120589 A1 | 8/2002 | Aoki |
| 7,642,929 B1 | 1/2010 | Pinkus et al. | 2002/0120718 A1 | 8/2002 | Lee |
| 7,643,037 B1 | 1/2010 | Langmacher et al. | 2002/0123336 A1 | 9/2002 | Kamada |
| 7,657,252 B2 | 2/2010 | Futami | 2002/0127997 A1 | 9/2002 | Karlstedt et al. |
| 7,707,592 B2 | 4/2010 | Wesslen et al. | 2002/0128000 A1 | 9/2002 | do Nascimento |
| 7,707,602 B2 | 4/2010 | Cragun et al. | 2002/0133342 A1 | 9/2002 | McKenna |
| 7,725,077 B2 | 5/2010 | Jung et al. | 2002/0137470 A1 | 9/2002 | Baron et al. |
| 7,769,364 B2 | 8/2010 | Logan et al. | 2002/0137503 A1 | 9/2002 | Roderique |
| 7,787,857 B2 | 8/2010 | Peterman | 2002/0137526 A1 | 9/2002 | Shinohara |
| 7,787,887 B2 | 8/2010 | Gupta et al. | 2002/0141086 A1 | 10/2002 | Lang et al. |
| 7,853,295 B1 | 12/2010 | Fujisaki | 2002/0142763 A1 | 10/2002 | Kolsky |
| 7,853,297 B1 | 12/2010 | Fujisaki | 2002/0147645 A1 | 10/2002 | Alao et al. |
| 7,865,567 B1 | 1/2011 | Hendricks et al. | 2002/0151326 A1 | 10/2002 | Awada et al. |
| 7,873,349 B1 | 1/2011 | Smith et al. | 2002/0151327 A1 | 10/2002 | Levitt |
| 7,890,089 B1 | 2/2011 | Fujisaki | 2002/0154632 A1 | 10/2002 | Wang et al. |
| 7,899,410 B2 | 3/2011 | Rakshani et al. | 2002/0157101 A1 | 10/2002 | Schrader et al. |
| 7,922,086 B2 | 4/2011 | Jung et al. | 2002/0164975 A1 | 11/2002 | Lu |
| 7,941,141 B2 | 5/2011 | Shoykhet et al. | 2002/0164996 A1 | 11/2002 | Dorenbosch |
| 7,953,439 B2 | 5/2011 | Rofougaran | 2002/0165850 A1 | 11/2002 | Roberts et al. |
| 7,970,414 B1 | 6/2011 | Werden et al. | 2002/0168959 A1 | 11/2002 | Noguchi et al. |
| 8,099,108 B2 | 1/2012 | Camp et al. | 2002/0173344 A1 | 11/2002 | Cupps et al. |
| 8,126,400 B2 | 2/2012 | Jung et al. | 2002/0177407 A1 | 11/2002 | Mitsumoto |

| Pub. No. | Date | Inventor |
|---|---|---|
| 2002/0178009 A1 | 11/2002 | Firman |
| 2002/0178225 A1 | 11/2002 | Madenberg et al. |
| 2002/0183045 A1 | 12/2002 | Emmerson et al. |
| 2002/0183098 A1 | 12/2002 | Lee et al. |
| 2002/0191951 A1 | 12/2002 | Sodeyama et al. |
| 2002/0196378 A1 | 12/2002 | Slobodin et al. |
| 2002/0198813 A1 | 12/2002 | Patterson et al. |
| 2002/0198936 A1 | 12/2002 | McIntyre et al. |
| 2003/0003967 A1 | 1/2003 | Ito |
| 2003/0005056 A1 | 1/2003 | Yamamoto et al. |
| 2003/0006879 A1 | 1/2003 | Kang et al. |
| 2003/0007556 A1 | 1/2003 | Oura et al. |
| 2003/0013483 A1 | 1/2003 | Ausems et al. |
| 2003/0014286 A1 | 1/2003 | Cappellini |
| 2003/0016189 A1 | 1/2003 | Abe et al. |
| 2003/0017857 A1 | 1/2003 | Kitson et al. |
| 2003/0018744 A1 | 1/2003 | Johanson et al. |
| 2003/0018748 A1 | 1/2003 | McKenna, Jr. |
| 2003/0032389 A1 | 2/2003 | Kim et al. |
| 2003/0032406 A1 | 2/2003 | Minear et al. |
| 2003/0033214 A1 | 2/2003 | Mikkelsen et al. |
| 2003/0037265 A1 | 2/2003 | Sameshima et al. |
| 2003/0038800 A1 | 2/2003 | Kawahara |
| 2003/0038893 A1 | 2/2003 | Rajamaki et al. |
| 2003/0045301 A1 | 3/2003 | Wollrab |
| 2003/0045311 A1 | 3/2003 | Larikka et al. |
| 2003/0045329 A1 | 3/2003 | Kinoshita |
| 2003/0045996 A1 | 3/2003 | Yamazaki et al. |
| 2003/0050776 A1 | 3/2003 | Blair |
| 2003/0052964 A1 | 3/2003 | Priestman et al. |
| 2003/0054830 A1 | 3/2003 | Williams et al. |
| 2003/0055994 A1 | 3/2003 | Herrmann et al. |
| 2003/0061606 A1 | 3/2003 | Hartwig et al. |
| 2003/0063580 A1 | 4/2003 | Pond |
| 2003/0063732 A1 | 4/2003 | Mcknight |
| 2003/0065784 A1 | 4/2003 | Herrod |
| 2003/0065805 A1 | 4/2003 | Barnes, Jr. |
| 2003/0069693 A1 | 4/2003 | Snapp et al. |
| 2003/0070162 A1 | 4/2003 | Oshima et al. |
| 2003/0073432 A1 | 4/2003 | Meade, II |
| 2003/0083055 A1 | 5/2003 | Riordan et al. |
| 2003/0083873 A1 | 5/2003 | Ross et al. |
| 2003/0084104 A1 | 5/2003 | Salem et al. |
| 2003/0084121 A1 | 5/2003 | De Boor et al. |
| 2003/0093503 A1 | 5/2003 | Yamaki et al. |
| 2003/0093790 A1 | 5/2003 | Logan et al. |
| 2003/0099367 A1 | 5/2003 | Okamura |
| 2003/0100326 A1 | 5/2003 | Grube et al. |
| 2003/0107580 A1 | 6/2003 | Egawa et al. |
| 2003/0109251 A1 | 6/2003 | Fujito et al. |
| 2003/0110450 A1 | 6/2003 | Sakai |
| 2003/0114191 A1 | 6/2003 | Nishimura |
| 2003/0115240 A1 | 6/2003 | Cho |
| 2003/0117316 A1 | 6/2003 | Tischer |
| 2003/0117376 A1 | 6/2003 | Ghulam |
| 2003/0119479 A1 | 6/2003 | Arima et al. |
| 2003/0119485 A1 | 6/2003 | Ogasawara |
| 2003/0119562 A1 | 6/2003 | Kokubo |
| 2003/0120784 A1 | 6/2003 | Johnson et al. |
| 2003/0122779 A1 | 7/2003 | Martin et al. |
| 2003/0125008 A1 | 7/2003 | Shimamura |
| 2003/0132928 A1 | 7/2003 | Kori |
| 2003/0135563 A1 | 7/2003 | Bodin et al. |
| 2003/0137970 A1 | 7/2003 | Odman |
| 2003/0142957 A1 | 7/2003 | Young et al. |
| 2003/0144024 A1 | 7/2003 | Luo |
| 2003/0148772 A1 | 8/2003 | Ben-Ari |
| 2003/0149662 A1 | 8/2003 | Shore |
| 2003/0153310 A1 | 8/2003 | Ishii |
| 2003/0153355 A1 | 8/2003 | Warren |
| 2003/0153364 A1 | 8/2003 | Osann, Jr. |
| 2003/0155413 A1 | 8/2003 | Kovesdi et al. |
| 2003/0156208 A1 | 8/2003 | Obradovich |
| 2003/0157929 A1 | 8/2003 | Janssen et al. |
| 2003/0166399 A1 | 9/2003 | Tokkonen et al. |
| 2003/0169329 A1 | 9/2003 | Parker et al. |
| 2003/0171113 A1 | 9/2003 | Choi |
| 2003/0174685 A1 | 9/2003 | Hasebe |
| 2003/0181201 A1 | 9/2003 | Bomze et al. |
| 2003/0201982 A1 | 10/2003 | Iesaka |
| 2003/0204562 A1 | 10/2003 | Hwang |
| 2003/0208541 A1 | 11/2003 | Musa |
| 2003/0220835 A1 | 11/2003 | Barnes, Jr. |
| 2003/0222762 A1 | 12/2003 | Beigl et al. |
| 2003/0222982 A1 | 12/2003 | Hamdan et al. |
| 2003/0223554 A1 | 12/2003 | Zhang |
| 2003/0224760 A1 | 12/2003 | Day |
| 2003/0227570 A1 | 12/2003 | Kim et al. |
| 2003/0229900 A1 | 12/2003 | Reisman |
| 2003/0236709 A1 | 12/2003 | Hendra et al. |
| 2003/0236866 A1 | 12/2003 | Light |
| 2004/0003307 A1 | 1/2004 | Tsuji |
| 2004/0027369 A1 | 2/2004 | Kellock et al. |
| 2004/0029640 A1 | 2/2004 | Masuyama et al. |
| 2004/0033795 A1 | 2/2004 | Walsh et al. |
| 2004/0034692 A1 | 2/2004 | Eguchi et al. |
| 2004/0052504 A1 | 3/2004 | Yamada et al. |
| 2004/0060061 A1 | 3/2004 | Parker |
| 2004/0068399 A1 | 4/2004 | Ding |
| 2004/0072595 A1 | 4/2004 | Anson et al. |
| 2004/0082321 A1 | 4/2004 | Kontianinen |
| 2004/0087326 A1 | 5/2004 | Dunko et al. |
| 2004/0092255 A1 | 5/2004 | Ji et al. |
| 2004/0103303 A1 | 5/2004 | Yamauchi et al. |
| 2004/0107072 A1 | 6/2004 | Dietrich et al. |
| 2004/0114732 A1 | 6/2004 | Choe et al. |
| 2004/0117108 A1 | 6/2004 | Nemeth |
| 2004/0128359 A1 | 7/2004 | Horvitz et al. |
| 2004/0132445 A1 | 7/2004 | Rogalski et al. |
| 2004/0137893 A1 | 7/2004 | Muthuswamy et al. |
| 2004/0137983 A1 | 7/2004 | Kerr et al. |
| 2004/0139208 A1 | 7/2004 | Tuli |
| 2004/0142678 A1 | 7/2004 | Krasner |
| 2004/0150725 A1 | 8/2004 | Taguchi |
| 2004/0157664 A1 | 8/2004 | Link |
| 2004/0166832 A1 | 8/2004 | Portman et al. |
| 2004/0166879 A1 | 8/2004 | Meadows et al. |
| 2004/0174863 A1 | 9/2004 | Caspi et al. |
| 2004/0183937 A1 | 9/2004 | Viinikanoja et al. |
| 2004/0185865 A1 | 9/2004 | Maanoja |
| 2004/0189827 A1 | 9/2004 | Kim et al. |
| 2004/0198374 A1 | 10/2004 | Bajikar |
| 2004/0203490 A1 | 10/2004 | Kaplan |
| 2004/0203520 A1 | 10/2004 | Schirtzinger et al. |
| 2004/0203577 A1 | 10/2004 | Forman et al. |
| 2004/0203904 A1 | 10/2004 | Gwon et al. |
| 2004/0203909 A1 | 10/2004 | Koster |
| 2004/0204018 A1 | 10/2004 | Kuo |
| 2004/0204035 A1 | 10/2004 | Raghuram et al. |
| 2004/0204126 A1 | 10/2004 | Reyes et al. |
| 2004/0204821 A1 | 10/2004 | Tu |
| 2004/0204848 A1 | 10/2004 | Matsuo et al. |
| 2004/0209649 A1 | 10/2004 | Lord |
| 2004/0216037 A1 | 10/2004 | Hishida et al. |
| 2004/0218738 A1 | 11/2004 | Arai et al. |
| 2004/0219951 A1 | 11/2004 | Holder |
| 2004/0222988 A1 | 11/2004 | Donnelly |
| 2004/0235513 A1 | 11/2004 | O'Connell |
| 2004/0235520 A1 | 11/2004 | Cadiz et al. |
| 2004/0242240 A1 | 12/2004 | Lin |
| 2004/0242269 A1 | 12/2004 | Fadell |
| 2004/0248586 A1 | 12/2004 | Patel et al. |
| 2004/0252197 A1 | 12/2004 | Fraley et al. |
| 2004/0257208 A1 | 12/2004 | Huang et al. |
| 2004/0266418 A1 | 12/2004 | Kotzin |
| 2004/0267628 A1 | 12/2004 | Stillman |
| 2005/0004749 A1 | 1/2005 | Park |
| 2005/0020301 A1 | 1/2005 | Lee |
| 2005/0026629 A1 | 2/2005 | Contractor |
| 2005/0036509 A1 | 2/2005 | Acharya et al. |
| 2005/0046584 A1 | 3/2005 | Breed |
| 2005/0048987 A1 | 3/2005 | Glass |
| 2005/0070257 A1 | 3/2005 | Saarinen et al. |
| 2005/0075097 A1 | 4/2005 | Lehikoinen et al. |
| 2005/0090768 A1 | 4/2005 | Brattesani et al. |
| 2005/0097038 A1 | 5/2005 | Yu et al. |
| 2005/0107119 A1 | 5/2005 | Lee et al. |
| 2005/0113080 A1 | 5/2005 | Nishimura |

| | | |
|---|---|---|
| 2005/0113113 A1 | 5/2005 | Reed |
| 2005/0120225 A1 | 6/2005 | Kirsch et al. |
| 2005/0136949 A1 | 6/2005 | Barnes et al. |
| 2005/0144560 A1 | 6/2005 | Gruen et al. |
| 2005/0151877 A1 | 7/2005 | Fisher |
| 2005/0153681 A1 | 7/2005 | Hanson |
| 2005/0153745 A1 | 7/2005 | Smethers |
| 2005/0159189 A1 | 7/2005 | Iyer |
| 2005/0163289 A1 | 7/2005 | Caspi et al. |
| 2005/0164684 A1 | 7/2005 | Chen et al. |
| 2005/0165871 A1 | 7/2005 | Barrs et al. |
| 2005/0166242 A1 | 7/2005 | Matsumoto et al. |
| 2005/0186954 A1 | 8/2005 | Kenney |
| 2005/0191969 A1 | 9/2005 | Mousseau |
| 2005/0192030 A1 | 9/2005 | Asthana et al. |
| 2005/0235312 A1 | 10/2005 | Karaoguz et al. |
| 2005/0257149 A1 | 11/2005 | Kamiya et al. |
| 2005/0261945 A1 | 11/2005 | Mougin et al. |
| 2005/0272504 A1 | 12/2005 | Eguchi et al. |
| 2005/0282582 A1 | 12/2005 | Slotznick et al. |
| 2006/0003813 A1 | 1/2006 | Seligmann et al. |
| 2006/0015819 A1 | 1/2006 | Hawkins et al. |
| 2006/0031407 A1 | 2/2006 | Dispensa et al. |
| 2006/0033809 A1 | 2/2006 | Farley |
| 2006/0041923 A1 | 2/2006 | McQuaide, Jr. |
| 2006/0052100 A1 | 3/2006 | Almgren |
| 2006/0059038 A1 | 3/2006 | Iuchi et al. |
| 2006/0073820 A1 | 4/2006 | Craswell et al. |
| 2006/0114100 A1 | 6/2006 | Ghabra et al. |
| 2006/0126284 A1 | 6/2006 | Moscovitch |
| 2006/0133590 A1 | 6/2006 | Jiang |
| 2006/0140173 A1 | 6/2006 | Hoover |
| 2006/0140387 A1 | 6/2006 | Boldt |
| 2006/0143655 A1 | 6/2006 | Ellis et al. |
| 2006/0166650 A1 | 7/2006 | Berger et al. |
| 2006/0167677 A1 | 7/2006 | Bitzer |
| 2006/0199571 A1 | 9/2006 | Chin et al. |
| 2006/0206913 A1 | 9/2006 | Jerding et al. |
| 2006/0229114 A2 | 10/2006 | Kim |
| 2006/0234693 A1 | 10/2006 | Isidore et al. |
| 2006/0234758 A1 | 10/2006 | Parupudi et al. |
| 2006/0276172 A1 | 12/2006 | Rydgren et al. |
| 2006/0284732 A1 | 12/2006 | Brock-Fisher |
| 2007/0005809 A1 | 1/2007 | Kobayashi et al. |
| 2007/0015550 A1 | 1/2007 | Kayanuma |
| 2007/0037605 A1 | 2/2007 | Logan |
| 2007/0050832 A1 | 3/2007 | Wright et al. |
| 2007/0061845 A1 | 3/2007 | Barnes, Jr. |
| 2007/0109262 A1 | 5/2007 | Oshima et al. |
| 2007/0121596 A1 | 5/2007 | Kurapati et al. |
| 2007/0135145 A1 | 6/2007 | Lee et al. |
| 2007/0135150 A1 | 6/2007 | Ushiki et al. |
| 2007/0142047 A1 | 6/2007 | Heeschen |
| 2007/0190944 A1 | 8/2007 | Doan et al. |
| 2007/0191029 A1 | 8/2007 | Zarem et al. |
| 2007/0204014 A1 | 8/2007 | Greer et al. |
| 2007/0216760 A1 | 9/2007 | Kondo et al. |
| 2007/0218891 A1 * | 9/2007 | Cox ................ 455/422.1 |
| 2007/0260456 A1 | 11/2007 | Proux et al. |
| 2007/0262848 A1 | 11/2007 | Berstis et al. |
| 2007/0293240 A1 | 12/2007 | Drennan et al. |
| 2008/0014917 A1 | 1/2008 | Rhoads et al. |
| 2008/0016526 A1 | 1/2008 | Asmussen |
| 2008/0016534 A1 | 1/2008 | Ortiz et al. |
| 2008/0021728 A1 | 1/2008 | Khoo |
| 2008/0058005 A1 | 3/2008 | Zicker et al. |
| 2008/0104544 A1 | 5/2008 | Collins et al. |
| 2008/0146272 A1 | 6/2008 | Rao et al. |
| 2008/0151696 A1 | 6/2008 | Giroud et al. |
| 2008/0172173 A1 | 7/2008 | Chang et al. |
| 2008/0176545 A1 | 7/2008 | Dicke et al. |
| 2008/0194273 A1 | 8/2008 | Kansal et al. |
| 2008/0242271 A1 | 10/2008 | Schmidt et al. |
| 2008/0242283 A1 | 10/2008 | Ruckart |
| 2008/0250459 A1 | 10/2008 | Roman |
| 2008/0254811 A1 | 10/2008 | Stewart |
| 2008/0299989 A1 | 12/2008 | King et al. |
| 2009/0047972 A1 | 2/2009 | Neeraj |
| 2009/0111486 A1 | 4/2009 | Burstrom |
| 2009/0124243 A1 | 5/2009 | Routley et al. |
| 2009/0150807 A1 | 6/2009 | George et al. |
| 2009/0153490 A1 | 6/2009 | Nymark et al. |
| 2009/0186628 A1 | 7/2009 | Yonker et al. |
| 2009/0197641 A1 | 8/2009 | Rofougaran et al. |
| 2009/0221330 A1 | 9/2009 | Tomimori |
| 2009/0290369 A1 | 11/2009 | Schofield et al. |
| 2010/0030557 A1 | 2/2010 | Molloy et al. |
| 2010/0062740 A1 | 3/2010 | Ellis et al. |
| 2010/0099457 A1 | 4/2010 | Kim |
| 2010/0145700 A1 | 6/2010 | Kennewick et al. |
| 2011/0136508 A1 | 6/2011 | Fomukong et al. |

OTHER PUBLICATIONS

Audiovox, "POcket PC Phone User Manual", published on Mar. 19, 2004.

Gamespot, "Super Mario Bros. 3", Feb. 12, 1990, <http://www.gamespot.com/nes/action/supermariobros3/index.html?tag=tabs%3Bsummary>.

* cited by examiner

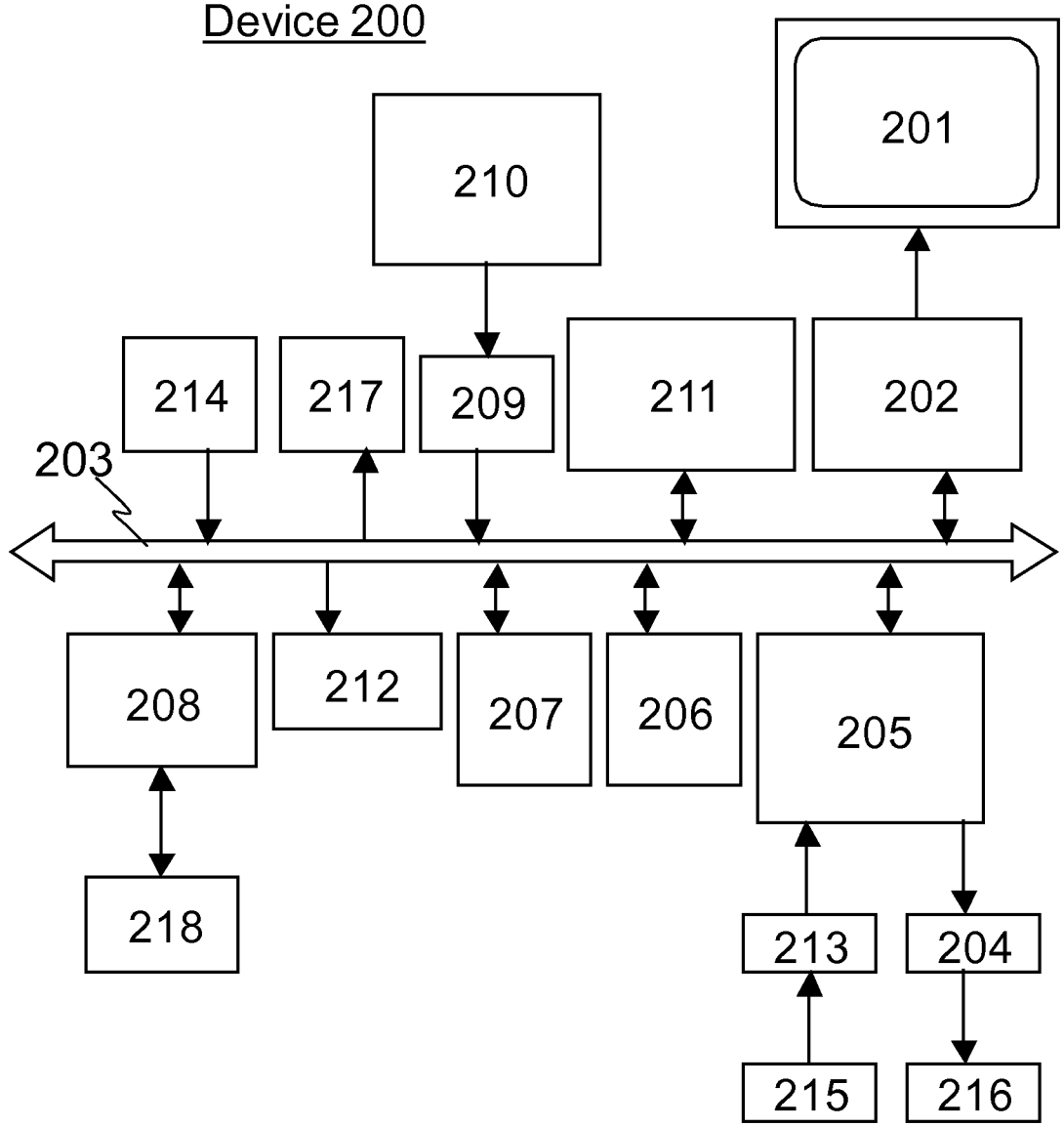

COMMUNICATION DEVICE WHICH NOTIFIES ITS PIN-POINT LOCATION OR GEOGRAPHIC AREA IN ACCORDANCE WITH USER SELECTION

CROSS REFERENCE TO RELATED APPLICATIONS

None.

BACKGROUND OF INVENTION

The invention relates to communication device and more particularly to the communication device which is capable to communicate with another communication device in a wireless fashion.

U.S. Pat. No. 6,327,471 is introduced as prior art of the present invention of which the summary is the following: "A method and an apparatus is provided for acquiring satellite signals to establish the exact spatial position of a cellular radiotelephone, in order to perform a timely dropoff or smooth handoff to another base station or frequency. The cellular radiotelephone is equipped with its own positioning system which uses satellite data to determine its spatial position. The communication system is preferably a Code Division Multiple Access (CDMA) system, and the positioning system is preferably a Global Positioning System (GPS). The method of the present invention may be used to determine the base station closest to the cellular radiotelephone. In the alternative, it may be used to compute a distance between the cellular radiotelephone and a location where the quality level of the cellular radiotelephone communication signal is predicted to be less than the predetermined value, and to determine from the computed distance whether the cellular radiotelephone should be handed off" However, this prior art does not disclose the communication device comprising a pin-point location notifying implementer, a geographic area notifying implementer, a location dependent program activating implementer, a multiple answering machine implementer, a time dependent answering machine implementer, an audiovisual storage implementer, a street address icon displaying implementer, and an audiovisual multiple recording/replaying implementer.

For the avoidance of doubt, the number of the prior arts introduced herein (and/or in IDS) may be of a large one, however, applicant has no intent to hide the more relevant prior art(s) in the less relevant ones.

SUMMARY OF INVENTION

It is an object of the present invention to provide a device capable to implement a plurality of functions.

It is another object of the present invention to provide merchandise to merchants attractive to the customers in the U.S.

It is another object of the present invention to provide mobility to the users of communication device.

It is another object of the present invention to provide more convenience to the customers in the U.S.

It is another object of the present invention to provide more convenience to the users of communication device or any tangible thing in which the communication device is fixedly or detachably (i.e., removably) installed.

It is another object of the present invention to overcome the shortcomings associated with the foregoing prior arts.

It is another object of the present invention to provide a device capable to implement a plurality of functions.

The present invention introduces the communication device comprising a pin-point location notifying implementer, a geographic area notifying implementer, a location dependent program activating implementer, a multiple answering machine implementer, a time dependent answering machine implementer, an audiovisual storage implementer, a street address icon displaying implementer, and an audiovisual multiple recording/replaying implementer.

BRIEF DESCRIPTION OF DRAWINGS

The above and other aspects, features, and advantages of the invention will be better understood by reading the following more particular description of the invention, presented in conjunction with the following drawing, wherein:

FIG. 1 is a block diagram illustrating an exemplary embodiment of the present invention.

DETAILED DESCRIPTION

The following description is of the best presently contemplated mode of carrying out the present invention. This description is not to be taken in a limiting sense but is made merely for the purpose of describing the general principles of the invention. For example, each description of random access memory in this specification illustrate(s) only one function or mode in order to avoid complexity in its explanation, however, such description does not mean that only one function or mode can be implemented at a time. In other words, more than one function or mode can be implemented simultaneously by way of utilizing the same random access memory. In addition, the FIGURE number is cited after the elements in parenthesis in a manner for example 'RAM 206 (FIG. 1)'. It is done so merely to assist the readers to have a better understanding of this specification, and must not be used to limit the scope of the claims in any manner since the FIGURE numbers cited are not exclusive. There are only few data stored in each storage area described in this specification. This is done so merely to simplify the explanation and, thereby, to enable the reader of this specification to understand the content of each function with less confusion. Therefore, more than few data (hundreds and thousands of data, if necessary) of the same kind, not to mention, are preferred to be stored in each storage area to fully implement each function described herein. The scope of the invention should be determined by referencing the appended claims.

FIG. 1 is a simplified block diagram of the Communication Device 200 utilized in the present invention. Referring to FIG. 1, Communication Device 200 includes CPU 211 which controls and administers the overall function and operation of Communication Device 200. CPU 211 uses RAM 206 to temporarily store data and/or to perform calculation to perform its function, and to implement the present invention, modes, functions, and systems explained hereinafter. Video Processor 202 generates analog and/or digital video signals which are displayed on LCD 201. ROM 207 stores the data and programs which are essential to operate Communication Device 200. Wireless signals are received by Antenna 218 and processed by Signal Processor 208. Input signals are input by Input Device 210, such as a dial pad, a joystick, and/or a keypad, and the signals are transferred via Input Interface 209 and Data Bus 203 to CPU 211. Indicator 212 is an LED lamp which is designed to output different colors (e.g., red, blue, green, etc). Analog audio data is input to Microphone 215. A/D 213 converts the analog audio data into a digital format. Speaker 216 outputs analog audio data which is converted into an analog format from digital format by D/A 204. Sound Processor 205 produces digital audio signals that are transferred to D/A 204 and also processes the digital audio signals transferred from A/D 213. CCD Unit 214 captures video image which is stored in RAM 206 in a digital format. Vibrator 217 vibrates the entire device by the command from CPU 211.

As another embodiment, LCD 201 or LCD 201/Video Processor 202 may be separated from the other elements described in FIG. 1, and be connected in a wireless fashion to be wearable and/or head-mountable.

When Communication Device 200 is in the voice communication mode, the analog audio data input to Microphone 215 is converted to a digital format by A/D 213 and transmitted to another device via Antenna 218 in a wireless fashion after being processed by Signal Processor 208, and the wireless signal representing audio data which is received via Antenna 218 is output from Speaker 216 after being processed by Signal Processor 208 and converted to analog signal by D/A 204. For the avoidance of doubt, the definition of Communication Device 200 in this specification includes so-called 'PDA'. The definition of Communication Device 200 also includes in this specification any device which is mobile and/or portable and which is capable to send and/or receive audio data, text data, image data, video data, and/or other types of data in a wireless fashion via Antenna 218. The definition of Communication Device 200 further includes any micro device embedded or installed into devices and equipments (e.g., VCR, TV, tape recorder, heater, air conditioner, fan, clock, micro wave oven, dish washer, refrigerator, oven, washing machine, dryer, door, window, automobile, motorcycle, and modem) to remotely control these devices and equipments. The size of Communication Device 200 is irrelevant. Communication Device 200 may be installed in houses, buildings, bridges, boats, ships, submarines, airplanes, and spaceships, and firmly fixed therein.

This paragraph illustrate(s) the elements of Communication Device 200. The elements of Communication Device 200 described in this paragraph is identical to the ones described in FIG. 1, except Communication Device 200 has new element, i.e., LED 219. Here, LED 219 receives infra red signals from other wireless devices, which are transferred to CPU 211 via Data Bus 203. LED 219 also sends infra red signals in a wireless fashion which are composed by CPU 211 and transferred via Data Bus 203. As the second embodiment, LED 219 may be connected to Signal Processor 208. Here, LED 219 transfers the received infra red signals to Signal Processor 208, and Signal Processor 208 processes and converts the signals to a CPU readable format which are transferred to CPU 211 via Data Bus 203. The data produced by CPU 211 are processed by Signal Processor 208 and transferred to another device via LED 219 in a wireless fashion. The task of LED 219 is as same as that of Antenna 218 described in FIG. 1 except that LED 219 utilizes infra red signals for implementing wireless communication in the second embodiment. For the avoidance of doubt, the reference to FIG. 1 (e.g., referring to FIG. 1 in parenthesis) automatically refers to this paragraph in this specification.

This paragraph illustrate(s) the data stored in Host H. In this embodiment, Host H includes Host Information Storage Area H00a which stores various types of data to assist and/or co-operate with Communication Device 200 to implement all modes, functions, and systems described in this specification. As another embodiment, Host H may be composed of a plurality of computers, i.e., one master computer and a plurality of slave computers, wherein the master computer is connected to the plurality of slave computers. As another embodiment, Host H may also be composed of a plurality of master computers by way of utilizing peer-to-peer connection.

<<Location Dependent Program Activating Function>>

The following paragraphs illustrate the location dependent program activating mode implementor, wherein when the user of said communication device arrives at a 1st location, a 1st software program is executed and a map indicating said 1st location and the street address or name of said 1st location are displayed on said display, and when the user of said communication device arrives at a 2nd location, a 2nd software program is executed and a map indicating said 2nd location and the street address or name of said 2nd location are displayed on said display.

This paragraph illustrates the storage area included in Host H. In this embodiment, Host H includes Location Dependent Program Activating Information Storage Area H625a of which the data and the software program(s) stored therein are described hereinafter.

This paragraph illustrates the storage area(s) included in Location Dependent Program Activating Information Storage Area H625a. In this embodiment, Location Dependent Program Activating Information Storage Area H625a includes Location Dependent Program Activating Data Storage Area H625b and Location Dependent Program Activating Software Storage Area H625c. Location Dependent Program Activating Data Storage Area H625b stores the data necessary to implement the present function on the side of Host H, such as the one(s) described hereinafter. Location Dependent Program Activating Software Storage Area H625c stores the software program(s) necessary to implement the present function on the side of Host H, such as the one(s) described hereinafter.

This paragraph illustrates the storage area(s) included in Location Dependent Message Outputting Data Storage Area H625b. In this embodiment, Location Dependent Message Outputting Data Storage Area H625b includes Current Location Data Storage Area H625b1, 1st Program Data Storage Area H625b2, 2nd Program Data Storage Area H625b3, 1st Program Executing Location Data Storage Area H625b4, 2nd Program Executing Location Data Storage Area H625b5, Street Address Data Storage Area H625b6, Address Location Data Storage Area H625b7, Map Data Storage Area H625b8, Current Location Icon Data Storage Area H625b9, 1st Icon Data Storage Area H625b10, 2nd Icon Data Storage Area H625b11, and Work Area H625b12. Current Location Data Storage Area H625b1 stores the current location data which indicates the current geographic location of Communication Device 200 in (x,y,z) format. 1st Program Data Storage Area H625b2 stores the 1st program data which is a specific software program. 2nd Program Data Storage Area H625b3 stores the 2nd program data which is another specific software program. 1st Program Executing Location Data Storage Area H625b4 stores the 1st program executing location data which indicates the geographic location of Communication Device 200 at which the 1st program data is executed. 2nd Program Executing Location Data Storage Area H625b5 stores the 2nd program executing location data which indicates the geographic location of Communication Device 200 at which the 2nd program data is executed. Street Address Data Storage Area H625b6 stores the data described hereinafter. Address Location Data Storage Area H625b7 stores the data described hereinafter. Map Data Storage Area H625b8 stores the map data which is the image data indicating a map. Current Location Icon Data Storage Area H625b9 stores the current location icon data which is the image of the icon utilized to indicate the current location data on the map data.

1st Icon Data Storage Area H625b10 stores the 1st icon data which is the image of the icon utilized to indicate the 1st program executing location data on the map data. 2nd Icon Data Storage Area H625b11 stores the 2nd icon data which is the image of the icon utilized to indicate the 2nd program executing location data on the map data. Work Area H625b12 is utilized as a work area to perform calculation and temporarily store data.

This paragraph illustrates the data stored in Street Address Data Storage Area H625b6. In this embodiment Street Address Data Storage Area H625b6comprises two columns, i.e., 'Street Address ID' and 'Street Address Data'. Column 'Street Address ID' stores the street address IDs, and each street address ID is an identification of the corresponding street address data stored in column 'Street Address Data'. Column 'Street Address Data' stores the street address data, and each street address data indicates a street address. Each street address data may also indicate the name of a specific location or site corresponding to the street address. In this embodiment, Street Address Data Storage Area H625b6 stores the following data: 'Street Address#1' and the corresponding 'Street Address Data#1'; 'Street Address#2' and the corresponding 'Street Address Data#2'; 'Street Address#3' and the corresponding 'Street Address Data#3'; and 'Street Address#4' and the corresponding 'Street Address Data#4'.

This paragraph illustrates the data stored in Address Location Data Storage Area H625b7. In this embodiment, Address Location Data Storage Area H625b7 comprises two columns, i.e., 'Street Address ID' and 'Address Location Data'. Column 'Street Address ID' stores the street address IDs, and each street address ID is an identification of the corresponding address location data stored in column 'Address Location Data'. The street address IDs stored in the present column are identical to the ones described in the previous paragraph. Column 'Address Location Data' stores the address location data, and each address location data indicates the geographic location of the corresponding street address data in (x,y,z) format. In this embodiment, Address Location Data Storage Area H625b7 stores the following data: 'Street Address#1' and the corresponding 'Address Location Data#1'; 'Street Address#2' and the corresponding 'Address Location Data#2'; 'Street Address#3' and the corresponding 'Address Location Data#3'; and 'Street Address#4' and the corresponding 'Address Location Data#4'.

This paragraph illustrates the software program(s) stored in Location Dependent Message Outputting Software Storage Area H625c. In this embodiment, Location Dependent Message Outputting Software Storage Area H625c stores 1st Program Data Producing Software H625c1, 2nd Program Data Producing Software H625c2, 1st Program Executing Location Data Producing Software H625c3, 2nd Program Executing Location Data Producing Software H625c4, Current Location Data Producing Software H625c5, 1st Program Data Executing Software H625c6, and 2nd Program Data Executing Software H625c7. 1st Program Data Producing Software H625c1 is the software program described hereinafter. 2nd Program Data Producing Software H625c2 is the software program described hereinafter. 1st Program Executing Location Data Producing Software H625c3 is the software program described hereinafter. 2nd Program Executing Location Data Producing Software H625c4 is the software program described hereinafter. Current Location Data Producing Software H625c5 is the software program described hereinafter. 1st Program Data Executing Software H625c6 is the software program described hereinafter. 2nd Program Data Executing Software H625c7 is the software program described hereinafter.

This paragraph illustrates the storage area included in RAM 206 (FIG. 1) of Communication Device 200. In this embodiment, RAM 206 includes Location Dependent Program Activating Information Storage Area 206625a of which the data and the software program(s) stored therein are described hereinafter.

The data and/or the software program(s) necessary to implement the present function may be downloaded from Host H to Communication Device 200.

This paragraph illustrates the storage area(s) included in Location Dependent Program Activating Information Storage Area 206625a. In this embodiment, Location Dependent Program Activating Information Storage Area 206625a includes Location Dependent Program Activating Data Storage Area 206625b and Location Dependent Program Activating Software Storage Area 206625c. Location Dependent Program Activating Data Storage Area 206625b stores the data necessary to implement the present function on the side of Communication Device 200, such as the one(s) described hereinafter. Location Dependent Program Activating Software Storage Area 206625c stores the software program(s) necessary to implement the present function on the side of Communication Device 200, such as the one(s) described hereinafter.

This paragraph illustrates the storage area(s) included in Location Dependent Message Outputting Data Storage Area 206625b. In this embodiment, Location Dependent Message Outputting Data Storage Area 206625b includes Current Location Data Storage Area 206625b1, 1st Program Data Storage Area 206625b2, 2nd Program Data Storage Area 206625b3, 1st Program Executing Location Data Storage Area 206625b4, 2nd Program Executing Location Data Storage Area 206625b5, Street Address Data Storage Area 206625b6, Address Location Data Storage Area 206625b7, Map Data Storage Area 206625b8, Current Location Icon Data Storage Area 206625b9, 1st Icon Data Storage Area 206625b10, 2nd Icon Data Storage Area 206625b11, and Work Area 206625b12. Current Location Data Storage Area 206625b1 stores the current location data which indicates the current geographic location of Communication Device 200 in (x,y,z) format. 1st Program Data Storage Area 206625b2 stores the 1st program data which is a specific software program. 2nd Program Data Storage Area 206625b3 stores the 2nd program data which is another specific software program. 1st Program Executing Location Data Storage Area 206625b4 stores the 1st program executing location data which indicates the geographic location of Communication Device 200 at which the 1st program data is executed. 2nd Program Executing Location Data Storage Area 206625b5 stores the 2nd program executing location data which indicates the geographic location of Communication Device 200 at which the 2nd program data is executed. Street Address Data Storage Area 206625b6 stores the data described hereinafter. Address Location Data Storage Area 206625b7 stores the data described hereinafter. Map Data Storage Area 206625b8 stores the map data which is the image data indicating a map. Current Location Icon Data Storage Area 206625b9 stores the current location icon data which is the image of the icon utilized to indicate the current location data on the map data. 1st Icon Data Storage Area 206625b10 stores the 1st icon data which is the image of the icon utilized to indicate the 1st program executing location data on the map data. 2nd Icon Data Storage Area 206625b11 stores the 2nd icon data which is the image of the icon utilized to indicate the 2nd program executing location data on the map data. Work Area 206625b12 is utilized as a work area to perform calculation and temporarily store data.

This paragraph illustrates the data stored in Street Address Data Storage Area 206625b6. In this embodiment, Street Address Data Storage Area 206625b6 comprises two columns, i.e., 'Street Address ID' and 'Street Address Data'. Column 'Street Address ID' stores the street address IDs, and each street address ID is an identification of the corresponding street address data stored in column 'Street Address Data'. Column 'Street Address Data' stores the street address data, and each street address data indicates a street address. Each street address data may also indicate the name of a specific location or site corresponding to the street address. In this embodiment, Street Address Data Storage Area 206625b6 stores the following data: 'Street Address#1' and the corresponding 'Street Address Data#1'; 'Street Address#2' and the corresponding 'Street Address Data#2'; 'Street Address#3' and the corresponding 'Street Address Data#3'; and 'Street Address#4' and the corresponding 'Street Address Data#4'.

This paragraph illustrates the data stored in Address Location Data Storage Area 206625b7. In this embodiment, Address Location Data Storage Area 206625b7 comprises two columns, i.e., 'Street Address ID' and 'Address Location Data'. Column 'Street Address ID' stores the street address IDs, and each street address ID is an identification of the corresponding address location data stored in column 'Address Location Data'. The street address IDs stored in the present column are identical to the ones described in the previous paragraph. Column 'Address Location Data' stores the address location data, and each address location data indicates the geographic location of the corresponding street address data in (x,y,z) format. In this embodiment, Address Location Data Storage Area 206625b7 stores the following data: 'Street Address#1' and the corresponding 'Address Location Data#1'; 'Street Address#2' and the corresponding 'Address Location Data#2'; 'Street Address#3' and the corresponding 'Address Location Data#3'; and 'Street Address#4' and the corresponding 'Address Location Data#4'.

This paragraph illustrates the software program(s) stored in Location Dependent Message Outputting Software Storage Area 206625c. In this embodiment, Location Dependent Message Outputting Software Storage Area 206625c stores 1st Program Data Producing Software 206625c1, 2nd Program Data Producing Software 206625c2, 1st Program Executing Location Data Producing Software 206625c3, 2nd Program Executing Location Data Producing Software 206625c4, Current Location Data Producing Software 206625c5, 1st Program Data Executing Software 206625c6, and 2nd Program Data Executing Software 206625c7. 1st Program Data Producing Software 206625c1 is the software program described hereinafter. 2nd Program Data Producing Software 206625c2 is the software program described hereinafter. 1st Program Executing Location Data Producing Software 206625c3 is the software program described hereinafter. 2nd Program Executing Location Data Producing Software 206625c4 is the software program described hereinafter. Current Location Data Producing Software 206625c5 is the software program described hereinafter. 1st Program Data Executing Software 206625c6 is the software program described hereinafter. 2nd Program Data Executing Software 206625c7 is the software program described hereinafter.

This paragraph illustrate(s) 1st Program Data Producing Software H625c1 of Host H and 1st Program Data Producing Software 206625c1 of Communication Device 200, which produce(s) the 1st program data. In this embodiment, CPU 211 (FIG. 1) displays a list of software programs on LCD 201 (FIG. 1) (S1). The user of Communication Device 200 selects, by utilizing Input Device 210 (FIG. 1) or via voice recognition system, a software program from the list displayed on LCD 201 (FIG. 1) (S2). CPU 211 (FIG. 1) sends the software program selected in the previous step to Host H in a wireless fashion (S3). Host H receives the software program from Communication Device 200 (S4). Host H stores the software program received in the previous step as the 1st program data in 1st Program Data Storage Area H625b2 (S5).

This paragraph illustrate(s) 2nd Program Data Producing Software H625c2 of Host H and 2nd Program Data Producing Software 206625c2 of Communication Device 200, which produce(s) the 2nd program data. In this embodiment, CPU 211 (FIG. 1) displays a list of software programs on LCD 201 (FIG. 1) (S1). The user of Communication Device 200 selects, by utilizing Input Device 210 (FIG. 1) or via voice recognition system, a software program from the list displayed on LCD 201 (FIG. 1) (S2). CPU 211 (FIG. 1) sends the software program selected in the previous step to Host H in a wireless fashion (S3). Host H receives the software program from Communication Device 200 (S4). Host H stores the software program received in the previous step as the 2nd program data in 2nd Program Data Storage Area H625b3 (S5).

This paragraph illustrate(s) 1st Program Executing Location Data Producing Software H625c3 of Host H and 1st Program Executing Location Data Producing Software 206625c3 of Communication Device 200, which produce(s) the 1st program executing location data. In this embodiment, Host H retrieves all street address data (e.g., Street Address Data#1 through #4) from Street Address Data Storage Area H625b6 and sends the data to Communication Device 200 (S1). CPU 211 (FIG. 1) receives the street address data (e.g., Street Address Data#1 through #4) from Host H in a wireless fashion and displays the data on LCD 201 (FIG. 1) (S2). The user of Communication Device 200 selects, by utilizing Input Device 210 (FIG. 1) or via voice recognition system, a street address data (e.g., Street Address Data#1) (S3). CPU 211 (FIG. 1) sends the street address data (e.g., Street Address Data#1) selected in the previous step to Host H in a wireless fashion (S4). Host H receives the street address data (e.g., Street Address Data#1) from Communication Device 200 (S5). Host H identifies the address location data (e.g., Address Location Data#1) corresponding to the street address data (e.g., Street Address Data#1) received in the previous step in Address Location Data Storage Area H625b7 (S6). Host H stores the address location data (e.g., Address Location Data#1) identified in the previous step as the 1st program executing location data in 1st Program Executing Location Data Storage Area H625b4 (S7).

This paragraph illustrate(s) 2nd Program Executing Location Data Producing Software H625c4 of Host H and 2nd Program Executing Location Data Producing Software 206625c4 of Communication Device 200, which produce(s) the 2nd program executing location data. In this embodiment, Host H retrieves all street address data (e.g., Street Address Data#1 through #4) from Street Address Data Storage Area H625b6 and sends the data to Communication Device 200 (S1). CPU 211 (FIG. 1) receives the street address data (e.g., Street Address Data#1 through #4) from Host H in a wireless fashion and displays the data on LCD 201 (FIG. 1) (S2). The user of Communication Device 200 selects, by utilizing Input Device 210 (FIG. 1) or via voice recognition system, a street address data (e.g., Street Address Data#2) (S3). CPU 211 (FIG. 1) sends the street address data (e.g., Street Address Data#2) selected in the previous step to Host H in a wireless fashion (S4). Host H receives the street address data (e.g., Street Address Data#2) from Communication Device 200

(S5). Host H identifies the address location data (e.g., Address Location Data#2) corresponding to the street address data (e.g., Street Address Data#2) received in the previous step in Address Location Data Storage Area H625b7 (S6). Host H stores the address location data (e.g., Address Location Data#2) identified in the previous step as the 2nd program executing location data in 2nd Program Executing Location Data Storage Area H625b5 (S7).

This paragraph illustrate(s) Current Location Data Producing Software H625c5 of Host H and Current Location Data Producing Software 206625c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H625b1 (S3). The foregoing sequence is repeated periodically.

This paragraph illustrate(s) 1st Program Data Executing Software H625c6 of Host H and 1st Program Data Executing Software 206625c6 of Communication Device 200, which execute(s) the 1st program data. In this embodiment, Host H retrieves the current location data from Current Location Data Storage Area H625b1 (S1). Host H retrieves the 1st program executing location data from 1st Program Executing Location Data Storage Area H625b4 (S2). If the current location data retrieved in S1 is within a certain distance from the 1st program executing location data retrieved in the previous step, Host H proceeds to the next step (S3). Host H retrieves the 1st program data from 1st Program Data Storage Area H625b2 (S4). Host H executes the 1st program data retrieved in the previous step (S5). Host H retrieves the map data from Map Data Storage Area H625b8 and sends the data to Communication Device 200 (S6). CPU 211 (FIG. 1) receives the map data from Host H in a wireless fashion and displays the data on LCD 201 (FIG. 1) (S7). Host H retrieves the current location icon data from Current Location Icon Data Storage Area H625b9 and sends the data to Communication Device 200 (S8). CPU 211 (FIG. 1) receives the current location icon data from Host H in a wireless fashion (S9). CPU 211 (FIG. 1) displays the current location icon data received in the previous step at the location corresponding to the current location data retrieved in S1 on the map data displayed on S7 (S10). Host H retrieves the 1st icon data from 1st Icon Data Storage Area H625b10 and sends the data to Communication Device 200 (S11). CPU 211 (FIG. 1) receives the 1st icon data from Host H in a wireless fashion (S12). CPU 211 (FIG. 1) displays the 1st icon data received in the previous step at the location corresponding to the 1st program executing location data retrieved in S2 on the map data displayed on S7 (S 13). Host H identifies the address location data (e.g., Address Location Data#1) corresponding to the 1st program executing location data retrieved in S2 in Address Location Data Storage Area H625b7 (S14). Host H retrieves the street address data (e.g., Street Address Data#1) corresponding to the address location data (e.g., Address Location Data#1) identified in the previous step from Street Address Data Storage Area H625b6 and sends the data to Communication Device 200 (S15). CPU 211 (FIG. 1) receives the street address data (e.g., Street Address Data#1) from Host H in a wireless fashion and displays the data on LCD 201 (FIG. 1) (S16). The foregoing sequence is repeated periodically.

This paragraph illustrate(s) 2nd Program Data Executing Software H625c7 of Host H and 2nd Program Data Executing Software 206625c7 of Communication Device 200, which execute(s) the 2nd program data. In this embodiment Host H retrieves the current location data from Current Location Data Storage Area H625b1 (S1). Host H retrieves the 2nd program executing location data from 2nd Program Executing Location Data Storage Area H625b5 (S2). If the current location data retrieved in S1 is within a certain distance from the 2nd program executing location data retrieved in the previous step, Host H proceeds to the next step (S3). Host H retrieves the 2nd program data from 2nd Program Data Storage Area H625b3 (S4). Host H executes the 2nd program data retrieved in the previous step (S5). Host H retrieves the map data from Map Data Storage Area H625b8 and sends the data to Communication Device 200 (S6). CPU 211 (FIG. 1) receives the map data from Host H in a wireless fashion and displays the data on LCD 201 (FIG. 1) (S7). Host H retrieves the current location icon data from Current Location Icon Data Storage Area H625b9 and sends the data to Communication Device 200 (S8). CPU 211 (FIG. 1) receives the current location icon data from Host H in a wireless fashion (S9). CPU 211 (FIG. 1) displays the current location icon data received in the previous step at the location corresponding to the current location data retrieved in S1 on the map data displayed on S7 (S1 10). Host H retrieves the 2nd icon data from 2nd Icon Data Storage Area H625b11 and sends the data to Communication Device 200 (S11). CPU 211 (FIG. 1) receives the 2nd icon data from Host H in a wireless fashion (S12). CPU 211 (FIG. 1) displays the 2nd icon data received in the previous step at the location corresponding to the 2nd program executing location data retrieved in S2 on the map data displayed on S7 (S13). Host H identifies the address location data (e.g., Address Location Data#2) corresponding to the 2nd program executing location data retrieved in S2 in Address Location Data Storage Area H625b7 (S14). Host H retrieves the street address data (e.g., Street Address Data#2) corresponding to the address location data (e.g., Address Location Data#2) identified in the previous step from Street Address Data Storage Area H625b6 and sends the data to Communication Device 200 (S15). CPU 211 (FIG. 1) receives the street address data (e.g., Street Address Data#2) from Host H in a wireless fashion and displays the data on LCD 201 (FIG. 1) (S16). The foregoing sequence is repeated periodically.

The following paragraphs illustrate another embodiment wherein Communication Device 200 plays the major role in implementing the present function.

This paragraph illustrate(s) 1st Program Data Producing Software 206625c1 of Communication Device 200, which produce(s) the 1st program data. In this embodiment, CPU 211 (FIG. 1) displays a list of software programs on LCD 201 (FIG. 1) (S1). The user of Communication Device 200 selects, by utilizing Input Device 210 (FIG. 1) or via voice recognition system, a software program from the list displayed on LCD 201 (FIG. 1) (S2). CPU 211 (FIG. 1) stores the software program selected in the previous step as the 1st program data in 1st Program Data Storage Area 206625b2 (S3).

This paragraph illustrate(s) 2nd Program Data Producing Software 206625c2 of Communication Device 200, which produce(s) the 2nd program data. In this embodiment, CPU 211 (FIG. 1) displays a list of software programs on LCD 201 (FIG. 1) (S1). The user of Communication Device 200 selects, by utilizing Input Device 210 (FIG. 1) or via voice recognition system, a software program from the list displayed on LCD 201 (FIG. 1) (S2). CPU 211 (FIG. 1) stores the software program selected in the previous step as the 2nd program data in 2nd Program Data Storage Area 206625b3 (S3).

This paragraph illustrate(s) 1st Program Executing Location Data Producing Software 206625c3 of Communication Device 200, which produce(s) the 1st program executing location data. In this embodiment, CPU 211 (FIG. 1) retrieves all street address data (e.g., Street Address Data# 1 through #4) from Street Address Data Storage Area 206625b6 (S1). CPU 211 (FIG. 1) displays the street address data (e.g., Street Address Data#1 through #4) retrieved in the previous step on LCD 201 (FIG. 1) (S2). The user of Communication Device 200 selects, by utilizing Input Device 210 (FIG. 1) or via voice recognition system, a street address data (e.g., Street Address Data#1) (S3). CPU 211 (FIG. 1) identifies the address location data (e.g., Address Location Data#1) corresponding to the street address data (e.g., Street Address Data#1) selected in the previous step in Address Location Data Storage Area 206625b7 (S4). CPU 211 (FIG. 1) stores the address location data (e.g., Address Location Data#1) identified in the previous step as the 1st program executing location data in 1st Program Executing Location Data Storage Area 206625b4 (S5).

This paragraph illustrate(s) 2nd Program Executing Location Data Producing Software 206625c4 of Communication Device 200, which produce(s) the 2nd program executing location data. In this embodiment, CPU 211 (FIG. 1) retrieves all street address data (e.g., Street Address Data#1 through #4) from Street Address Data Storage Area 206625b6 (S1). CPU 211 (FIG. 1) displays the street address data (e.g., Street Address Data#1 through #4) retrieved in the previous step on LCD 201 (FIG. 1) (S2). The user of Communication Device 200 selects, by utilizing Input Device 210 (FIG. 1) or via voice recognition system, a street address data (e.g., Street Address Data#2) (S3). CPU 211 (FIG. 1) identifies the address location data (e.g., Address Location Data#2) corresponding to the street address data (e.g., Street Address Data#2) selected in the previous step in Address Location Data Storage Area 206625b7 (S4). CPU 211 (FIG. 1) stores the address location data (e.g., Address Location Data#2) identified in the previous step as the 2nd program executing location data in 2nd Program Executing Location Data Storage Area 206625b5 (S5).

This paragraph illustrate(s) Current Location Data Producing Software 206625c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206625b1 (S3). The foregoing sequence is repeated periodically.

This paragraph illustrate(s) 1st Program Data Executing Software 206625c6 of Communication Device 200, which output(s) the 1st program data. In this embodiment CPU 211 (FIG. 1) retrieves the current location data from Current Location Data Storage Area 206625b1 (S1). CPU 211 (FIG. 1) retrieves the 1st program executing location data from 1st Program Executing Location Data Storage Area 206625b4 (S2). If the current location data retrieved in S1 is within a certain distance from the 1st program executing location data retrieved in the previous step, CPU 211 (FIG. 1) proceeds to the next step (S3). CPU 211 (FIG. 1) retrieves the 1st program data from 1st Program Data Storage Area 206625b2 (S4). CPU 211 (FIG. 1) executes the 1st program data retrieved in the previous step (S5). CPU 211 (FIG. 1) retrieves the map data from Map Data Storage Area 206625b8 (S6). CPU 211 (FIG. 1) displays the map data retrieved in the previous step on LCD 201 (FIG. 1) (S7). CPU 211 (FIG. 1) retrieves the current location icon data from Current Location Icon Data Storage Area 206625b9 (S8). CPU 211 (FIG. 1) displays the current location icon data retrieved in the previous step at the location corresponding to the current location data retrieved in S1 on the map data displayed on S7 (S9). CPU 211 (FIG. 1) retrieves the 1st icon data from 1st Icon Data Storage Area 206625b10 (S 10). CPU 211 (FIG. 1) displays the 1st icon data retrieved in the previous step at the location corresponding to the 1st program executing location data retrieved in S2 on the map data displayed on S7 (S11). CPU 211 (FIG. 1) identifies the address location data (e.g., Address Location Data#1) corresponding to the 1st program executing location data retrieved in S2 in Address Location Data Storage Area 206625b7 (S12). CPU 211 (FIG. 1) retrieves the street address data (e.g., Street Address Data#1) corresponding to the address location data (e.g., Address Location Data#1) identified in the previous step from Street Address Data Storage Area 206625b6(S13). CPU 211 (FIG. 1) displays the street address data (e.g., Street Address Data#1) retrieved in the previous step on LCD 201 (FIG. 1) (S14). The foregoing sequence is repeated periodically.

This paragraph illustrate(s) 2nd Program Data Executing Software 206625c7 of Communication Device 200, which output(s) the 2nd program data. In this embodiment, CPU 211 (FIG. 1) retrieves the current location data from Current Location Data Storage Area 206625b1 (S1). CPU 211 (FIG. 1) retrieves the 2nd program executing location data from 2nd Program Executing Location Data Storage Area 206625b5 (S2). If the current location data retrieved in S1 is within a certain distance from the 2nd program executing location data retrieved in the previous step, CPU 211 (FIG. 1) proceeds to the next step (S3). CPU 211 (FIG. 1) retrieves the 2nd program data from 2nd Program Data Storage Area 206625b3 (S4). CPU 211 (FIG. 1) executes the 2nd program data retrieved in the previous step (S5). CPU 211 (FIG. 1) retrieves the map data from Map Data Storage Area 206625b8 (S6). CPU 211 (FIG. 1) displays the map data retrieved in the previous step on LCD 201 (FIG. 1) (S7). CPU 211 (FIG. 1) retrieves the current location icon data from Current Location Icon Data Storage Area 206625b9 (S8). CPU 211 (FIG. 1) displays the current location icon data retrieved in the previous step at the location corresponding to the current location data retrieved in S1 on the map data displayed on S7 (S9). CPU 211 (FIG. 1) retrieves the 2nd icon data from 2nd Icon Data Storage Area 206625b11 (S10). CPU 211 (FIG. 1) displays the 2nd icon data retrieved in the previous step at the location corresponding to the 2nd program executing location data retrieved in S2 on the map data displayed on S7 (S11). CPU 211 (FIG. 1) identifies the address location data (e.g., Address Location Data#2) corresponding to the 2nd program executing location data retrieved in S2 in Address Location Data Storage Area 206625b7 (S 12). CPU 211 (FIG. 1) retrieves the street address data (e.g., Street Address Data#2) corresponding to the address location data (e.g., Address Location Data#2) identified in the previous step from Street Address Data Storage Area 206625b6(S13). CPU 211 (FIG. 1) displays the street address data (e.g., Street Address Data#2) retrieved in the previous step on LCD 201 (FIG. 1) (S14). The foregoing sequence is repeated periodically.

<<Multiple Answering Machine Function>>

The following paragraphs illustrate the multiple answering machine mode implementor, wherein a 1st phone number data and a 2nd phone number data are registered with said communication device, when a phone call made to said 1st phone number data is received and said communication device does not answer said phone call within a certain period of time, a 1st caller's message data, a 1st caller's location data, and a 1st callee's location data are stored, which are operable to be output, wherein said 1st caller's message data is the audiovisual data indicating the message left by the caller who made the call to said 1st phone number data, said 1st caller's location data indicates the geographic location of the caller at the time the call was made to said 1st phone number data and said 1st callee's location data indicates the geographic location of said communication device at the time the call was made to said 1st phone number data, and when a phone call made to said 2nd phone number data is received and said communication device does not answer said phone call within a certain period of time, a 2nd caller's message data, a 2nd caller's location data, and a 2nd callee's location data, which are operable to be output, wherein said 2nd caller's message data is the audiovisual data indicating the message left by the caller who made the call to said 2nd phone number data, said 2nd caller's location data indicates the geographic location of the caller at the time the call was made to said 2nd phone number data, and said 2nd callee's location data indicates the geographic location of said communication device at the time the call was made to said 2nd phone number data.

This paragraph illustrates the storage area included in Host H. In this embodiment, Host H includes Multiple Answering Machine Information Storage Area H626a of which the data and the software program(s) stored therein are described hereinafter.

This paragraph illustrates the storage area(s) included in Multiple Answering Machine Information Storage Area H626a. In this embodiment, Multiple Answering Machine Information Storage Area H626a includes Multiple Answering Machine Data Storage Area H626b and Multiple Answering Machine Software Storage Area H626c. Multiple Answering Machine Data Storage Area H626b stores the data necessary to implement the present function on the side of Host H, such as the one(s) described hereinafter. Multiple Answering Machine Software Storage Area H626c stores the software program(s) necessary to implement the present function on the side of Host H, such as the one(s) described hereinafter.

This paragraph illustrates the storage area(s) included in Multiple Answering Machine Data Storage Area H626b. In this embodiment, Multiple Answering Machine Data Storage Area H626b includes All Phone Number Data Storage Area H626b1, All Auto Replying Audiovisual Data Storage Area H626b2, All Caller's Message Data Storage Area H626b3, Current Location Data Storage Area H626b4, All Location Data Storage Area H626b5, All Icon Data Storage Area H626b6, Map Data Storage Area H626b7 and Work Area H626b8. All Phone Number Data Storage Area H626b1 stores the data described hereinafter. All Auto Replying Audiovisual Data Storage Area H626b2 stores the data described hereinafter. All Caller's Message Data Storage Area H626b3 stores the data described hereinafter. Current Location Data Storage Area H626b4 stores the current location data which indicates the current geographic location of Communication Device 200. All Location Data Storage Area H626b5 stores the data described hereinafter. All Icon Data Storage Area H626b6 stores the data described hereinafter. Map Data Storage Area H626b7 stores the map data which is the image data indicating a map. Work Area H626b8 is utilized as a work area to perform calculation and temporarily store data.

This paragraph illustrates the storage area(s) included in All Phone Number Data Storage Area H626b1. In this embodiment, All Phone Number Data Storage Area H626b1 includes 1st Phone Number Data Storage Area H626b1a and 2nd Phone Number Data Storage Area H626b1b. 1st Phone Number Data Storage Area H626b1a stores the 1st phone number data which is the phone number owned by the user of Communication Device 200. 2nd Phone Number Data Storage Area H626b1b stores the 2nd phone number data which is another phone number owned by the user of Communication Device 200.

This paragraph illustrates the storage area(s) included in All Auto Replying Audiovisual Data Storage Area H626b2. In this embodiment, All Auto Replying Audiovisual Data Storage Area H626b2 includes 1st Auto Replying Audiovisual Data Storage Area H626b2a and 2nd Auto Replying Audiovisual Data Storage Area H626b2b. 1st Auto Replying Audiovisual Data Storage Area H626b2a stores the 1st auto replying audiovisual data which is the audiovisual data output from the caller's device when the user of Communication Device 200 does not answer the call made to the 1st phone number data. 2nd Auto Replying Audiovisual Data Storage Area H626b2b stores the 2nd auto replying audiovisual data which is the audiovisual data output from the caller's device when the user of Communication Device 200 does not answer the call made to the 2nd phone number data.

This paragraph illustrates the storage area(s) included in All Caller's Message Data Storage Area H626b3. In this embodiment, All Caller's Message Data Storage Area H626b3 includes 1st Caller's Message Data Storage Area H626b3a and 2nd Caller's Message Data Storage Area H626b3b. 1st Caller's Message Data Storage Area H626b3a stores the 1st caller's message data which is the audiovisual data indicating the message left by the caller who made the call to the 1st phone number data. 2nd Caller's Message Data Storage Area H626b3b stores the 2nd caller's message data which is the audiovisual data indicating the message left by the caller who made the call to the 2nd phone number data.

This paragraph illustrates the storage area(s) included in All Location Data Storage Area H626b5. In this embodiment, All Location Data Storage Area H626b5 includes 1st Caller's Location Data Storage Area H626b5a, 1st Callee's Location Data Storage Area H626b5b, 2nd Caller's Location Data Storage Area H626b5c, and 2nd Callee's Location Data Storage Area H626b5d. 1st Caller's Location Data Storage Area H626b5a stores the 1st caller's location data which indicates the geographic location of the caller at the time the call was made to the 1st phone number data. 1st Callee's Location Data Storage Area H626b5b stores the 1st callee's location data which indicates the geographic location of the callee, the user of Communication Device 200, at the time the call was made to the 1st phone number data. 2nd Caller's Location Data Storage Area H626b5c stores the 2nd caller's location data which indicates the geographic location of the caller at the time the call was made to the 2nd phone number data. 2nd Callee's Location Data Storage Area H626b5d stores the 2nd callee's location data which indicates the geographic location of the callee, the user of Communication Device 200, at the time the call was made to the 2nd phone number data.

This paragraph illustrates the storage area(s) included in All Icon Data Storage Area H626b6. In this embodiment, All Icon Data Storage Area H626b6 includes 1st Caller's Icon Data Storage Area H626b6a, 1st Callee's Icon Data Storage Area H626b6b, 2nd Caller's Icon Data Storage Area H626b6c, and 2nd Callee's Icon Data Storage Area H626b6d. 1st Caller's Icon Data Storage Area H626b6a stores the 1st caller's icon data which is the image of the icon utilized to indicate the 1st caller's location data on the map data. 1st Callee's Icon Data Storage Area H626b6b stores the 1st callee's icon data which is the image of the icon utilized to indicate the 1st callee's location data on the map data. 2nd Caller's Icon Data Storage Area H626b6c stores the 2nd caller's icon data which is the image of the icon utilized to indicate the 2nd caller's location data on the map data. 2nd Callee's Icon Data Storage Area H626b6d stores the 2nd callee's icon data which is the image of the icon utilized to indicate the 2nd callee's location data on the map data.

This paragraph illustrates the software program(s) stored in Multiple Answering Machine Software Storage Area H626c. In this embodiment, Multiple Answering Machine Software Storage Area H626c stores 1st Auto Replying Audiovisual Data Producing Software H626c1, 2nd Auto Replying Audiovisual Data Producing Software H626c2, Current Location Data Producing Software H626c3, 1st Caller's Message Data Producing Software H626c4, 1st Caller's Location Data Producing Software H626c5, 1st Callee's Location Data Producing Software H626c6 2nd Caller's Message Data Producing Software H626c7, 2nd Caller's Location Data Producing Software H626c8, 2nd Callee's Location Data Producing Software H626c9, 1st Caller's Message Data Replaying Software H626c10, and 2nd Caller's Message Data Replaying Software H626c11. 1st Auto Replying Audiovisual Data Producing Software H626c1 is the software program described hereinafter. 2nd Auto Replying Audiovisual Data Producing Software H626c2 is the software program described hereinafter. Current Location Data Producing Software H626c3 is the software program described hereinafter. 1st Caller's Message Data Producing Software H626c4 is the software program described hereinafter. 1st Caller's Location Data Producing Software H626c5 is the software program described hereinafter. 1st Callee's Location Data Producing Software H626c6 is the software program described hereinafter. 2nd Caller's Message Data Producing Software H626c7 is the software program described hereinafter. 2nd Caller's Location Data Producing Software H626c8 is the software program described hereinafter. 2nd Callee's Location Data Producing Software H626c9 is the software program described hereinafter. 1st Caller's Message Data Replaying Software H626c10 is the software program described hereinafter. 2nd Caller's Message Data Replaying Software H626c11 is the software program described hereinafter.

This paragraph illustrates the storage area included in RAM 206 (FIG. 1) of Communication Device 200. In this embodiment, RAM 206 includes Multiple Answering Machine Information Storage Area 206626a of which the data and the software program(s) stored therein are described hereinafter.

The data and/or the software program(s) necessary to implement the present function may be downloaded from Host H to Communication Device 200.

This paragraph illustrates the storage area(s) included in Multiple Answering Machine Information Storage Area 206626a. In this embodiment, Multiple Answering Machine Information Storage Area 206626a includes Multiple Answering Machine Data Storage Area 206626b and Multiple Answering Machine Software Storage Area 206626c. Multiple Answering Machine Data Storage Area 206626b stores the data necessary to implement the present function on the side of Communication Device 200, such as the one(s) described hereinafter. Multiple Answering Machine Software Storage Area 206626c stores the software program(s) necessary to implement the present function on the side of Communication Device 200, such as the one(s) described hereinafter.

This paragraph illustrates the storage area(s) included in Multiple Answering Machine Data Storage Area 206626b. In this embodiment, Multiple Answering Machine Data Storage Area 206626b includes All Phone Number Data Storage Area 206626b1, All Auto Replying Audiovisual Data Storage Area 206626b2, All Caller's Message Data Storage Area 206626b3, Current Location Data Storage Area 206626b4, All Location Data Storage Area 206626b5, All Icon Data Storage Area 206626b6, Map Data Storage Area 206626b7, and Work Area 206626b8. All Phone Number Data Storage Area 206626b1 stores the data described hereinafter. All Auto Replying Audiovisual Data Storage Area 206626b2 stores the data described hereinafter. All Caller's Message Data Storage Area 206626b3 stores the data described hereinafter. Current Location Data Storage Area 206626b4 stores the current location data which indicates the current geographic location of Communication Device 200. All Location Data Storage Area 206626b5 stores the data described hereinafter. All Icon Data Storage Area 206626b6 stores the data described hereinafter. Map Data Storage Area 206626b7 stores the map data which is the image data indicating a map. Work Area 206626b8 is utilized as a work area to perform calculation and temporarily store data.

This paragraph illustrates the storage area(s) included in All Phone Number Data Storage Area 206626b1. In this embodiment, All Phone Number Data Storage Area 206626b1 includes 1st Phone Number Data Storage Area 206626b1a and 2nd Phone Number Data Storage Area 206626b1b. 1st Phone Number Data Storage Area 206626b1a stores the 1st phone number data which is the phone number owned by the user of Communication Device 200. 2nd Phone Number Data Storage Area 206626b1b stores the 2nd phone number data which is another phone number owned by the user of Communication Device 200.

This paragraph illustrates the storage area(s) included in All Auto Replying Audiovisual Data Storage Area 206626b2. In this embodiment, All Auto Replying Audiovisual Data Storage Area 206626b2 includes 1st Auto Replying Audiovisual Data Storage Area 206626b2a and 2nd Auto Replying Audiovisual Data Storage Area 206626b2b. 1st Auto Replying Audiovisual Data Storage Area 206626b2a stores the 1st auto replying audiovisual data which is the audiovisual data output from the caller's device when the user of Communication Device 200 does not answer the call made to the 1st phone number data. 2nd Auto Replying Audiovisual Data Storage Area 206626b2b stores the 2nd auto replying audiovisual data which is the audiovisual data output from the caller's device when the user of Communication Device 200 does not answer the call made to the 2nd phone number data.

This paragraph illustrates the storage area(s) included in All Caller's Message Data Storage Area 206626b3. In this embodiment, All Caller's Message Data Storage Area 206626b3 includes 1st Caller's Message Data Storage Area 206626b3a and 2nd Caller's Message Data Storage Area 206626b3b. 1st Caller's Message Data Storage Area 206626b3a stores the 1st caller's message data which is the audiovisual data indicating the message left by the caller who made the call to the 1st phone number data. 2nd Caller's Message Data Storage Area 206626b3b stores the 2nd caller's message data which is the audiovisual data indicating the message left by the caller who made the call to the 2nd phone number data.

This paragraph illustrates the storage area(s) included in All Location Data Storage Area 206626b5. In this embodiment, All Location Data Storage Area 206626b5 includes 1st Caller's Location Data Storage Area 206626b5a, 1st Callee's Location Data Storage Area 206626b5b, 2nd Caller's Location Data Storage Area 206626b5c, and 2nd Callee's Location Data Storage Area 206626b5d. 1st Caller's Location Data Storage Area 206626b5a stores the 1st caller's location data which indicates the geographic location of the caller at the time the call was made to the 1st phone number data. 1st Callee's Location Data Storage Area 206626b5b stores the 1st callee's location data which indicates the geographic location of the callee, the user of Communication Device 200, at the time the call was made to the 1st phone number data. 2nd Caller's Location Data Storage Area 206626b5c stores the 2nd caller's location data which indicates the geographic location of the caller at the time the call was made to the 2nd phone number data. 2nd Callee's Location Data Storage Area 206626b5d stores the 2nd callee's location data which indicates the geographic location of the callee, the user of Communication Device 200, at the time the call was made to the 2nd phone number data.

This paragraph illustrates the storage area(s) included in All Icon Data Storage Area 206626b6. In this embodiment, All Icon Data Storage Area 206626b6 includes 1st Caller's Icon Data Storage Area 206626b6a, 1st Callee's Icon Data Storage Area 206626b6b, 2nd Caller's Icon Data Storage Area 206626b6c, and 2nd Callee's Icon Data Storage Area 206626b6d. 1st Caller's Icon Data Storage Area 206626b6a stores the 1st caller's icon data which is the image of the icon utilized to indicate the 1st caller's location data on the map data. 1st Callee's Icon Data Storage Area 206626b6b stores the 1st callee's icon data which is the image of the icon utilized to indicate the 1st callee's location data on the map data. 2nd Caller's Icon Data Storage Area 206626b6c stores the 2nd caller's icon data which is the image of the icon utilized to indicate the 2nd caller's location data on the map data. 2nd Callee's Icon Data Storage Area 206626b6d stores the 2nd callee's icon data which is the image of the icon utilized to indicate the 2nd callee's location data on the map data.

This paragraph illustrates the software program(s) stored in Multiple Answering Machine Software Storage Area 206626c. In this embodiment, Multiple Answering Machine Software Storage Area 206626c stores 1st Auto Replying Audiovisual Data Producing Software 206626c1, 2nd Auto Replying Audiovisual Data Producing Software 206626c2, Current Location Data Producing Software 206626c3, 1st Caller's Message Data Producing Software 206626c4, 1st Caller's Location Data Producing Software 206626c5, 1st Callee's Location Data Producing Software 206626c6, 2nd Caller's Message Data Producing Software 206626c7, 2nd Caller's Location Data Producing Software 206626c8, 2nd Callee's Location Data Producing Software 206626c9, 1st Caller's Message Data Replaying Software 206626c10, and 2nd Caller's Message Data Replaying Software 206626c11. 1st Auto Replying Audiovisual Data Producing Software 206626c1 is the software program described hereinafter. 2nd Auto Replying Audiovisual Data Producing Software 206626c2 is the software program described hereinafter. Current Location Data Producing Software 206626c3 is the software program described hereinafter. 1st Caller's Message Data Producing Software 206626c4 is the software program described hereinafter. 1st Caller's Location Data Producing Software 206626c5 is the software program described hereinafter. 1st Callee's Location Data Producing Software 206626c6 is the software program described hereinafter. 2nd Caller's Message Data Producing Software 206626c7 is the software program described hereinafter. 2nd Caller's Location Data Producing Software 206626c8 is the software program described hereinafter. 2nd Callee's Location Data Producing Software 206626c9 is the software program described hereinafter. 1st Caller's Message Data Replaying Software 206626c10 is the software program described hereinafter. 2nd Caller's Message Data Replaying Software 206626c11 is the software program described hereinafter.

This paragraph illustrate(s) 1st Auto Replying Audiovisual Data Producing Software H626c1 of Host H and 1st Auto Replying Audiovisual Data Producing Software 206626c1 of Communication Device 200, which produce(s) the 1st auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 1st auto replying audiovisual data by utilizing the audiovisual data retrieved in the previous step and sends the data to Host H in a wireless fashion (S2). Host H receives the 1st auto replying audiovisual data from Communication Device 200 and stores the data in 1st Auto Replying Audiovisual Data Storage Area H626b2a (S3).

This paragraph illustrate(s) 2nd Auto Replying Audiovisual Data Producing Software H626c2 of Host H and 2nd Auto Replying Audiovisual Data Producing Software 206626c2 of Communication Device 200, which produce(s) the 2nd auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 2nd auto replying audiovisual data by utilizing the audiovisual data retrieved in the previous step and sends the data to Host H in a wireless fashion (S2). Host H receives the 2nd auto replying audiovisual data from Communication Device 200 and stores the data in 2nd Auto Replying Audiovisual Data Storage Area H626b2b (S3).

This paragraph illustrate(s) Current Location Data Producing Software H626c3 of Host H and Current Location Data Producing Software 206626c3 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H626b4 (S3). The foregoing sequence is repeated periodically.

This paragraph illustrate(s) 1st Caller's Message Data Producing Software H626c4 of Host H, which produce(s) the 1st caller's message data. In this embodiment, Host H retrieves the 1st phone number data from 1st Phone Number Data Storage Area H626b1a (S1). Host H periodically checks the incoming signal (S2). If a call to the 1st phone number data is detected, Host H proceeds to the next step (S3). If a call to the 1st phone number data is not answered by Communication Device 200 for a certain period of time, Host H proceeds to the next step (S4). Host H retrieves the 1st auto replying audiovisual data from 1st Auto Replying Audiovisual Data Storage Area H626b2a and sends the data to the caller's device (S5). Here, the 1st auto replying audiovisual data is output from the caller's device, and the caller inputs the 1st caller's message data in response. The caller's device transfers the 1st caller's message data to Host H. Host H receives the 1st caller's message data from the caller's device (S6). Host H stores the 1st caller's message data received in the previous step in 1st Caller's Message Data Storage Area H626b3a (S7). The foregoing sequence is repeated periodically.

This paragraph illustrate(s) 1st Caller's Location Data Producing Software H626c5 of Host H, which produce(s) the 1st caller's location data. In this embodiment, Host H retrieves the 1st phone number data from 1st Phone Number Data Storage Area H626b1a (S1). Host H periodically checks the incoming signal (S2). If a call to the 1st phone number data is detected, Host H proceeds to the next step (S3). If a call to the 1st phone number data is not answered by Communication Device 200 for a certain period of time, Host H proceeds to the next step (S4). Host H sends the 1st caller's location data transferring request to the caller's device (S5). Here, the 1st caller's location data transferring request is the request to transfer the 1st caller's location data, and the caller's device transfers the 1st caller's location data to Host H in response. Host H receives the 1st caller's location data from the caller's device (S6). Host H stores the 1st caller's location data received in the previous step in 1st Caller's Location Data Storage Area H626b5a (S7). The foregoing sequence is repeated periodically.

This paragraph illustrate(s) 1st Callee's Location Data Producing Software H626c6 of Host H, which produce(s) the 1st callee's location data. In this embodiment, Host H retrieves the 1st phone number data from 1st Phone Number Data Storage Area H626b1a (S1). Host H periodically checks the incoming signal (S2). If a call to the 1st phone number data is detected, Host H proceeds to the next step (S3). If a call to the 1st phone number data is not answered by Communication Device 200 for a certain period of time, Host H proceeds to the next step (S4). Host H retrieves the current location data from Current Location Data Storage Area H626b4 (S5). Host H stores the current location data retrieved in the previous step as the 1st callee's location data in 1st Callee's Location Data Storage Area H626b5b (S6). The foregoing sequence is repeated periodically.

This paragraph illustrate(s) 2nd Caller's Message Data Producing Software H626c7 of Host H, which produce(s) the 2nd caller's message data. In this embodiment Host H retrieves the 2nd phone number data from 2nd Phone Number Data Storage Area H626b1b (S1). Host H periodically checks the incoming signal (S2). If a call to the 2nd phone number data is detected, Host H proceeds to the next step (S3). If a call to the 2nd phone number data is not answered by Communication Device 200 for a certain period of time, Host H proceeds to the next step (S4). Host H retrieves the 2nd auto replying audiovisual data from 2nd Auto Replying Audiovisual Data Storage Area H626b2b and sends the data to the caller's device (S5). Here, the 2nd auto replying audiovisual data is output from the caller's device, and the caller inputs the 2nd caller's message data in response. The caller's device transfers the 2nd caller's message data to Host H. Host H receives the 2nd caller's message data from the caller's device (S6). Host H stores the 2nd caller's message data received in the previous step in 2nd Caller's Message Data Storage Area H626b3b (S7). The foregoing sequence is repeated periodically.

This paragraph illustrate(s) 2nd Caller's Location Data Producing Software H626c8 of Host H, which produce(s) the 2nd caller's location data. In this embodiment, Host H retrieves the 2nd phone number data from 2nd Phone Number Data Storage Area H626b1b (S1). Host H periodically checks the incoming signal (S2). If a call to the 2nd phone number data is detected, Host H proceeds to the next step (S3). If a call to the 2nd phone number data is not answered by Communication Device 200 for a certain period of time, Host H proceeds to the next step (S4). Host H sends the 2nd caller's location data transferring request to the caller's device (S5). Here, the 2nd caller's location data transferring request is the request to transfer the 2nd caller's location data, and the caller's device transfers the 2nd caller's location data to Host H in response. Host H receives the 2nd caller's location data from the caller's device (S6). Host H stores the 2nd caller's location data received in the previous step in 2nd Caller's Location Data Storage Area H626b5c (S7). The foregoing sequence is repeated periodically.

This paragraph illustrate(s) 2nd Callee's Location Data Producing Software H626c9 of Host H, which produce(s) the 2nd callee's location data. In this embodiment, Host H retrieves the 2nd phone number data from 2nd Phone Number Data Storage Area H626b1b (S1). Host H periodically checks the incoming signal (S2). If a call to the 2nd phone number data is detected, Host H proceeds to the next step (S3). If a call to the 2nd phone number data is not answered by Communication Device 200 for a certain period of time, Host H proceeds to the next step (S4). Host H retrieves the current location data from Current Location Data Storage Area H626b4 (S5). Host H stores the current location data retrieved in the previous step as the 2nd callee's location data in 2nd Callee's Location Data Storage Area H626b5d (S6). The foregoing sequence is repeated periodically.

This paragraph illustrate(s) 1st Caller's Message Data Replaying Software H626c10 of Host H and 1st Caller's Message Data Replaying Software 206626c10 of Communication Device 200, which replay(s) the 1st caller's message data. In this embodiment, Host H retrieves the 1st caller's message data from 1st Caller's Message Data Storage Area H626b3a and sends the data to Communication Device 200 (S1). CPU 211 (FIG. 1) receives the 1st caller's message data from Host H in a wireless fashion and outputs the data from Speaker 216 (FIG. 1) and LCD 201 (FIG. 1) (S2). Host H retrieves the map data from Map Data Storage Area H626b7 and sends the data to Communication Device 200 (S3). CPU 211 (FIG. 1) receives the map data from Host H in a wireless fashion and displays the data on LCD 201 (FIG. 1) (S4). Host H retrieves the 1st caller's location data from 1st Caller's Location Data Storage Area H626b5a and sends the data to Communication Device 200 (S5). CPU 211 (FIG. 1) receives the 1st caller's location data from Host H in a wireless fashion (S6). Host H retrieves the 1st caller's icon data from 1st Caller's Icon Data Storage Area H626b6a and sends the data to Communication Device 200 (S7). CPU 211 (FIG. 1) receives the 1st caller's icon data from Host H in a wireless fashion (S8). CPU 211 (FIG. 1) displays the 1st caller's icon data received in the previous step at the location corresponding to the 1st caller's location data received in S6 on the map data displayed on S4 (S9). Host H retrieves the 1st callee's location data from 1st Callee's Location Data Storage Area H626b5b and sends the data to Communication Device 200 (S10). CPU 211 (FIG. 1) receives the 1st callee's location data from Host H in a wireless fashion (S11). Host H retrieves the 1st callee's icon data from 1st Callee's Icon Data Storage Area H626b6b and sends the data to Communication Device 200 (S12). CPU 211 (FIG. 1) receives the 1st callee's icon data from Host H in a wireless fashion (S13). CPU 211 (FIG. 1) displays the 1st callee's icon data received in the previous step at the location corresponding to the 1st callee's location data received in S11 on the map data displayed on S4 (S14).

This paragraph illustrate(s) 2nd Caller's Message Data Replaying Software H626c11 of Host H and 2nd Caller's Message Data Replaying Software 206626c11 of Communication Device 200, which replay(s) the 2nd caller's message data. In this embodiment, Host H retrieves the 2nd caller's message data from 2nd Caller's Message Data Storage Area H626b3b and sends the data to Communication Device 200 (S1). CPU 211 (FIG. 1) receives the 2nd caller's message data from Host H in a wireless fashion and outputs the data from Speaker 216 (FIG. 1) and LCD 201 (FIG. 1) (S2). Host H retrieves the map data from Map Data Storage Area H626b7 and sends the data to Communication Device 200 (S3). CPU 211 (FIG. 1) receives the map data from Host H in a wireless fashion and displays the data on LCD 201 (FIG. 1) (S4). Host H retrieves the 2nd caller's location data from 2nd Caller's Location Data Storage Area H626b5c and sends the data to Communication Device 200 (S5). CPU 211 (FIG. 1) receives the 2nd caller's location data from Host H in a wireless fashion (S6). Host H retrieves the 2nd caller's icon data from 2nd Caller's Icon Data Storage Area H626b6c and sends the data to Communication Device 200 (S7). CPU 211 (FIG. 1) receives the 2nd caller's icon data from Host H in a wireless fashion (S8). CPU 211 (FIG. 1) displays the 2nd caller's icon data received in the previous step at the location corresponding to the 2nd caller's location data received in S6 on the map data displayed on S4 (S9). Host H retrieves the 2nd callee's location data from 2nd Callee's Location Data Storage Area H626b5d and sends the data to Communication Device 200 (S10). CPU 211 (FIG. 1) receives the 2nd callee's location data from Host H in a wireless fashion (S11). Host H retrieves the 2nd callee's icon data from 2nd Callee's Icon Data Storage Area H626b6d and sends the data to Communication Device 200 (S12). CPU 211 (FIG. 1) receives the 2nd callee's icon data from Host H in a wireless fashion (S13). CPU 211 (FIG. 1) displays the 2nd callee's icon data received in the previous step at the location corresponding to the 2nd callee's location data received in S11 on the map data displayed on S4 (S14).

The following paragraphs illustrate another embodiment wherein Communication Device 200 plays the major role in implementing the present function.

This paragraph illustrate(s) 1st Auto Replying Audiovisual Data Producing Software 206626c1 of Communication Device 200, which produce(s) the 1st auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 1st auto replying audiovisual data by utilizing the audiovisual data retrieved in the previous step (S2). CPU 211 (FIG. 1) stores the 1st auto replying audiovisual data produced in the previous step in 1st Auto Replying Audiovisual Data Storage Area 206626b2a (S3).

This paragraph illustrate(s) 1st Auto Replying Audiovisual Data Producing Software 206626c1 of Communication Device 200, which produce(s) the 1st auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 1st auto replying audiovisual data by utilizing the audiovisual data retrieved in the previous step (S2). CPU 211 (FIG. 1) stores the 1st auto replying audiovisual data produced in the previous step in 1st Auto Replying Audiovisual Data Storage Area 206626b2a (S3).

This paragraph illustrate(s) Current Location Data Producing Software 206626c3 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206626b4 (S3). The foregoing sequence is repeated periodically.

This paragraph illustrate(s) 1st Caller's Message Data Producing Software 206626c4 of Communication Device 200, which produce(s) the 1st caller's message data. In this embodiment, CPU 211 (FIG. 1) retrieves the 1st phone number data from 1st Phone Number Data Storage Area 206626b1a (S1). CPU 211 (FIG. 1) periodically checks the incoming signal (S2). If a call to the 1st phone number data is detected, CPU 211 (FIG. 1) proceeds to the next step (S3). If a call to the 1st phone number data is not answered by Communication Device 200 for a certain period of time, CPU 211 (FIG. 1) proceeds to the next step (S4). CPU 211 (FIG. 1) retrieves the 1st auto replying audiovisual data from 1st Auto Replying Audiovisual Data Storage Area 206626b2a and sends the data to the caller's device in a wireless fashion (S5). Here, the 1st auto replying audiovisual data is output from the caller's device, and the caller inputs the 1st caller's message data in response. The caller's device transfers the 1st caller's message data to Communication Device 200. CPU 211 (FIG. 1) receives the 1st caller's message data from the caller's device in a wireless fashion (S6). CPU 211 (FIG. 1) stores the 1st caller's message data received in the previous step in 1st Caller's Message Data Storage Area 206626b3a (S7). The foregoing sequence is repeated periodically.

This paragraph illustrate(s) 1st Caller's Location Data Producing Software 206626c5 of Communication Device 200, which produce(s) the 1st caller's location data. In this embodiment, CPU 211 (FIG. 1) retrieves the 1st phone number data from 1st Phone Number Data Storage Area 206626b1a (S1). CPU 211 (FIG. 1) periodically checks the incoming signal (S2). If a call to the 1st phone number data is detected, CPU 211 (FIG. 1) proceeds to the next step (S3). If a call to the 1st phone number data is not answered by Communication Device 200 for a certain period of time, CPU 211 (FIG. 1) proceeds to the next step (S4). CPU 211 (FIG. 1) sends the 1st caller's location data transferring request to the caller's device in a wireless fashion (S5). Here, the 1st caller's location data transferring request is the request to transfer the 1st caller's location data, and the caller's device transfers the 1st caller's location data to Communication Device 200 in response. CPU 211 (FIG. 1) receives the 1st caller's location data from the caller's device in a wireless fashion (S6). CPU 211 (FIG. 1) stores the 1st caller's location data received in the previous step in 1st Caller's Location Data Storage Area 206626b5a (S7). The foregoing sequence is repeated periodically.

This paragraph illustrate(s) 1st Callee's Location Data Producing Software 206626c6 of Communication Device 200, which produce(s) the 1st callee's location data. In this embodiment, CPU 211 (FIG. 1) retrieves the 1st phone number data from 1st Phone Number Data Storage Area 206626b1a (S1). CPU 211 (FIG. 1) periodically checks the incoming signal (S2). If a call to the 1st phone number data is detected, CPU 211 (FIG. 1) proceeds to the next step (S3). If a call to the 1st phone number data is not answered by Communication Device 200 for a certain period of time, CPU 211 (FIG. 1) proceeds to the next step (S4). CPU 211 (FIG. 1) retrieves the current location data from Current Location Data Storage Area 206626b4 (S5). CPU 211 (FIG. 1) stores the current location data retrieved in the previous step as the 1st callee's location data in 1st Callee's Location Data Storage Area 206626b5b (S6). The foregoing sequence is repeated periodically.

This paragraph illustrate(s) 2nd Caller's Message Data Producing Software 206626c7 of Communication Device 200, which produce(s) the 2nd caller's message data. In this embodiment, CPU 211 (FIG. 1) retrieves the 2nd phone number data from 2nd Phone Number Data Storage Area 206626b1b (S1). CPU 211 (FIG. 1) periodically checks the incoming signal (S2). If a call to the 2nd phone number data is detected, CPU 211 (FIG. 1) proceeds to the next step (S3).

If a call to the 2nd phone number data is not answered for a certain period of time, CPU 211 (FIG. 1) proceeds to the next step (S4). CPU 211 (FIG. 1) retrieves the 2nd auto replying audiovisual data from 2nd Auto Replying Audiovisual Data Storage Area 206626b2b and sends the data to the caller's device in a wireless fashion (S5). Here, the 2nd auto replying audiovisual data is output from the caller's device, and the caller inputs the 2nd caller's message data in response. The caller's device transfers the 2nd caller's message data to Communication Device 200. CPU 211 (FIG. 1) receives the 2nd caller's message data from the caller's device in a wireless fashion (S6). CPU 211 (FIG. 1) stores the 2nd caller's message data received in the previous step in 2nd Caller's Message Data Storage Area 206626b3b (S7). The foregoing sequence is repeated periodically.

This paragraph illustrate(s) 2nd Caller's Location Data Producing Software 206626c8 of Communication Device 200, which produce(s) the 2nd caller's location data. In this embodiment, CPU 211 (FIG. 1) retrieves the 2nd phone number data from 2nd Phone Number Data Storage Area 206626b1b (S1). CPU 211 (FIG. 1) periodically checks the incoming signal (S2). If a call to the 2nd phone number data is detected, CPU 211 (FIG. 1) proceeds to the next step (S3). If a call to the 2nd phone number data is not answered for a certain period of time, CPU 211 (FIG. 1) proceeds to the next step (S4). CPU 211 (FIG. 1) sends the 2nd caller's location data transferring request to the caller's device in a wireless fashion (S5). Here, the 2nd caller's location data transferring request is the request to transfer the 2nd caller's location data, and the caller's device transfers the 2nd caller's location data to Communication Device 200 in response. CPU 211 (FIG. 1) receives the 2nd caller's location data from the caller's device in a wireless fashion (S6). CPU 211 (FIG. 1) stores the 2nd caller's location data received in the previous step in 2nd Caller's Location Data Storage Area 206626b5c (S7). The foregoing sequence is repeated periodically.

This paragraph illustrate(s) 2nd Callee's Location Data Producing Software 206626c9 of Communication Device 200, which produce(s) the 2nd callee's location data. In this embodiment, CPU 211 (FIG. 1) retrieves the 2nd phone number data from 2nd Phone Number Data Storage Area 206626b1b (S1). CPU 211 (FIG. 1) periodically checks the incoming signal (S2). If a call to the 2nd phone number data is detected, CPU 211 (FIG. 1) proceeds to the next step (S3). If a call to the 2nd phone number data is not answered for a certain period of time, CPU 211 (FIG. 1) proceeds to the next step (S4). CPU 211 (FIG. 1) retrieves the current location data from Current Location Data Storage Area 206626b4 (S5). CPU 211 (FIG. 1) stores the current location data retrieved in the previous step as the 2nd callee's location data in 2nd Callee's Location Data Storage Area 206626b5d (S6). The foregoing sequence is repeated periodically.

This paragraph illustrate(s) 1st Caller's Message Data Replaying Software 206626c10 of Communication Device 200, which replay(s) the 1st caller's message data. In this embodiment, CPU 211 (FIG. 1) retrieves the 1st caller's message data from 1st Caller's Message Data Storage Area 206626b3a (S1). CPU 211 (FIG. 1) outputs the 1st caller's message data retrieved in the previous step from Speaker 216 (FIG. 1) and LCD 201 (FIG. 1) (S2). CPU 211 (FIG. 1) retrieves the map data from Map Data Storage Area 206626b7 (S3). CPU 211 (FIG. 1) displays the map data retrieved in the previous step on LCD 201 (FIG. 1) (S4). CPU 211 (FIG. 1) retrieves the 1st caller's location data from 1st Caller's Location Data Storage Area 206626b5a (S5). CPU 211 (FIG. 1) retrieves the 1st caller's icon data from 1st Caller's Icon Data Storage Area 206626b6a (S6). CPU 211 (FIG. 1) displays the 1st caller's icon data retrieved in the previous step at the location corresponding to the 1st caller's location data retrieved in S5 on the map data displayed on S4 (S7). CPU 211 (FIG. 1) retrieves the 1st callee's location data from 1st Callee's Location Data Storage Area 206626b5b (S8). CPU 211 FIG. 1) retrieves the 1st callee's icon data from 1st Callee's Icon Data Storage Area 206626b6b (S9). CPU 211 (FIG. 1) displays the 1st callee's icon data retrieved in the previous step at the location corresponding to the 1st callee's location data retrieved in S8 on the map data displayed on S4 (S10).

This paragraph illustrate(s) 2nd Caller's Message Data Replaying Software 206626c11 of Communication Device 200, which replay(s) the 2nd caller's message data. In this embodiment, CPU 211 (FIG. 1) retrieves the 2nd caller's message data from 2nd Caller's Message Data Storage Area 206626b3b (S1). CPU 211 (FIG. 1) outputs the 2nd caller's message data retrieved in the previous step from Speaker 216 (FIG. 1) and LCD 201 (FIG. 1) (S2). CPU 211 (FIG. 1) retrieves the map data from Map Data Storage Area 206626b7 (S3). CPU 211 (FIG. 1) displays the map data retrieved in the previous step on LCD 201 (FIG. 1) (S4). CPU 211 (FIG. 1) retrieves the 2nd caller's location data from 2nd Caller's Location Data Storage Area 206626b5c (S5). CPU 211 (FIG. 1) retrieves the 2nd caller's icon data from 2nd Caller's Icon Data Storage Area 206626b6c (S6). CPU 211 (FIG. 1) displays the 2nd caller's icon data retrieved in the previous step at the location corresponding to the 2nd caller's location data retrieved in S5 on the map data displayed on S4 (S7). CPU 211 (FIG. 1) retrieves the 2nd callee's location data from 2nd Callee's Location Data Storage Area 206626b5d (S8). CPU 211 (FIG. 1) retrieves the 2nd callee's icon data from 2nd Callee's Icon Data Storage Area 206626b6d (S9). CPU 211 (FIG. 1) displays the 2nd callee's icon data retrieved in the previous step at the location corresponding to the 2nd callee's location data retrieved in S8 on the map data displayed on S4 (S10).

<<Time Dependent Answering Machine Function>>

The following paragraphs illustrate the time dependent answering machine mode implementor, wherein when said communication device receives a phone call and said phone call is not answered and if the current time is within a 1st time frame, a 1st auto replying message is output from the caller's device, and if the current time is within a 2nd time frame, a 2nd auto replying message is output from the caller's device.

This paragraph illustrates the storage area included in Host H. In this embodiment, Host H includes Time Dependent Answering Machine Information Storage Area H627a of which the data and the software program(s) stored therein are described hereinafter.

This paragraph illustrates the storage area(s) included in Time Dependent Answering Machine Information Storage Area H627a. In this embodiment, Time Dependent Answering Machine Information Storage Area H627a includes Time Dependent Answering Machine Data Storage Area H627b and Time Dependent Answering Machine Software Storage Area H627c. Time Dependent Answering Machine Data Storage Area H627b stores the data necessary to implement the present function on the side of Host H, such as the one(s) described hereinafter. Time Dependent Answering Machine Software Storage Area H627c stores the software program(s) necessary to implement the present function on the side of Host H, such as the one(s) described hereinafter.

This paragraph illustrates the storage area(s) included in Time Dependent Answering Machine Data Storage Area H627b. In this embodiment, Time Dependent Answering Machine Data Storage Area H627b includes 1st Auto Replying Audiovisual Data Storage Area H627b1, 2nd Auto Replying Audiovisual Data Storage Area H627b2, 1st Auto Replying Time Data Storage Area H627b3, 2nd Auto Replying Time Data Storage Area H627b4, Caller's Message Data Storage Area H627b5, Current Location Data Storage Area H627b6, Caller's Location Data Storage Area H627b7, Callee's Location Data Storage Area H627b8, Map Data Storage Area H627b9, Caller's Icon Data Storage Area H627b10, Callee's Icon Data Storage Area H627b11, and Work Area H627b12. 1st Auto Replying Audiovisual Data Storage Area H627b1 stores the 1st auto replying audiovisual data which is the audiovisual data output from the caller's device when the user of Communication Device 200 does not answer the call. 2nd Auto Replying Audiovisual Data Storage Area H627b2stores the 2nd auto replying audiovisual data which is another audiovisual data output from the caller's device when the user of Communication Device 200 does not answer the call. 1st Auto Replying Time Data Storage Area H627b3 stores the 1st auto replying time data which indicates the time (e.g., 8:00am) from which the 1st auto replying audiovisual data is utilized for auto reply. 2nd Auto Replying Time Data Storage Area H627b4 stores the 2nd auto replying time data which indicates the time (e.g., 6:00pm) from which the 2nd auto replying audiovisual data is utilized for auto reply. Caller's Message Data Storage Area H627b5 stores the caller's message data which is the audiovisual data indicating the message left by the caller. Current Location Data Storage Area H627b6 stores the current location data which indicates the current geographic location of Communication Device 200 in (x,y,z) format. Caller's Location Data Storage Area H627b7 stores the caller's location data which indicates the geographic location of the caller at the time the call was made in (x,y,z) format. Callee's Location Data Storage Area H627b8 stores the callee's location data which indicates the geographic location of the callee, the user of Communication Device 200, at the time the call was made in (x,y,z) format. Map Data Storage Area H627b9 stores the map data which is the image data indicating a map. Caller's Icon Data Storage Area H627b10 stores the caller's icon data which is the image of the icon utilized to indicate the caller's location data on the map data. Callee's Icon Data Storage Area H627b11 stores the callee's icon data which is the image of the icon utilized to indicate the callee's location data on the map data. Work Area H627b12 is utilized as a work area to perform calculation and temporarily store data.

This paragraph illustrates the software program(s) stored in Time Dependent Answering Machine Software Storage Area H627c. In this embodiment, Time Dependent Answering Machine Software Storage Area H627c stores 1st Auto Replying Audiovisual Data Producing Software H627c1, 2nd Auto Replying Audiovisual Data Producing Software H627c2, 1st Auto Replying Time Data Producing Software H627c3, 2nd Auto Replying Time Data Producing Software H627c4, Current Location Data Producing Software H627c5, 1st Auto Replying Audiovisual Data Sending Software H627c6, 2nd Auto Replying Audiovisual Data Sending Software H627c7, Caller's Location Data Producing Software H627c8, Callee's Location Data Producing Software H627c9, and Caller's Message Data Replaying Software H627c10. 1st Auto Replying Audiovisual Data Producing Software H627c1 is the software program described hereinafter. 2nd Auto Replying Audiovisual Data Producing Software H627c2 is the software program described hereinafter. 1st Auto Replying Time Data Producing Software H627c3 is the software program described hereinafter. 2nd Auto Replying Time Data Producing Software H627c4 is the software program described hereinafter. Current Location Data Producing Software H627c5 is the software program described hereinafter. 1st Auto Replying Audiovisual Data Sending Software H627c6 is the software program described hereinafter. 2nd Auto Replying Audiovisual Data Sending Software H627c7 is the software program described hereinafter. Caller's Location Data Producing Software H627c8 is the software program described hereinafter. Callee's Location Data Producing Software H627c9 is the software program described hereinafter. Caller's Message Data Replaying Software H627c10 is the software program described hereinafter.

This paragraph illustrates the storage area included in RAM 206 (FIG. 1) of Communication Device 200. In this embodiment, RAM 206 includes Time Dependent Answering Machine Information Storage Area 206627a of which the data and the software program(s) stored therein are described hereinafter.

The data and/or the software program(s) necessary to implement the present function may be downloaded from Host H to Communication Device 200.

This paragraph illustrates the storage area(s) included in Time Dependent Answering Machine Information Storage Area 206627a. In this embodiment, Time Dependent Answering Machine Information Storage Area 206627a includes Time Dependent Answering Machine Data Storage Area 206627b and Time Dependent Answering Machine Software Storage Area 206627c. Time Dependent Answering Machine Data Storage Area 206627b stores the data necessary to implement the present function on the side of Communication Device 200, such as the one(s) described hereinafter. Time Dependent Answering Machine Software Storage Area 206627c stores the software program(s) necessary to implement the present function on the side of Communication Device 200, such as the one(s) described hereinafter.

This paragraph illustrates the storage area(s) included in Time Dependent Answering Machine Data Storage Area 206627b. In this embodiment, Time Dependent Answering Machine Data Storage Area 206627b includes 1st Auto Replying Audiovisual Data Storage Area 206627b1, 2nd Auto Replying Audiovisual Data Storage Area 206627b2, 1st Auto Replying Time Data Storage Area 206627b3, 2nd Auto Replying Time Data Storage Area 206627b4, Caller's Message Data Storage Area 206627b5, Current Location Data Storage Area 206627b6, Caller's Location Data Storage Area 206627b7, Callee's Location Data Storage Area 206627b8, Map Data Storage Area 206627b9, Caller's Icon Data Storage Area 206627b10, Callee's Icon Data Storage Area 206627b11, and Work Area 206627b12. 1st Auto Replying Audiovisual Data Storage Area 206627b1 stores the 1st auto replying audiovisual data which is the audiovisual data output from the caller's device when the user of Communication Device 200 does not answer the call. 2nd Auto Replying Audiovisual Data Storage Area 206627b2 stores the 2nd auto replying audiovisual data which is another audiovisual data output from the caller's device when the user of Communication Device 200 does not answer the call. 1st Auto Replying Time Data Storage Area 206627b3 stores the 1st auto replying time data which indicates the time (e.g., 8:00am) from which the 1st auto replying audiovisual data is utilized for auto reply. 2nd Auto Replying Time Data Storage Area 206627b4 stores the 2nd auto replying time data which indicates the time (e.g., 6:00pm) from which the 2nd auto replying audiovisual data is utilized for auto reply. Caller's Message Data Storage Area 206627b5 stores the caller's message data which is the audiovisual data indicating the message left by the caller. Current Location Data Storage Area 206627b6 stores the current location data which indicates the current geographic location of Communication Device 200 in (x,y,z) format. Caller's Location Data Storage Area 206627b7 stores the caller's location data which indicates the geographic location of the caller at the time the call was made in (x,y,z) format. Callee's Location Data Storage Area 206627b8 stores the callee's location data which indicates the geographic location of the callee, the user of Communication Device 200, at the time the call was made in (x,y,z) format. Map Data Storage Area 206627b9 stores the map data which is the image data indicating a map. Caller's Icon Data Storage Area 206627b10 stores the caller's icon data which is the image of the icon utilized to indicate the caller's location data on the map data. Callee's Icon Data Storage Area 206627b11 stores the callee's icon data which is the image of the icon utilized to indicate the callee's location data on the map data. Work Area 206627b12 is utilized as a work area to perform calculation and temporarily store data.

This paragraph illustrates the software program(s) stored in Time Dependent Answering Machine Software Storage Area 206627c. In this embodiment, Time Dependent Answering Machine Software Storage Area 206627c stores 1st Auto Replying Audiovisual Data Producing Software 206627c1, 2nd Auto Replying Audiovisual Data Producing Software 206627c2, 1st Auto Replying Time Data Producing Software 206627c3, 2nd Auto Replying Time Data Producing Software 206627c4, Current Location Data Producing Software 206627c5, 1st Auto Replying Audiovisual Data Sending Software 206627c6, 2nd Auto Replying Audiovisual Data Sending Software 206627c7, Caller's Location Data Producing Software 206627c8, Callee's Location Data Producing Software 206627c9, and Caller's Message Data Replaying Software 206627c10. 1st Auto Replying Audiovisual Data Producing Software 206627c1 is the software program described hereinafter. 2nd Auto Replying Audiovisual Data Producing Software 206627c2 is the software program described hereinafter. 1st Auto Replying Time Data Producing Software 206627c3 is the software program described hereinafter. 2nd Auto Replying Time Data Producing Software 206627c4 is the software program described hereinafter. Current Location Data Producing Software 206627c5 is the software program described hereinafter. 1st Auto Replying Audiovisual Data Sending Software 206627c6 is the software program described hereinafter. 2nd Auto Replying Audiovisual Data Sending Software 206627c7 is the software program described hereinafter. Caller's Location Data Producing Software 206627c8 is the software program described hereinafter. Callee's Location Data Producing Software 206627c9 is the software program described hereinafter. Caller's Message Data Replaying Software 206627c10 is the software program described hereinafter.

This paragraph illustrate(s) 1st Auto Replying Audiovisual Data Producing Software H627c1 of Host H and 1st Auto Replying Audiovisual Data Producing Software 206627c1 of Communication Device 200, which produce(s) the 1st auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 1st auto replying audiovisual data by utilizing the audiovisual data retrieved in the previous step and sends the data to Host H in a wireless fashion (S2). Host H receives the 1st auto replying audiovisual data from Communication Device 200 and stores the data in 1st Auto Replying Audiovisual Data Storage Area H627b1 (S3).

This paragraph illustrate(s) 2nd Auto Replying Audiovisual Data Producing Software H627c2 of Host H and 2nd Auto Replying Audiovisual Data Producing Software 206627c2 of Communication Device 200, which produce(s) the 2nd auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 2nd auto replying audiovisual data by utilizing the audiovisual data retrieved in the previous step and sends the data to Host H in a wireless fashion (S2). Host H receives the 2nd auto replying audiovisual data from Communication Device 200 and stores the data in 2nd Auto Replying Audiovisual Data Storage Area H627b2 (S3).

This paragraph illustrate(s) 1st Auto Replying Time Data Producing Software H627c3 of Host H and 1st Auto Replying Time Data Producing Software 206627c3 of Communication Device 200, which produce(s) the 1st auto replying time data. In this embodiment, the user of Communication Device 200 inputs, by utilizing Input Device 210 (FIG. 1) or via voice recognition system, a time (e.g., 8:00am) (S1). CPU 211 (FIG. 1) produces the 1st auto replying time data by referring to the time input in the previous step and sends the data to Host H in a wireless fashion (S2). Host H receives the 1st auto replying time data from Communication Device 200 and stores the data in 1st Auto Replying Time Data Storage Area H627b3 (S3).

This paragraph illustrate(s) 2nd Auto Replying Time Data Producing Software H627c4 of Host H and 2nd Auto Replying Time Data Producing Software 206627c4 of Communication Device 200, which produce(s) the 2nd auto replying time data. In this embodiment, the user of Communication Device 200 inputs, by utilizing Input Device 210 (FIG. 1) or via voice recognition system, a time (e.g., 6:00pm) (S1). CPU 211 (FIG. 1) produces the 2nd auto replying time data by referring to the time input in the previous step and sends the data to Host H in a wireless fashion (S2). Host H receives the 2nd auto replying time data from Communication Device 200 and stores the data in 2nd Auto Replying Time Data Storage Area H627b4 (S3).

This paragraph illustrate(s) Current Location Data Producing Software H627c5 of Host H and Current Location Data Producing Software 206627c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H627b6 (S3). The foregoing sequence is repeated periodically.

This paragraph illustrate(s) 1st Auto Replying Audiovisual Data Sending Software H627c6 of Host H, which send(s) the 1st auto replying audiovisual data. In this embodiment, Host H periodically checks the incoming signal (S1). If a call to Communication Device 200 is detected, Host H proceeds to the next step (S2). If a call to Communication Device 200 is not answered for a certain period of time, Host H proceeds to the next step (S3). Host H identifies the current time (S4). Host H retrieves the 1st auto replying time data from 1st Auto Replying Time Data Storage Area H627b3 (S5). Host H retrieves the 2nd auto replying time data from 2nd Auto Replying Time Data Storage Area H627b4 (S 6). If the current time identified in S4 is between the 1st auto replying time data retrieved in S5 and the 2nd auto replying time data retrieved in the previous step, Host H proceeds to the next step (S7).

Host H retrieves the 1st auto replying audiovisual data from 1st Auto Replying Audiovisual Data Storage Area H627b1 and sends the data to the caller's device (S8). Here, the 1st auto replying audiovisual data is output from the caller's device, and the caller inputs the caller's message data in response. The caller's device transfers the caller's message data to Communication Device 200. Host H receives the caller's message data from the caller's device (S9). Host H stores the caller's message data received in the previous step in Caller's Message Data Storage Area H627b5 (S10). The foregoing sequence is repeated periodically.

This paragraph illustrate(s) 1st Auto Replying Audiovisual Data Sending Software H627c6 of Host H, which send(s) the 1st auto replying audiovisual data. In this embodiment, Host H periodically checks the incoming signal (S1). If a call to Communication Device 200 is detected, Host H proceeds to the next step (S2). If a call to Communication Device 200 is not answered for a certain period of time, Host H proceeds to the next step (S3). Host H identifies the current time (S4). Host H retrieves the 1st auto replying time data from 1st Auto Replying Time Data Storage Area H627b3 (S5). Host H retrieves the 2nd auto replying time data from 2nd Auto Replying Time Data Storage Area H627b4 (S6). If the current time identified in S4 is between the 1st auto replying time data retrieved in S5 and the 2nd auto replying time data retrieved in the previous step, Host H proceeds to the next step (S7). Host H retrieves the 1st auto replying audiovisual data from 1st Auto Replying Audiovisual Data Storage Area H627b1 and sends the data to the caller's device (S8). Here, the 1st auto replying audiovisual data is output from the caller's device, and the caller inputs the caller's message data in response. The caller's device transfers the caller's message data to Communication Device 200. Host H receives the caller's message data from the caller's device (S9). Host H stores the caller's message data received in the previous step in Caller's Message Data Storage Area H627b5 (S10). The foregoing sequence is repeated periodically.

This paragraph illustrate(s) 2nd Auto Replying Audiovisual Data Sending Software H627c7 of Host H, which send(s) the 2nd auto replying audiovisual data. In this embodiment, Host H periodically checks the incoming signal (S1). If a call to Communication Device 200 is detected, Host H proceeds to the next step (S2). If a call to Communication Device 200 is not answered for a certain period of time, Host H proceeds to the next step (S3). Host H identifies the current time (S4). Host H retrieves the 1st auto replying time data from 1st Auto Replying Time Data Storage Area H627b3 (S5). Host H retrieves the 2nd auto replying time data from 2nd Auto Replying Time Data Storage Area H627b4 (S6). If the current time identified in S4 is not between the 1st auto replying time data retrieved in S5 and the 2nd auto replying time data retrieved in the previous step, Host H proceeds to the next step (S7). Host H retrieves the 2nd auto replying audiovisual data from 2nd Auto Replying Audiovisual Data Storage Area H627b2 and sends the data to the caller's device (S8). Here, the 2nd auto replying audiovisual data is output from the caller's device, and the caller inputs the caller's message data in response. The caller's device transfers the caller's message data to Communication Device 200. Host H receives the caller's message data from the caller's device (S9). Host H stores the caller's message data received in the previous step in Caller's Message Data Storage Area H627b5 (S10). The foregoing sequence is repeated periodically.

This paragraph illustrate(s) Caller's Location Data Producing Software H627c8 of Host H, which produce(s) the caller's location data. In this embodiment, Host H periodically checks the incoming signal (S1). If a call to Communication Device 200 is detected, Host H proceeds to the next step (S2). If a call to Communication Device 200 is not answered for a certain period of time, Host H proceeds to the next step (S3). Host H sends the caller's location data transferring request to the caller's device (S4). Here, the caller's location data transferring request is the request to transfer the caller's location data, and the caller's device transfers the caller's location data to Communication Device 200 in response. Host H receives the caller's location data from the caller's device (S5). Host H stores the caller's location data received in the previous step in Caller's Location Data Storage Area H627b7 (S6). The foregoing sequence is repeated periodically.

This paragraph illustrate(s) Callee's Location Data Producing Software H627c9 of Host H, which produce(s) the callee's location data. In this embodiment, Host H periodically checks the incoming signal (S1). If a call to Communication Device 200 is detected, Host H proceeds to the next step (S2). If a call to Communication Device 200 is not answered for a certain period of time, Host H proceeds to the next step (S3). Host H retrieves the current location data from Current Location Data Storage Area H627b6 (S4). Host H stores the current location data retrieved in the previous step as the callee's location data in Callee's Location Data Storage Area H627b8 (S5). The foregoing sequence is repeated periodically.

This paragraph illustrate(s) Caller's Message Data Replaying Software H627c10 of Host H and Caller's Message Data Replaying Software 206627c10 of Communication Device 200, which replay(s) the caller's message data. In this embodiment, Host H retrieves the caller's message data from Caller's Message Data Storage Area H627b5 and sends the data to Communication Device 200 (S1). CPU 211 (FIG. 1) receives the caller's message data from Host H in a wireless fashion and outputs the data from Speaker 216 (FIG. 1) and LCD 201 (FIG. 1) (S2). Host H retrieves the map data from Map Data Storage Area H627b9 and sends the data to Communication Device 200 (S3). CPU 211 (FIG. 1) receives the map data from Host H in a wireless fashion and displays the data on LCD 201 (FIG. 1) (S4). Host H retrieves the caller's location data from Caller's Location Data Storage Area H627b7 and sends the data to Communication Device 200 (S5). CPU 211 (FIG. 1) receives the caller's location data from Host H in a wireless fashion (S6). Host H retrieves the caller's icon data from Caller's Icon Data Storage Area H627b10 and sends the data to Communication Device 200 (S7). CPU 211 (FIG. 1) receives the caller's icon data from Host H in a wireless fashion (S8). CPU 211 (FIG. 1) displays the caller's icon data received in the previous step at the location corresponding to the caller's location data received in S6 on the map data displayed in S4 (S9). Host H retrieves the callee's location data from Callee's Location Data Storage Area H627b8 and sends the data to Communication Device 200 (S10). CPU 211 (FIG. 1) receives the callee's location data from Host H in a wireless fashion (S11). Host H retrieves the callee's icon data from Callee's Icon Data Storage Area H627b11 and sends the data to Communication Device 200 (S 12). CPU 211 (FIG. 1) receives the callee's icon data from Host H in a wireless fashion (S13). CPU 211 (FIG. 1) displays the callee's icon data received in the previous step at the location corresponding to the callee's location data received in S11 on the map data displayed in S4 (S14).

The following paragraphs illustrate another embodiment wherein Communication Device 200 plays the major role in implementing the present function.

This paragraph illustrate(s) 1st Auto Replying Audiovisual Data Producing Software 206627c1 of Communication Device 200, which produce(s) the 1st auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 1st auto replying audiovisual data by utilizing the audiovisual data retrieved in the previous step (S2). CPU 211 (FIG. 1) stores the 1st auto replying audiovisual data produced in the previous step in 1st Auto Replying Audiovisual Data Storage Area 206627b1 (S3).

This paragraph illustrate(s) 2nd Auto Replying Audiovisual Data Producing Software 206627c2 of Communication Device 200, which produce(s) the 2nd auto replying audiovisual data. In this embodiment, CPU 211 (FIG. 1) retrieves the audiovisual data from Microphone 215 (FIG. 1) and CCD Unit 214 (FIG. 1) (S1). Here, the audiovisual data of the user of Communication Device 200 may be retrieved. CPU 211 (FIG. 1) produces the 2nd auto replying audiovisual data by utilizing the audiovisual data retrieved in the previous step (S2). CPU 211 (FIG. 1) stores the 2nd auto replying audiovisual data produced in the previous step in 2nd Auto Replying Audiovisual Data Storage Area 206627b2 (S3).

This paragraph illustrate(s) 1st Auto Replying Time Data Producing Software 206627c3 of Communication Device 200, which produce(s) the 1st auto replying time data. In this embodiment, the user of Communication Device 200 inputs, by utilizing Input Device 210 (FIG. 1) or via voice recognition system, a time (e.g., 8:00am) (S1). CPU 211 (FIG. 1) produces the 1st auto replying time data by referring to the time input in the previous step (S2). CPU 211 (FIG. 1) stores the 1st auto replying time data produced in the previous step in 1st Auto Replying Time Data Storage Area 206627b3 (S3).

This paragraph illustrate(s) 2nd Auto Replying Time Data Producing Software 206627c4 of Communication Device 200, which produce(s) the 2nd auto replying time data. In this embodiment, the user of Communication Device 200 inputs, by utilizing Input Device 210 (FIG. 1) or via voice recognition system, a time (e.g., 6:00pm) (S1). CPU 211 (FIG. 1) produces the 2nd auto replying time data by referring to the time input in the previous step (S2). CPU 211 (FIG. 1) stores the 2nd auto replying time data produced in the previous step in 2nd Auto Replying Time Data Storage Area 206627b4 (S3).

This paragraph illustrate(s) Current Location Data Producing Software 206627c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206627b6 (S3). The foregoing sequence is repeated periodically.

This paragraph illustrate(s) 1st Auto Replying Audiovisual Data Sending Software 206627c6 of Communication Device 200, which send(s) the 1st auto replying audiovisual data. In this embodiment, CPU 211 (FIG. 1) periodically checks the incoming signal (S1). If a call to Communication Device 200 is detected, CPU 211 (FIG. 1) proceeds to the next step (S2). If a call to Communication Device 200 is not answered for a certain period of time, CPU 211 (FIG. 1) proceeds to the next step (S3). CPU 211 (FIG. 1) identifies the current time (S4). CPU 211 (FIG. 1) retrieves the 1st auto replying time data from 1st Auto Replying Time Data Storage Area 206627b3 (S5). CPU 211 (FIG. 1) retrieves the 2nd auto replying time data from 2nd Auto Replying Time Data Storage Area 206627b4 (S6). If the current time identified in S4 is between the 1st auto replying time data retrieved in S5 and the 2nd auto replying time data retrieved in the previous step, CPU 211 (FIG. 1) proceeds to the next step (S7). CPU 211 (FIG. 1) retrieves the 1st auto replying audiovisual data from 1st Auto Replying Audiovisual Data Storage Area 206627b1 and sends the data to the caller's device in a wireless fashion (S8). Here, the 1st auto replying audiovisual data is output from the caller's device, and the caller inputs the caller's message data in response. The caller's device transfers the caller's message data to Communication Device 200. CPU 211 (FIG. 1) receives the caller's message data from the caller's device in a wireless fashion (S9). CPU 211 (FIG. 1) stores the caller's message data received in the previous step in Caller's Message Data Storage Area 206627b5 (S10). The foregoing sequence is repeated periodically.

This paragraph illustrate(s) 2nd Auto Replying Audiovisual Data Sending Software 206627c7 of Communication Device 200, which send(s) the 2nd auto replying audiovisual data. In this embodiment, CPU 211 (FIG. 1) periodically checks the incoming signal (S1). If a call to Communication Device 200 is detected, CPU 211 (FIG. 1) proceeds to the next step (S2). If a call to Communication Device 200 is not answered for a certain period of time, CPU 211 (FIG. 1) proceeds to the next step (S3). CPU 211 (FIG. 1) identifies the current time (S4). CPU 211 (FIG. 1) retrieves the 1st auto replying time data from 1st Auto Replying Time Data Storage Area 206627b3 (S5). CPU 211 (FIG. 1) retrieves the 2nd auto replying time data from 2nd Auto Replying Time Data Storage Area 206627b4 (S6). If the current time identified in S4 is not between the 1st auto replying time data retrieved in S5 and the 2nd auto replying time data retrieved in the previous step, CPU 211 (FIG. 1) proceeds to the next step (S7). CPU 211 (FIG. 1) retrieves the 2nd auto replying audiovisual data from 2nd Auto Replying Audiovisual Data Storage Area 206627b2 and sends the data to the caller's device in a wireless fashion (S8). Here, the 2nd auto replying audiovisual data is output from the caller's device, and the caller inputs the caller's message data in response. The caller's device transfers the caller's message data to Communication Device 200. CPU 211 (FIG. 1) receives the caller's message data from the caller's device in a wireless fashion (S9). CPU 211 (FIG. 1) stores the caller's message data received in the previous step in Caller's Message Data Storage Area 206627b5S 10). The foregoing sequence is repeated periodically.

This paragraph illustrate(s) Caller's Location Data Producing Software 206627c8 of Communication Device 200, which produce(s) the caller's location data. In this embodiment, CPU 211 (FIG. 1) periodically checks the incoming signal (S1). If a call to Communication Device 200 is detected, CPU 211 (FIG. 1) proceeds to the next step (S2). If a call to Communication Device 200 is not answered for a certain period of time, CPU 211 (FIG. 1) proceeds to the next step (S3). CPU 211 (FIG. 1) sends the caller's location data transferring request to the caller's device in a wireless fashion (S4). Here, the caller's location data transferring request is the request to transfer the caller's location data, and the caller's device transfers the caller's location data to Communication Device 200 in response. CPU 211 (FIG. 1) receives the caller's location data from the caller's device in a wireless fashion (S5). CPU 211 (FIG. 1) stores the caller's location data received in the previous step in Caller's Location Data Storage Area 206627b7 (S6). The foregoing sequence is repeated periodically.

This paragraph illustrate(s) Callee's Location Data Producing Software 206627c9 of Communication Device 200, which produce(s) the callee's location data. In this embodiment, CPU 211 FIG. 1) periodically checks the incoming signal (Sl). If a call to Communication Device 200 is detected, CPU 211 (FIG. 1) proceeds to the next step (S2). If a call to Communication Device 200 is not answered for a certain period of time, CPU 211 (FIG. 1) proceeds to the next step (S3). CPU 211 (FIG. 1) retrieves the current location data from Current Location Data Storage Area 206627b6 (S4). CPU 211 (FIG. 1) stores the current location data retrieved in the previous step as the callee's location data in Callee's Location Data Storage Area 206627b8 (S5). The foregoing sequence is repeated periodically.

This paragraph illustrate(s) Caller's Message Data Replaying Software 206627c10 of Communication Device 200, which replay(s) the caller's message data. In this embodiment, CPU 211 (FIG. 1) retrieves the caller's message data from Caller's Message Data Storage Area 206627b5(S1). CPU 211 (FIG. 1) outputs the caller's message data retrieved in the previous step from Speaker 216 (FIG. 1) and LCD 201 (FIG. 1) (S2). CPU 211 (FIG. 1) retrieves the map data from Map Data Storage Area 206627b9 (S3). CPU 211 (FIG. 1) displays the map data retrieved in the previous step on LCD 201 (FIG. 1) (S4). CPU 211 (FIG. 1) retrieves the caller's location data from Caller's Location Data Storage Area 206627b7 (S5). CPU 211 (FIG. 1) retrieves the caller's icon data from Caller's Icon Data Storage Area 206627b10 (S6). CPU 211 (FIG. 1) displays the caller's icon data retrieved in the previous step at the location corresponding to the caller's location data retrieved in S5 on the map data displayed in S4 (S7). CPU 211 (FIG. 1) retrieves the callee's location data from Callee's Location Data Storage Area 206627b8 (S8). CPU 211 (FIG. 1) retrieves the callee's icon data from Callee's Icon Data Storage Area 206627b11 (S9). CPU 211 (FIG. 1) displays the callee's icon data retrieved in the previous step at the location corresponding to the callee's location data retrieved in S8 on the map data displayed in S4 (S10).

<<Television Program Data Storage Area Selecting Function>>

The following paragraphs illustrate the television program data storage area selecting implementor which records a TV program data in accordance with a recording schedule and a recording quality identified by the user, said TV program data is stored in either said communication device, a host computing system, or a removable media connected to said communication device in accordance with the user's selection a recorded location data which indicates the geographic location of said communication device at which said TV program data is recorded is identified, and said recording schedule and said recorded location data are indicated on said display when said TV program data is replayed.

This paragraph illustrates Removable Storage Area RSA628 connected to Communication Device 200. In this embodiment, Removable Storage Area RSA628 is connected to Communication Device 200 via Data Bus 203 (FIG. 1). Removable Storage Area RSA628 is a removable media which is capable to store various types of data.

This paragraph illustrates the storage area included in Host H. In this embodiment, Host H includes Television Program Data Storage Area Selecting Information Storage Area H628a of which the data and the software program(s) stored therein are described hereinafter.

This paragraph illustrates the storage area(s) included in Television Program Data Storage Area Selecting Information Storage Area H628a. In this embodiment, Television Program Data Storage Area Selecting Information Storage Area H628a includes Television Program Data Storage Area Selecting Data Storage Area H628b and Television Program Data Storage Area Selecting Software Storage Area H628c. Television Program Data Storage Area Selecting Data Storage Area H628b stores the data necessary to implement the present function on the side of Host H, such as the one(s) described hereinafter. Television Program Data Storage Area Selecting Software Storage Area H628c stores the software program(s) necessary to implement the present function on the side of Host H, such as the one(s) described hereinafter.

This paragraph illustrates the storage area(s) included in Television Program Data Storage Area Selecting Data Storage Area H628b. In this embodiment, Television Program Data Storage Area Selecting Data Storage Area H628b includes Multiple Distributed Television Program Data Storage Area H628b1, Multiple Recording Schedule Data Storage Area H628b2, Multiple Recording Destination Data Storage Area H628b3, Multiple Recorded Television Program Data Storage Area H628b4, Current Location Data Storage Area H628b5, Multiple Recorded Location Data Storage Area H628b6, Map Data Storage Area H628b7, Multiple Icon Data Storage Area H628b8, and Work Area H628b9. Multiple Distributed Television Program Data Storage Area H628b1 stores the data described hereinafter. Multiple Recording Schedule Data Storage Area H628b2 stores the data described hereinafter. Multiple Recording Destination Data Storage Area H628b3 stores the data described hereinafter. Multiple Recorded Television Program Data Storage Area H628b4 stores the data described hereinafter. Current Location Data Storage Area H628b5 stores the current location data which indicates the current geographic location of Communication Device 200 in (x,y,z) format. Multiple Recorded Location Data Storage Area H628b6 stores the data described hereinafter. Map Data Storage Area H628b7 stores the map data which is the image data indicating a map. Multiple Icon Data Storage Area H628b8 stores the data described hereinafter. Work Area H628b9 is utilized as a work area to perform calculation and temporarily store data.

This paragraph illustrates the storage area(s) included in Multiple Distributed Television Program Data Storage Area H628b1. In this embodiment, Multiple Distributed Television Program Data Storage Area H628b1 includes 1st Distributed Television Program Data Storage Area H628b1a and 2nd Distributed Television Program Data Storage Area H628b1b. 1st Distributed Television Program Data Storage Area H628b1a stores the 1st distributed television program data which indicates the TV program data distributed by a broadcast center (not shown) of a certain channel number (e.g., channel 1 or CBS). 2nd Distributed Television Program Data Storage Area H628b1b stores the 2nd distributed television program data which indicates the TV program data distributed by a broadcast center (not shown) of another certain channel number (e.g., channel 2 or FOX).

This paragraph illustrates the storage area(s) included in Multiple Recording Schedule Data Storage Area H628b2. In this embodiment, Multiple Recording Schedule Data Storage Area H628b2 includes 1st Recording Schedule Data Storage Area H628b2a and 2nd Recording Schedule Data Storage Area H628b2b. 1st Recording Schedule Data Storage Area H628b2a stores the 1st recording schedule data which indicates the time shifting recording schedule. The 1st recording schedule data includes the channel number data, the start recording time data, the stop recording time data, and the recording quality data. The channel number data indicates the TV channel number identified by the user. The start recording time data indicates the time and date from which the TV program data is recorded. The stop recording time data indicates the time and date until which the TV program data is recorded. The recording quality data indicates the quality (i.e., the resolution) of the TV program data recorded. 2nd Recording Schedule Data Storage Area H628b2b stores the 2nd recording schedule data which indicates the time shifting recording schedule. The 2nd recording schedule data includes the channel number data, the start recording time data, the stop recording time data, and the recording quality data. The channel number data indicates the TV channel number identified by the user. The start recording time data indicates the time and date from which the TV program data is recorded. The stop recording time data indicates the time and date until which the TV program data is recorded. The recording quality data indicates the quality (i.e., the resolution) of the TV program data recorded. The 2nd recording schedule data may overlap with the 1st recording schedule data.

This paragraph illustrates the storage area(s) included in Multiple Recording Destination Data Storage Area H628b3. In this embodiment, Multiple Recording Destination Data Storage Area H628b3 includes 1st Recording Destination Data Storage Area H628b3a and 2nd Recording Destination Data Storage Area H628b3b. 1st Recording Destination Data Storage Area H628b3a stores the 1st recording destination data which indicates the destination of the TV program data recorded in accordance with the 1st recording schedule data to be stored. The 1st recording destination data is one of the following: the 1st first recording destination data, the 1st second recording destination data, and the 1st third recording destination data. The 1st first recording destination data indicates that the destination is Communication Device 200. The 1st second recording destination data indicates that the destination is Removable Storage Area RSA628. The 1st third recording destination data indicates that the destination is Host H. 2nd Recording Destination Data Storage Area H628b3b stores the 2nd recording destination data which indicates the destination of the TV program data recorded in accordance with the 2nd recording schedule data to be stored. The 2nd recording destination data is one of the following: the 2nd first recording destination data, the 2nd second recording destination data, and the 2nd third recording destination data. The 2nd first recording destination data indicates that the destination is Communication Device 200. The 2nd second recording destination data indicates that the destination is Removable Storage Area RSA628. The 2nd third recording destination data indicates that the destination is Host H.

This paragraph illustrates the storage area(s) included in Multiple Recorded Television Program Data Storage Area H628b4. In this embodiment, Multiple Recorded Television Program Data Storage Area H628b4 includes 1st Recorded Television Program Data Storage Area H628b4a and 2nd Recorded Television Program Data Storage Area H628b4b. 1st Recorded Television Program Data Storage Area H628b4a stores the 1st recorded television program data which is the TV program data recorded in accordance with the 1st recording schedule data. 2nd Recorded Television Program Data Storage Area H628b4b stores the 2nd recorded television program data which is the TV program data recorded in accordance with the 2nd recording schedule data.

This paragraph illustrates the storage area(s) included in Multiple Recorded Location Data Storage Area H628b6. In this embodiment, Multiple Recorded Location Data Storage Area H628b6 includes 1st Recorded Location Data Storage Area H628b6a and 2nd Recorded Location Data Storage Area H628b6b. 1st Recorded Location Data Storage Area H628b6a stores the 1st recorded location data which indicates the geographic location of Communication Device 200 when the 1st recorded television program data is recorded. 2nd Recorded Location Data Storage Area H628b6b stores the 2nd recorded location data which indicates the geographic location of Communication Device 200 when the 2nd recorded television program data is recorded.

This paragraph illustrates the storage area(s) included in Multiple Icon Data Storage Area H628b8. In this embodiment, Multiple Icon Data Storage Area H628b8 includes 1st Icon Data Storage Area H628b8a and 2nd Icon Data Storage Area H628b8b. 1st Icon Data Storage Area H628b8a stores the 1st icon data which is the image of the icon utilized to indicate the 1st recorded location data on the map data. 2nd Icon Data Storage Area H628b8b stores the 2nd icon data which is the image of the icon utilized to indicate the 2nd recorded location data on the map data.

This paragraph illustrates the software program(s) stored in Television Program Data Storage Area Selecting Software Storage Area H628c. In this embodiment, Television Program Data Storage Area Selecting Software Storage Area H628c stores 1st Distributed Television Program Data Storing Software H628c1, 2nd Distributed Television Program Data Storing Software H628c2, 1st Recording Schedule Data Producing Software H628c3, 2nd Recording Schedule Data Producing Software H628c4, 1st Recording Destination Data Producing Software H628c5, 2nd Recording Destination Data Producing Software H628c6, Current Location Data Producing Software H628c7, 1st Recorded Television Program Data Producing Software H628c8, 2nd Recorded Television Program Data Producing Software H628c9, 1st Recorded Television Program Data Replaying Software H628c10, and 2nd Recorded Television Program Data Replaying Software H628c11. 1st Distributed Television Program Data Storing Software H628c1 is the software program described hereinafter. 2nd Distributed Television Program Data Storing Software H628c2 is the software program described hereinafter. 1st Recording Schedule Data Producing Software H628c3 is the software program described hereinafter. 2nd Recording Schedule Data Producing Software H628c4is the software program described hereinafter. 1st Recording Destination Data Producing Software H628c5 is the software program described hereinafter. 2nd Recording Destination Data Producing Software H628c6 is the software program described hereinafter. Current Location Data Producing Software H628c7 is the software program described hereinafter. 1st Recorded Television Program Data Producing Software H628c8 is the software program described hereinafter. 2nd Recorded Television Program Data Producing Software H628c9 is the software program described hereinafter. 1st Recorded Television Program Data Replaying Software H628c10 is the software program described hereinafter. 2nd Recorded Television Program Data Replaying Software H628c11 is the software program described hereinafter.

This paragraph illustrates the storage area included in RAM 206 (FIG. 1) of Communication Device 200. In this embodiment, RAM 206 includes Television Program Data Storage Area Selecting Information Storage Area 206628a of which the data and the software program(s) stored therein are described hereinafter.

The data and/or the software program(s) necessary to implement the present function may be downloaded from Host H to Communication Device 200.

This paragraph illustrates the storage area(s) included in Television Program Data Storage Area Selecting Information Storage Area 206628a. In this embodiment, Television Program Data Storage Area Selecting Information Storage Area 206628a includes Television Program Data Storage Area Selecting Data Storage Area 206628b and Television Program Data Storage Area Selecting Software Storage Area 206628c. Television Program Data Storage Area Selecting Data Storage Area 206628b stores the data necessary to implement the present function on the side of Communication Device 200, such as the one(s) described hereinafter.

Television Program Data Storage Area Selecting Software Storage Area 206628c stores the software program(s) necessary to implement the present function on the side of Communication Device 200, such as the one(s) described hereinafter.

This paragraph illustrates the storage area(s) included in Television Program Data Storage Area Selecting Data Storage Area 206628b. In this embodiment, Television Program Data Storage e Area Selecting Data Storage Area 206628b includes Multiple Distributed Television Program Data Storage Area 206628b1, Multiple Recording Schedule Data Storage Area 206628b2, Multiple Recording Destination Data Storage Area 206628b3, Multiple Recorded Television Program Data Storage Area 206628b4, Current Location Data Storage Area 206628b5, Multiple Recorded Location Data Storage Area 206628b6, Map Data Storage Area 206628b7, Multiple Icon Data Storage Area 206628b8, and Work Area 206628b9. Multiple Distributed Television Program Data Storage Area 206628b1 stores the data described hereinafter. Multiple Recording Schedule Data Storage Area 206628b2 stores the data described hereinafter. Multiple Recording Destination Data Storage Area 206628b3 stores the data described hereinafter. Multiple Recorded Television Program Data Storage Area 206628b4 stores the data described hereinafter. Current Location Data Storage Area 206628b5 stores the current location data which indicates the current geographic location of Communication Device 200 in (x,y,z) format. Multiple Recorded Location Data Storage Area 206628b6 stores the data described hereinafter. Map Data Storage Area 206628b7 stores the map data which is the image data indicating a map. Multiple Icon Data Storage Area 206628b8 stores the data described hereinafter. Work Area 206628b9 is utilized as a work area to perform calculation and temporarily store data.

This paragraph illustrates the storage area(s) included in Multiple Distributed Television Program Data Storage Area 206628b1. In this embodiment, Multiple Distributed Television Program Data Storage Area 206628b1 includes 1st Distributed Television Program Data Storage Area 206628b1a and 2nd Distributed Television Program Data Storage Area 206628b1b. 1st Distributed Television Program Data Storage Area 206628b1a stores the 1st distributed television program data which indicates the TV program data distributed by a broadcast center (not shown) of a certain channel number (e.g., channel 1 or CBS). 2nd Distributed Television Program Data Storage Area 206628b1b stores the 2nd distributed television program data which indicates the TV program data distributed by a broadcast center (not shown) of another certain channel number (e.g., channel 2 or FOX).

This paragraph illustrates the storage area(s) included in Multiple Recording Schedule Data Storage Area 206628b2. In this embodiment, Multiple Recording Schedule Data Storage Area 206628b2 includes 1st Recording Schedule Data Storage Area 206628b2a and 2nd Recording Schedule Data Storage Area 206628b2b. 1st Recording Schedule Data Storage Area 206628b2a stores the 1st recording schedule data which indicates the time shifting recording schedule. The 1st recording schedule data includes the channel number data, the start recording time data, the stop recording time data, and the recording quality data. The channel number data indicates the TV channel number identified by the user. The start recording time data indicates the time and date from which the TV program data is recorded. The stop recording time data indicates the time and date until which the TV program data is recorded. The recording quality data indicates the quality (i.e., the resolution of the TV program data recorded. 2nd Recording Schedule Data Storage Area 206628b2b stores the 2nd recording schedule data which indicates the time shifting recording schedule. The 2nd recording schedule data includes the channel number data, the start recording time data, the stop recording time data, and the recording quality data. The channel number data indicates the TV channel number identified by the user. The start recording time data indicates the time and date from which the TV program data is recorded. The stop recording time data indicates the time and date until which the TV program data is recorded. The recording quality data indicates the quality (i.e., the resolution) of the TV program data recorded. The 2nd recording schedule data may overlap with the 1st recording schedule data.

This paragraph illustrates the storage area(s) included in Multiple Recording Destination Data Storage Area 206628b3. In this embodiment, Multiple Recording Destination Data Storage Area 206628b3 includes 1st Recording Destination Data Storage Area 206628b3a and 2nd Recording Destination Data Storage Area 206628b3b. 1st Recording Destination Data Storage Area 206628b3a stores the 1st recording destination data which indicates the destination of the TV program data recorded in accordance with the 1st recording schedule data to be stored. The 1st recording destination data is one of the following: the 1st first recording destination data, the 1st second recording destination data, and the 1st third recording destination data. The 1st first recording destination data indicates that the destination is Communication Device 200. The 1st second recording destination data indicates that the destination is Removable Storage Area RSA628. The 1st third recording destination data indicates that the destination is Host H. 2nd Recording Destination Data Storage Area 206628b3b stores the 2nd recording destination data which indicates the destination of the TV program data recorded in accordance with the 2nd recording schedule data to be stored. The 2nd recording destination data is one of the following: the 2nd first recording destination data, the 2nd second recording destination data, and the 2nd third recording destination data. The 2nd first recording destination data indicates that the destination is Communication Device 200. The 2nd second recording destination data indicates that the destination is Removable Storage Area RSA628. The 2nd third recording destination data indicates that the destination is Host H.

This paragraph illustrates the storage area(s) included in Multiple Recorded Television Program Data Storage Area 206628b4. In this embodiment, Multiple Recorded Television Program Data Storage Area 206628b4 includes 1st Recorded Television Program Data Storage Area 206628b4a and 2nd Recorded Television Program Data Storage Area 206628b4b. 1st Recorded Television Program Data Storage Area 206628b4a stores the 1st recorded television program data which is the TV program data recorded in accordance with the 1st recording schedule data. 2nd Recorded Television Program Data Storage Area 206628b4b stores the 2nd recorded television program data which is the TV program data recorded in accordance with the 2nd recording schedule data.

This paragraph illustrates the storage area(s) included in Multiple Recorded Location Data Storage Area 206628b6. In this embodiment, Multiple Recorded Location Data Storage Area 206628b6 includes 1st Recorded Location Data Storage Area 206628b6a and 2nd Recorded Location Data Storage Area 206628b6b. 1st Recorded Location Data Storage Area 206628b6a stores the 1st recorded location data which indicates the geographic location of Communication Device 200 when the 1st recorded television program data is recorded. 2nd Recorded Location Data Storage Area 206628b6b stores the 2nd recorded location data which indicates the geographic location of Communication Device 200 when the 2nd recorded television program data is recorded.

This paragraph illustrates the storage area(s) included in Multiple Icon Data Storage Area 206628b8. In this embodiment, Multiple Icon Data Storage Area 206628b8 includes 1st Icon Data Storage Area 206628b8a and 2nd Icon Data Storage Area 206628b8b. 1st Icon Data Storage Area 206628b8a stores the 1st icon data which is the image of the icon utilized to indicate the 1st recorded location data on the map data. 2nd Icon Data Storage Area 206628b8b stores the 2nd icon data which is the image of the icon utilized to indicate the 2nd recorded location data on the map data.

This paragraph illustrates the software program(s) stored in Television Program Data Storage Area Selecting Software Storage Area 206628c. In this embodiment, Television Program Data Storage Area Selecting Software Storage Area 206628c stores 1st Distributed Television Program Data Storing Software 206628c1, 2nd Distributed Television Program Data Storing Software 206628c2, 1st Recording Schedule Data Producing Software 206628c3, 2nd Recording Schedule Data Producing Software 206628c4, 1st Recording Destination Data Producing Software 206628c5, 2nd Recording Destination Data Producing Software 206628c6, Current Location Data Producing Software 206628c7, 1st Recorded Television Program Data Producing Software 206628c8, 2nd Recorded Television Program Data Producing Software 206628c9, 1st Recorded Television Program Data Replaying Software 206628c10, and 2nd Recorded Television Program Data Replaying Software 206628c11. 1st Distributed Television Program Data Storing Software 206628c1 is the software program described hereinafter. 2nd Distributed Television Program Data Storing Software 206628c2 is the software program described hereinafter. 1st Recording Schedule Data Producing Software 206628c3 is the software program described hereinafter. 2nd Recording Schedule Data Producing Software 206628c4 is the software program described hereinafter. 1st Recording Destination Data Producing Software 206628c5 is the software program described hereinafter. 2nd Recording Destination Data Producing Software 206628c6 is the software program described hereinafter. Current Location Data Producing Software 206628c7 is the software program described hereinafter. 1st Recorded Television Program Data Producing Software 206628c8 is the software program described hereinafter. 2nd Recorded Television Program Data Producing Software 206628c9 is the software program described hereinafter. 1st Recorded Television Program Data Replaying Software 206628c10 is the software program described hereinafter. 2nd Recorded Television Program Data Replaying Software 206628c11 is the software program described hereinafter.

This paragraph illustrate(s) 1st Distributed Television Program Data Storing Software H628c1 of Host H, which store(s) the 1st distributed television program data. In this embodiment, Host H receives the 1st distributed television program data from a broadcast center (not shown) (S1). Host H stores the 1st distributed television program data received in the previous step in 1st Distributed Television Program Data Storage Area H628b1a (S2). The foregoing sequence is repeated periodically.

This paragraph illustrate(s) 2nd Distributed Television Program Data Storing Software H628c2 of Host H, which store(s) the 2nd distributed television program data. In this embodiment, Host H receives the 2nd distributed television program data from a broadcast center (not shown) (S1). Host H stores the 2nd distributed television program data received in the previous step in 2nd Distributed Television Program Data Storage Area H628b1b (S2). The foregoing sequence is repeated periodically.

This paragraph illustrate(s) 1st Recording Schedule Data Producing Software H628c3 of Host H and 1st Recording Schedule Data Producing Software 206628c3 of Communication Device 200, which produce(s) the 1st recording schedule data. In this embodiment, the user of Communication Device 200 inputs, by utilizing Input Device 210 (FIG. 1) or via voice recognition system, the channel number data, the start recording time data, the stop recording time data, and the recording quality data (S1). CPU 211 (FIG. 1) produces the 1st recording schedule data by utilizing the data input in the previous step and sends the data to Host H in a wireless fashion (S2). Host H receives the 1st recording schedule data from Communication Device 200 and stores the data in 1st Recording Schedule Data Storage Area H628b2a (S3).

This paragraph illustrate(s) 2nd Recording Schedule Data Producing Software H628c4of Host H and 2nd Recording Schedule Data Producing Software 206628c4 of Communication Device 200, which produce(s) the 2nd recording schedule data. In this embodiment, the user of Communication Device 200 inputs, by utilizing Input Device 210 (FIG. 1) or via voice recognition system, the channel number data, the start recording time data, the stop recording time data, and the recording quality data (S1). CPU 211 (FIG. 1) produces the 2nd recording schedule data by utilizing the data input in the previous step and sends the data to Host H in a wireless fashion (S2). Host H receives the 2nd recording schedule data from Communication Device 200 and stores the data in 2nd Recording Schedule Data Storage Area H628b2b (S3).

This paragraph illustrate(s) 1st Recording Destination Data Producing Software H628c5of Host H and 1st Recording Destination Data Producing Software 206628c5 of Communication Device 200, which produce(s) the 1st recording destination data. In this embodiment, CPU 211 (FIG. 1) displays a list of destinations where the 1st recorded television program data can be stored (SO. The user of Communication Device 200 selects, by utilizing Input Device 210 (FIG. 1) or via voice recognition system, a destination (S2). Assuming that Removable Storage Area RSA628 is selected by the user in the present step. CPU 211 (FIG. 1) produces the 1st recording destination data (e.g., the 1st second recording destination data) corresponding to the destination selected in the previous step and sends the data to Host H in a wireless fashion (S3). Host H receives the 1st recording destination data (e.g., the 1st second recording destination data) from Communication Device 200 and stores the data in 1st Recording Destination Data Storage Area H628b3a (S4).

This paragraph illustrate(s) 2nd Recording Destination Data Producing Software H628c6of Host H and 2nd Recording Destination Data Producing Software 206628c6 of Communication Device 200, which produce(s) the 2nd recording destination data. In this embodiment, CPU 211 (FIG. 1) displays a list of destinations where the 2nd recorded television program data can be stored (S1). The user of Communication Device 200 selects, by utilizing Input Device 210 (FIG. 1) or via voice recognition system, a destination (S2). Assuming that Removable Storage Area RSA628 is selected by the user in the present step. CPU 211 (FIG. 1) produces the 2nd recording destination data (e.g., the 2nd second recording destination data) corresponding to the destination selected in the previous step and sends the data to Host H in a wireless fashion (S3). Host H receives the 2nd recording destination data (e.g., the 2nd second recording destination data) from Communication Device 200 and stores the data in 2nd Recording Destination Data Storage Area H628b3b (S4).

This paragraph illustrate(s) Current Location Data Producing Software H628c7 of Host H and Current Location Data Producing Software 206628c7 of Communication Device 200, which produce(s) the current location data. In this embodiment, CPU 211 (FIG. 1) identifies the current location (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H628b5 (S3). The foregoing sequence is repeated periodically.

This paragraph illustrate(s) 1st Recorded Television Program Data Producing Software H628c8 of Host H, which produce(s) the 1st recorded television program data. In this embodiment, Host H retrieves the 1st recording schedule data from 1st Recording Schedule Data Storage Area H628b2a (S1). Host H retrieves the 1st recording destination data from 1st Recording Destination Data Storage Area H628b3a (S2). Host H initiates the recording process in accordance with the 1st recording schedule data retrieved in S1 (S3). Host H stores the TV program data recorded in the previous step as the 1st recorded television program data in the destination indicated by the 1st recording destination data (e.g., the 1st second recording destination data) retrieved in S2 (S4). Here, if the 1st recording destination data is the 1st second recording destination data, the TV program data is transferred to Communication Device 200, which stores the data in Removable Storage Area RSA628. Host H retrieves the current location data from Current Location Data Storage Area H628b5 (S5). Host H stores the current location data retrieved in the previous step as the 1st recorded location data in 1st Recorded Location Data Storage Area H628b6a (S6).

This paragraph illustrate(s) 2nd Recorded Television Program Data Producing Software H628c9 of Host H, which produce(s) the 2nd recorded television program data. In this embodiment, Host H retrieves the 2nd recording schedule data from 2nd Recording Schedule Data Storage Area H628b2b (S1). Host H retrieves the 2nd recording destination data from 2nd Recording Destination Data Storage Area H628b3b S2. Host H initiates the recording process in accordance with the 2nd recording schedule data retrieved in S1 (S3). Host H stores the TV program data recorded in the previous step as the 2nd recorded television program data in the destination indicated by the 2nd recording destination data (e.g., the 2nd second recording destination data) retrieved in S2 (S4). Here, if the 2nd recording destination data is the 2nd second recording destination data, the TV program data is transferred to Communication Device 200, which stores the data in Removable Storage Area RSA628. Host H retrieves the current location data from Current Location Data Storage Area H628b5 (S5). Host H stores the current location data retrieved in the previous step as the 2nd recorded location data in 2nd Recorded Location Data Storage Area H628b6b (S6).

This paragraph illustrate(s) 1st Recorded Television Program Data Replaying Software H628c10 of Host H and 1st Recorded Television Program Data Replaying Software 206628c10 of Communication Device 200, which replay(s) the 1st recorded television program data. In this embodiment, Host H retrieves the 1st recording schedule data from 1st Recording Schedule Data Storage Area H628b2a and sends the data to Communication Device 200 (S1). CPU 211 (FIG. 1) receives the 1st recording schedule data from Host H in a wireless fashion and displays the data on LCD 201 (FIG. 1) (S2). Host H retrieves the 1st recording destination data (e.g., the 1st second recording destination data) from 1st Recording Destination Data Storage Area H628b3a and sends the data to Communication Device 200 (S3). CPU 211 (FIG. 1) receives the 1st recording destination data (e.g., the 1st second recording destination data) from Host H in a wireless fashion and displays the data on LCD 201 (FIG. 1) (S4). CPU 211 (FIG. 1) retrieves the 1st recorded television program data from Removable Storage Area RSA628 (S5). Here, the assumption is that the 1st recorded television program data is stored in Removable Storage Area RSA628. CPU 211 (FIG. 1) outputs the 1st recorded television program data retrieved in the previous step from Speaker 216 (FIG. 1) and LCD 201 (FIG. 1) (S6). Host H retrieves the map data from Map Data Storage Area H628b7 and sends the data to Communication Device 200 (S7). CPU 211 (FIG. 1) receives the map data from Host H in a wireless fashion and displays the data on LCD 201 (FIG. 1) (S8). Host H retrieves the 1st recorded location data from 1st Recorded Location Data Storage Area H628b6a and sends the data to Communication Device 200 (S9). CPU 211 (FIG. 1) receives the 1st recorded location data from Host H in a wireless fashion (S10). Host H retrieves the 1st icon data from 1st Icon Data Storage Area H628b8a and sends the data to Communication Device 200 (S11). CPU 211 (FIG. 1) receives the 1st icon data from Host H in a wireless fashion (S12). CPU 211 (FIG. 1) displays the 1st icon data received in the previous step at the location corresponding to the 1st recorded location data received in S10 on the map data displayed in S8 (S13). Thus, while the 1st recorded television program data is replayed, the 1st recording schedule data, the 1st recording destination data (e.g., the 1st second recording destination data), and the 1st recorded location data are indicated on LCD 201 (FIG. 1).

This paragraph illustrate(s) 2nd Recorded Television Program Data Replaying Software H628c11 of Host H and 2nd Recorded Television Program Data Replaying Software 206628c11 of Communication Device 200, which replay(s) the 2nd recorded television program data. In this embodiment, Host H retrieves the 2nd recording schedule data from 2nd Recording Schedule Data Storage Area H628b2b and sends the data to Communication Device 200 (S1). CPU 211 (FIG. 1) receives the 2nd recording schedule data from Host H in a wireless fashion and displays the data on LCD 201 (FIG. 1) (S2). Host H retrieves the 2nd recording destination data (e.g., the 2nd second recording destination data) from 2nd Recording Destination Data Storage Area H628b3b and sends the data to Communication Device 200 (S3). CPU 211 (FIG. 1) receives the 2nd recording destination data (e.g., the 2nd second recording destination data) from Host H in a wireless fashion and displays the data on LCD 201 (FIG. 1) (S4). CPU 211 (FIG. 1) retrieves the 2nd recorded television program data from Removable Storage Area RSA628 (S5). Here, the assumption is that the 2nd recorded television program data is stored in Removable Storage Area RSA628. CPU 211 (FIG. 1) outputs the 2nd recorded television program data retrieved in the previous step from Speaker 216 (FIG. 1) and LCD 201 (FIG. 1) (S6). Host H retrieves the map data from Map Data Storage Area H628b7 and sends the data to Communication Device 200 (S7). CPU 211 (FIG. 1) receives the map data from Host H in a wireless fashion and displays the data on LCD 201 (FIG. 1) (S8). Host H retrieves the 2nd recorded location data from 2nd Recorded Location Data Storage Area H628b6b and sends the data to Communication Device 200 (S9). CPU 211 (FIG. 1) receives the 2nd recorded location data from Host H in a wireless fashion (S10). Host H retrieves the 2nd icon data from 2nd Icon Data Storage Area H628b8b and sends the data to Communication Device 200 (S11). CPU 211 (FIG. 1) receives the 2nd icon data from Host H in a wireless fashion (S12). CPU 211 (FIG.

1) displays the 2nd icon data received in the previous step at the location corresponding to the 2nd recorded location data received in S10 on the map data displayed in S8 (S13). Thus, while the 2nd recorded television program data is replayed, the 2nd recording schedule data, the 2nd recording destination data (e.g., the 2nd second recording destination data), and the 2nd recorded location data are indicated on LCD 201 (FIG. 1).

The following paragraphs illustrate another embodiment wherein Communication Device 200 plays the major role in implementing the present function.

This paragraph illustrate(s) 1st Distributed Television Program Data Storing Software 206628c1 of Communication Device 200, which store(s) the 1st distributed television program data. In this embodiment, CPU 211 (FIG. 1) receives the 1st distributed television program data from a broadcast center (not shown) (S1). CPU 211 (FIG. 1) stores the 1st distributed television program data received in the previous step in 1st Distributed Television Program Data Storage Area 206628b1a (S2). The foregoing sequence is repeated periodically.

This paragraph illustrate(s) 2nd Distributed Television Program Data Storing Software 206628c2 of Communication Device 200, which store(s) the 2nd distributed television program data. In this embodiment, CPU 211 (FIG. 1) receives the 2nd distributed television program data from a broadcast center (not shown) (S1). CPU 211 (FIG. 1) stores the 2nd distributed television program data received in the previous step in 2nd Distributed Television Program Data Storage Area 206628b1b (S2). The foregoing sequence is repeated periodically.

This paragraph illustrate(s) 1st Recording Schedule Data Producing Software 206628c3of Communication Device 200, which produce(s) the 1st recording schedule data. In this embodiment, the user of Communication Device 200 inputs, by utilizing Input Device 210 (FIG. 1) or via voice recognition system, the channel number data, the start recording time data, the stop recording time data, and the recording quality data (S1). CPU 211 (FIG. 1) produces the 1st recording schedule data by utilizing the data input in the previous step (S2). CPU 211 (FIG. 1) stores the 1st recording schedule data produced in the previous step in 1st Recording Schedule Data Storage Area 206628b2a (S3).

This paragraph illustrate(s) 2nd Recording Schedule Data Producing Software 206628c4of Communication Device 200, which produce(s) the 2nd recording schedule data. In this embodiment, the user of Communication Device 200 inputs, by utilizing Input Device 210 (FIG. 1) or via voice recognition system, the channel number data, the start recording time data, the stop recording time data, and the recording quality data (S1). CPU 211 (FIG. 1) produces the 2nd recording schedule data by utilizing the data input in the previous step (S2). CPU 211 (FIG. 1) stores the 2nd recording schedule data produced in the previous step in 2nd Recording Schedule Data Storage Area 206628b2b (S3).

This paragraph illustrate(s) 1st Recording Destination Data Producing Software 206628c5 of Communication Device 200, which produce(s) the 1st recording destination data. In this embodiment, CPU 211 (FIG. 1) displays a list of destinations where the 1st recorded television program data can be stored (S1). The user of Communication Device 200 selects, by utilizing Input Device 210 (FIG. 1) or via voice recognition system, a destination (S2). Assuming that Removable Storage Area RSA628 is selected by the user in the present step. CPU 211 (FIG. 1) stores the 1st recording destination data (e.g., the 1st second recording destination data) corresponding to the destination selected in the previous step in 1st Recording Destination Data Storage Area 206628b3a (S3).

This paragraph illustrate(s) 2nd Recording Destination Data Producing Software 206628c6 of Communication Device 200, which produce(s) the 2nd recording destination data. In this embodiment, CPU 211 (FIG. 1) displays a list of destinations where the 2nd recorded television program data can be stored (S1). The user of Communication Device 200 selects, by utilizing Input Device 210 (FIG. 1) or via voice recognition system, a destination (S2). Assuming that Removable Storage Area RSA628 is selected by the user in the present step. CPU 211 (FIG. 1) stores the 2nd recording destination data (e.g. the 2nd second recordin destination data) corresponding to the destination selected in the previous step in 2nd Recording Destination Data Storage Area 206628b3b S3).

This paragraph illustrate(s) Current Location Data Producing Software 206628c7 of Communication Device 200, which produce(s) the current location data. In this embodiment, CPU 211 (FIG. 1) identifies the current location (S1). CPU 211 (FIG. 1) produces the current location data by referring to the current location identified in the previous step (S2). CPU 211 (FIG. 1) stores the current location data produced in the previous step in Current Location Data Storage Area 206628b5 (S3). The foregoing sequence is repeated periodically.

This paragraph illustrate(s) 1st Recorded Television Program Data Producing Software 206628c8 of Communication Device 200, which produce(s) the 1st recorded television program data. In this embodiment, CPU 211 (FIG. 1) retrieves the 1st recording schedule data from 1st Recording Schedule Data Storage Area 206628b2a (S1). CPU 211 (FIG. 1) retrieves the 1st recording destination data from 1st Recording Destination Data Storage Area 206628b3a (S2). CPU 211 (FIG. 1) initiates the recording process in accordance with the 1st recording schedule data retrieved in S1 S3). CPU 211 (FIG. 1) stores the TV program data recorded in the previous step as the 1st recorded television program data in the destination indicated by the 1st recording destination data (e.g., the 1st second recording destination data) retrieved in S2 (S4). Here, if the 1st recording destination data is the 1st second recording destination data, the TV program data is stored in Removable Storage Area RSA628. CPU 211 (FIG. 1) retrieves the current location data from Current Location Data Storage Area 206628b5 (S5). CPU 211 (FIG. 1) stores the current location data retrieved in the previous step as the 1st recorded location data in 1st Recorded Location Data Storage Area 206628b6a (S6).

This paragraph illustrate(s) 2nd Recorded Television Program Data Producing Software 206628c9 of Communication Device 200, which produce(s) the 2nd recorded television program data. In this embodiment, CPU 211 (FIG. 1) retrieves the 2nd recording schedule data from 2nd Recording Schedule Data Storage Area 206628b2b (S1). CPU 211 (FIG. 1) retrieves the 2nd recording destination data from 2nd Recording Destination Data Storage Area 206628b3b (S2). CPU 211 (FIG. 1) initiates the recording process in accordance with the 2nd recording schedule data retrieved in S1 (S3). CPU 211 (FIG. 1) stores the TV program data recorded in the previous step as the 2nd recorded television program data in the destination indicated by the 2nd recording destination data (e.g., the 2nd second recording destination data) retrieved in S2 (S4). Here, if the 2nd recording destination data is the 2nd second recording destination data, the TV program data is stored in Removable Storage Area RSA628.

CPU 211 (FIG. 1) retrieves the current location data from Current Location Data Storage Area 206628b5 (S5). CPU 211 (FIG. 1) stores the current location data retrieved in the previous step as the 2nd recorded location data in 2nd Recorded Location Data Storage Area 206628b6b (S6).

This paragraph illustrate(s) 1st Recorded Television Program Data Replaying Software 206628c10 of Communication Device 200, which replay(s) the 1st recorded television program data. In this embodiment, CPU 211 (FIG. 1) retrieves the 1st recording schedule data from 1st Recording Schedule Data Storage Area 206628b2a (S1). CPU 211 (FIG. 1) displays the 1st recording schedule data retrieved in the previous step on LCD 201 (FIG. 1) (S2). CPU 211 (FIG. 1) retrieves the 1st recording destination data (e.g., the 1st second recording destination data) from 1st Recording Destination Data Storage Area 206628b3a (S3). CPU 211 (FIG. 1) displays the 1st recording destination data (e.g., the 1st second recording destination data) retrieved in the previous step on LCD 201 (FIG. 1) (S4). CPU 211 (FIG. 1) retrieves the 1st recorded television program data from Removable Storage Area RSA628 (S5). Here, the assumption is that the 1st recorded television program data is stored in Removable Storage Area RSA628. CPU 211 (FIG. 1) outputs the 1st recorded television program data retrieved in the previous step from Speaker 216 (FIG. 1) and LCD 201 (FIG. 1) (S6). CPU 211 (FIG. 1) retrieves the map data from Map Data Storage Area 206628b7(S7). CPU 211 (FIG. 1) displays the map data retrieved in the previous step on LCD 201 (FIG. 1) (S8). CPU 211 (FIG. 1) retrieves the 1st recorded location data from 1st Recorded Location Data Storage Area 206628b6a (S9). CPU 211 (FIG. 1) retrieves the 1st icon data from 1st Icon Data Storage Area 206628b8a (S10). CPU 211 (FIG. 1) displays the 1st icon data retrieved in the previous step at the location corresponding to the 1st recorded location data retrieved in S9 on the map data displayed in S8 (S11). Thus, while the 1st recorded television program data is replayed, the 1st recording schedule data, the 1st recording destination data (e.g., the 1st second recording destination data), and the 1st recorded location data are indicated on LCD 201 (FIG. 1).

This paragraph illustrate(s) 2nd Recorded Television Program Data Replaying Software 206628c11 of Communication Device 200, which replay(s) the 2nd recorded television program data. In this embodiment, CPU 211 (FIG. 1) retrieves the 2nd recording schedule data from 2nd Recording Schedule Data Storage Area 206628b2b (S1). CPU 211 (FIG. 1) displays the 2nd recording schedule data retrieved in the previous step on LCD 201 (FIG. 1) (S2). CPU 211 (FIG. 1) retrieves the 2nd recording destination data (e.g., the 2nd second recording destination data) from 2nd Recording Destination Data Storage Area 206628b3b (S3). CPU 211 (FIG. 1) displays the 2nd recording destination data (e.g., the 2nd second recording destination data) retrieved in the previous step on LCD 201 (FIG. 1) (S4). CPU 211 (FIG. 1) retrieves the 2nd recorded television program data from Removable Storage Area RSA628 (S5). Here, the assumption is that the 2nd recorded television program data is stored in Removable Storage Area RSA628. CPU 211 (FIG. 1) outputs the 2nd recorded television program data retrieved in the previous step from Speaker 216 (FIG. 1) and LCD 201 (FIG. 1) (S6). CPU 211 (FIG. 1) retrieves the map data from Map Data Storage Area 206628b7 (S7). CPU 211 (FIG. 1) displays the map data retrieved in the previous step on LCD 201 (FIG. 1) (S8). CPU 211 (FIG. 1) retrieves the 2nd recorded location data from 2nd Recorded Location Data Storage Area 206628b6b (S9). CPU 211 (FIG. 1) retrieves the 2nd icon data from 2nd Icon Data Storage Area 206628b8b (S10). CPU 211 (FIG. 1) displays the 2nd icon data retrieved in the previous step at the location corresponding to the 2nd recorded location data retrieved in S9 on the map data displayed in S8 (S11). Thus, while the 2nd recorded television program data is replayed, the 2nd recording schedule data, the 2nd recording destination data (e.g., the 2nd second recording destination data), and the 2nd recorded location data are indicated on LCD 201 (FIG. 1).

<<Street Address Icon Displaying Function>>

The following paragraphs illustrate the street address icon displaying implementor which displays a street address data which is the alphanumeric data indicating a street address on said display, identifies the geographic location corresponding to said street address data, displays a map data on said display, and indicates said geographic location corresponding to said street address data on said map data.

This paragraph illustrates the storage area included in Host H. In this embodiment, Host H includes Street Address Icon Displaying Information Storage Area H629a of which the data and the software program(s) stored therein are described hereinafter.

This paragraph illustrates the storage area(s) included in Street Address Icon Displaying Information Storage Area H629a. In this embodiment, Street Address Icon Displaying Information Storage Area H629a includes Street Address Icon Displaying Data Storage Area H629b and Street Address Icon Displaying Software Storage Area H629c. Street Address Icon Displaying Data Storage Area H629b stores the data necessary to implement the present function on the side of Host H, such as the one(s) described hereinafter. Street Address Icon Displaying Software Storage Area H629c stores the software program(s) necessary to implement the present function on the side of Host H, such as the one(s) described hereinafter.

This paragraph illustrates the storage area(s) included in Street Address Icon Displaying Data Storage Area H629b. In this embodiment, Street Address Icon Displaying Data Storage Area H629b includes Current Location Data Storage Area H629b1, Multiple Street Address Data Storage Area H629b2, Multiple Street Address Location Data Storage Area H629b3, Map Data Storage Area H629b4, Multiple Icon Data Storage Area H629b5, and Work Area H629b6. Current Location Data Storage Area H629b1 stores the current location data which indicates the current geographic location of Communication Device 200 in (x,y,z) format. Multiple Street Address Data Storage Area H629b2 stores the data described hereinafter. Multiple Street Address Location Data Storage Area H629b3 stores the data described hereinafter. Map Data Storage Area H629b4 stores the map data which is the image data indicating a map. Multiple Icon Data Storage Area H629b5 stores the data described hereinafter. Work Area H629b6 is utilized as a work area to perform calculation and temporarily store data.

This paragraph illustrates the storage area(s) included in Multiple Street Address Data Storage Area H629b2. In this embodiment, Multiple Street Address Data Storage Area H629b2includes 1st Street Address Data Storage Area H629b2a and 2nd Street Address Data Storage Area H629b2b. 1st Street Address Data Storage Area H629b2a stores the 1st street address data which is an alphanumeric data indicating a street address. 2nd Street Address Data Storage Area H629b2b stores the 2nd street address data which is an alphanumeric data indicating another street address.

This paragraph illustrates the storage area(s) included in Multiple Street Address Location Data Storage Area H629b3. In this embodiment, Multiple Street Address Location Data Storage Area H629b3 includes 1st Street Address Location Data Storage Area H629b3a and 2nd Street Address Location Data Storage Area H629b3b. 1st Street Address Location Data Storage Area H629b3a stores the 1st street address location data which indicates the geographic location corresponding to the 1st street address data in (x,y,z) format. 2nd Street Address Location Data Storage Area H629b3b stores the 2nd street address location data which indicates the geographic location corresponding to the 2nd street address data in (x,y,z) format.

This paragraph illustrates the storage area(s) included in Multiple Icon Data Storage Area H629b5. In this embodiment, Multiple Icon Data Storage Area H629b5 includes Current Location Icon Data Storage Area H629b5a and 1st Icon Data Storage Area H629b5b. Current Location Icon Data Storage Area H629b5a stores the current location icon data which is the image of the icon utilized to indicate the current location data on the map data. 1st Icon Data Storage Area H629b5b stores the 1st icon data which is the image of the icon utilized to indicate the 1st street address location data on the map data.

This paragraph illustrates the software program(s) stored in Street Address Icon Displaying Software Storage Area H629c. In this embodiment, Street Address Icon Displaying Software Storage Area H629c stores Current Location Data Producing Software H629c1, Multiple Street Address Data Displaying Software H629c2, 1st Street Address Location Data Producing Software H629c3, 2nd Street Address Location Data Producing Software H629c4, and Multiple Street Address Location Data Map Indicating Software H629c5. Current Location Data Producing Software H629c1 is the software program described hereinafter. Multiple Street Address Data Displaying Software H629c2 is the software program described hereinafter. 1st Street Address Location Data Producing Software H629c3 is the software program described hereinafter. 2nd Street Address Location Data Producing Software H629c4 is the software program described hereinafter. Multiple Street Address Location Data Map Indicating Software H629c5 is the software program described hereinafter.

This paragraph illustrates the storage area included in RAM 206 (FIG. 1) of Communication Device 200. In this embodiment, RAM 206 includes Street Address Icon Displaying Information Storage Area 206629a of which the data and the software program(s) stored therein are described hereinafter.

The data and/or the software program(s) necessary to implement the present function may be downloaded from Host H to Communication Device 200.

This paragraph illustrates the storage area(s) included in Street Address Icon Displaying Information Storage Area 206629a. In this embodiment, Street Address Icon Displaying Information Storage Area 206629a includes Street Address Icon Displaying Data Storage Area 206629b and Street Address Icon Displaying Software Storage Area 206629c. Street Address Icon Displaying Data Storage Area 206629b stores the data necessary to implement the present function on the side of Communication Device 200, such as the one(s) described hereinafter. Street Address Icon Displaying Software Storage Area 206629c stores the software program(s) necessary to implement the present function on the side of Communication Device 200, such as the one(s) described hereinafter.

This paragraph illustrates the storage area(s) included in Street Address Icon Displaying Data Storage Area 206629b. In this embodiment, Street Address Icon Displaying Data Storage Area 206629b includes Current Location Data Storage Area 206629b1, Multiple Street Address Data Storage Area 206629b2, Multiple Street Address Location Data Storage Area 206629b3, Map Data Storage Area 206629b4, Multiple Icon Data Storage Area 206629b5, and Work Area 206629b6. Current Location Data Storage Area 206629b1 stores the current location data which indicates the current geographic location of Communication Device 200 in (x,y,z) format. Multiple Street Address Data Storage Area 206629b2 stores the data described hereinafter. Multiple Street Address Location Data Storage Area 206629b3 stores the data described hereinafter. Map Data Storage Area 206629b4 stores the map data which is the image data indicating a map. Multiple Icon Data Storage Area 206629b5 stores the data described hereinafter. Work Area 206629b6 is utilized as a work area to perform calculation and temporarily store data.

This paragraph illustrates the storage area(s) included in Multiple Street Address Data Storage Area 206629b2. In this embodiment, Multiple Street Address Data Storage Area 206629b2 includes 1st Street Address Data Storage Area 206629b2a and 2nd Street Address Data Storage Area 206629b2b. 1st Street Address Data Storage Area 206629b2a stores the 1st street address data which is an alphanumeric data indicating a street address. 2nd Street Address Data Storage Area 206629b2b stores the 2nd street address data which is an alphanumeric data indicating another street address.

This paragraph illustrates the storage area(s) included in Multiple Street Address Location Data Storage Area 206629b3. In this embodiment, Multiple Street Address Location Data Storage Area 206629b3 includes 1st Street Address Location Data Storage Area 206629b3a and 2nd Street Address Location Data Storage Area 206629b3b. 1st Street Address Location Data Storage Area 206629b3a stores the 1st street address location data which indicates the geographic location corresponding to the 1st street address data in (x,y,z) format. 2nd Street Address Location Data Storage Area 206629b3b stores the 2nd street address location data which indicates the geographic location corresponding to the 2nd street address data in (x,y,z) format.

This paragraph illustrates the storage area(s) included in Multiple Icon Data Storage Area 206629b5. In this embodiment, Multiple Icon Data Storage Area 206629b5 includes Current Location Icon Data Storage Area 206629b5a, 1st Icon Data Storage Area 206629b5b, and 2nd Icon Data Storage Area 206629b5c. Current Location Icon Data Storage Area 206629b5a stores the current location icon data which is the image of the icon utilized to indicate the current location data on the map data. 1st Icon Data Storage Area 206629b5b stores the 1st icon data which is the image of the icon utilized to indicate the 1st street address location data on the map data. 2nd Icon Data Storage Area 206629b5c stores the 2nd icon data which is the image of the icon utilized to indicate the 2nd street address location data on the map data.

This paragraph illustrates the software program(s) stored in Street Address Icon Displaying Software Storage Area 206629c. In this embodiment, Street Address Icon Displaying Software Storage Area 206629c stores Current Location Data Producing Software 206629c1, Multiple Street Address Data Displaying Software 206629c2, 1st Street Address Location Data Producing Software 206629c3, 2nd Street Address Location Data Producing Software 206629c4, and Multiple Street Address Location Data Map Indicating Software 206629c5. Current Location Data Producing Software 206629c1 is the software program described hereinafter. Multiple Street Address Data Displaying Software 206629c2 is the software program described hereinafter. 1st Street Address Location Data Producing Software 206629c3 is the software program described hereinafter. 2nd Street Address Location Data Producing Software 206629c4 is the software program described hereinafter. Multiple Street Address Location Data Map Indicating Software 206629c5 is the software program described hereinafter.

This paragraph illustrate(s) Current Location Data Producing Software H629c1 of Host H and Current Location Data Producing Software 206629c1 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H629b1 (S3). The foregoing sequence is repeated periodically.

This paragraph illustrate(s) Multiple Street Address Data Displaying Software H629c2 of Host H and Multiple Street Address Data Displaying Software 206629c2 of Communication Device 200, which display(s) the street address data. In this embodiment, the user of Communication Device 200 inputs, by utilizing Input Device 210 (FIG. 1) or via voice recognition system, the street address data displaying command (S1). Here, the street address data displaying command is the command to display the street address data. CPU 211 (FIG. 1) sends the street address data displaying command input in the previous step to Host H in a wireless fashion (S2). Host H receives the street address data displaying command from Communication Device 200 (S3). Host H retrieves the 1st street address data from 1st Street Address Data Storage Area H629b2a and sends the data to Communication Device 200 (S4). CPU 211 (FIG. 1) receives the 1st street address data from Host H in a wireless fashion and displays the data on LCD 201 (FIG. 1) (S5). Host H retrieves the 2nd street address data from 2nd Street Address Data Storage Area H629b2b and sends the data to Communication Device 200 (S6). CPU 211 (FIG. 1) receives the 2nd street address data from Host H in a wireless fashion and displays the data on LCD 201 (FIG. 1) (S7). Thus, the 1st street address data and the 2nd street address data are displayed on LCD 201 (FIG. 1) simultaneously.

This paragraph illustrate(s) 1st Street Address Location Data Producing Software H629c3 of Host H, which produce(s) the 1st street address location data. In this embodiment, Host H retrieves the 1st street address data from 1st Street Address Data Storage Area H629b2a (S1). Host H identifies the geographic location corresponding to the 1st street address data retrieved in the previous step (S2). Host H produces the 1st street address location data by referring to the geographic location identified in the previous step (S3). Host H stores the 1st street address location data produced in the previous step in 1st Street Address Location Data Storage Area H629b3a (S4).

This paragraph illustrate(s) 2nd Street Address Location Data Producing Software H629c4 of Host H, which produce(s) the 2nd street address location data. In this embodiment, Host H retrieves the 2nd street address data from 2nd Street Address Data Storage Area H629b2b (S1). Host H identifies the geographic location corresponding to the 2nd street address data retrieved in the previous step (S2). Host H produces the 2nd street address location data by referring to the geographic location identified in the previous step (S3). Host H stores the 2nd street address location data produced in the previous step in 2nd Street Address Location Data Storage Area H629b3b (S4).

This paragraph illustrate(s) Multiple Street Address Location Data Map Indicating Software H629c5 of Host H and Multiple Street Address Location Data Map Indicating Software 206629c5 of Communication Device 200, which indicate(s) the street address location data on the map data. In this embodiment, the user of Communication Device 200 inputs, by utilizing Input Device 210 (FIG. 1) or via voice recognition system, the street address location data indicating command (S1). Here, the street address location data indicating command is the command to indicate the street address location data on the map data. CPU 211 (FIG. 1) sends the street address location data indicating command input in the previous step to Host H in a wireless fashion (S2). Host H receives the street address location data indicating command from Communication Device 200 (S3). Host H retrieves the 1st street address data from 1st Street Address Data Storage Area H629b2a and sends the data to Communication Device 200 (S4). CPU 211 (FIG. 1) receives the 1st street address data from Host H in a wireless fashion and displays the data on LCD 201 (FIG. 1) (S5). Host H retrieves the 2nd street address data from 2nd Street Address Data Storage Area H629b2b and sends the data to Communication Device 200 (S6). CPU 211 (FIG. 1) receives the 2nd street address data from Host H in a wireless fashion and displays the data on LCD 201 (FIG. 1) (S7). Host H retrieves the 1st street address location data from 1st Street Address Location Data Storage Area H629b3a and sends the data to Communication Device 200 (S8). CPU 211 (FIG. 1) receives the 1st street address location data from Host H in a wireless fashion (S9). Host H retrieves the 1st icon data from 1st Icon Data Storage Area H629b5b and sends the data to Communication Device 200 (S10). CPU 211 (FIG. 1) receives the 1st icon data from Host H in a wireless fashion (S11). CPU 211 (FIG. 1) displays the 1st icon data received in the previous step at the location corresponding to the 1st street address location data received in S9 on the map data (S12). Host H retrieves the 2nd street address location data from 2nd Street Address Location Data Storage Area H629b3b and sends the data to Communication Device 200 (S13). CPU 211 (FIG. 1) receives the 2nd street address location data from Host H in a wireless fashion (S14). Host H retrieves the 2nd icon data from 2nd Icon Data Storage Area H629b5c and sends the data to Communication Device 200 (S15). CPU 211 (FIG. 1) receives the 2nd icon data from Host H in a wireless fashion (S16). CPU 211 (FIG. 1) displays the 2nd icon data received in the previous step at the location corresponding to the 2nd street address location data received in S14 on the map data (S 17). Host H retrieves the current location data from Current Location Data Storage Area H629b1 and sends the data to Communication Device 200 (S18). CPU 211 (FIG. 1) receives the current location data from Host H in a wireless fashion (S19). Host H retrieves the current location icon data from Current Location Icon Data Storage Area H629b5a and sends the data to Communication Device 200 (S20). CPU 211 (FIG. 1) receives the current location icon data from Host H in a wireless fashion (S21). CPU 211 (FIG. 1) displays the current location icon data received in the previous step at the location corresponding to the current location data received in S19 on the map data (S22). Thus, the 1st street address data and the 2nd street address data are displayed on LCD 201 (FIG. 1) and the current location data, the 1st street address location data, and the 2nd street address location data are indicated on the map data, simultaneously.

The following paragraphs illustrate another embodiment wherein Communication Device 200 plays the major role in implementing the present function.

This paragraph illustrate(s) Current Location Data Producing Software 206629c1 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206629b1 (S3). The foregoing sequence is repeated periodically.

This paragraph illustrate(s) Multiple Street Address Data Displaying Software 206629c2of Communication Device 200, which display(s) the street address data. In this embodiment, the user of Communication Device 200 inputs, by utilizing Input Device 210 (FIG. 1) or via voice recognition system, the street address data displaying command (S1). Here, the street address data displaying command is the command to display the street address data. CPU 211 (FIG. 1) retrieves the 1st street address data from 1st Street Address Data Storage Area 206629b2a (S2). CPU 211 (FIG. 1) displays the 1st street address data retrieved in the previous step on LCD 201 (FIG. 1) (S3). CPU 211 (FIG. 1) retrieves the 2nd street address data from 2nd Street Address Data Storage Area 206629b2b (S4). CPU 211 (FIG. 1) displays the 2nd street address data retrieved in the previous step on LCD 201 (FIG. 1) (S5). Thus, the 1st street address data and the 2nd street address data are displayed on LCD 201 (FIG. 1) simultaneously.

This paragraph illustrate(s) 1st Street Address Location Data Producing Software 206629c3 of Communication Device 200, which produce(s) the 1st street address location data. In this embodiment, CPU 211 (FIG. 1) retrieves the 1st street address data from 1st Street Address Data Storage Area 206629b2a (S1). CPU 211 (FIG. 1) identifies the geographic location corresponding to the 1st street address data retrieved in the previous step (S2). CPU 211 (FIG. 1) produces the 1st street address location data by referring to the geographic location identified in the previous step S3). CPU 211 (FIG. 1) stores the 1st street address location data produced in the previous step in 1st Street Address Location Data Storage Area 206629b3a (S4).

This paragraph illustrate(s) 2nd Street Address Location Data Producing Software 206629c4 of Communication Device 200, which produce(s) the 2nd street address location data. In this embodiment, CPU 211 (FIG. 1) retrieves the 2nd street address data from 2nd Street Address Data Storage Area 206629b2b (S1). CPU 211 (FIG. 1) identifies the geographic location corresponding to the 2nd street address data retrieved in the previous step (S2). CPU 211 (FIG. 1) produces the 2nd street address location data by referring to the geographic location identified in the previous step (S3). CPU 211 (FIG. 1) stores the 2nd street address location data produced in the previous step in 2nd Street Address Location Data Storage Area 206629b3b (S4).

This paragraph illustrate(s) Multiple Street Address Location Data Map Indicating Software 206629c5 of Communication Device 200, which indicate(s) the street address location data on the map data. In this embodiment, the user of Communication Device 200 inputs, by utilizing Input Device 210 (FIG. 1) or via voice recognition system, the street address location data indicating command (S1). Here, the street address location data indicating command is the command to indicate the street address location data on the map data. CPU 211 (FIG. 1) retrieves the 1st street address data from 1st Street Address Data Storage Area 206629b2a (S2). CPU 211 (FIG. 1) displays the 1st street address data retrieved in the previous step on LCD 201 (FIG. 1) (S3). CPU 211 (FIG. 1) retrieves the 2nd street address data from 2nd Street Address Data Storage Area 206629b2b (S4). CPU 211 (FIG. 1) displays the 2nd street address data retrieved in the previous step on LCD 201 (FIG. 1) (S5). CPU 211 (FIG. 1) retrieves the 1st street address location data from 1st Street Address Location Data Storage Area 206629b3a (S6). CPU 211 (FIG. 1) retrieves the 1st icon data from 1st Icon Data Storage Area 206629b5b (S7). CPU 211 (FIG. 1) displays the 1st icon data retrieved in the previous step at the location corresponding to the 1st street address location data retrieved in S6 on the map data (S8). CPU 211 (FIG. 1) retrieves the 2nd street address location data from 2nd Street Address Location Data Storage Area 206629b3b (S9). CPU 211 (FIG. 1) retrieves the 2nd icon data from 2nd Icon Data Storage Area 206629b5c (S 10). CPU 211 (FIG. 1) displays the 2nd icon data retrieved in the previous step at the location corresponding to the 2nd street address location data retrieved in S9 on the map data (S11). CPU 211 (FIG. 1) retrieves the current location data from Current Location Data Storage Area 206629b1 (S 12). CPU 211 (FIG. 1) retrieves the current location icon data from Current Location Icon Data Storage Area 206629b5a (S13). CPU 211 (FIG. 1) displays the current location icon data retrieved in the previous step at the location corresponding to the current location data retrieved in S12 on the map data (S14). Thus, the 1st street address data and the 2nd street address data are displayed on LCD 201 (FIG. 1) and the current location data, the 1st street address location data, and the 2nd street address location data are indicated on the map data, simultaneously.

<<Audiovisual Multiple Recording/Replaying Function>>

The following paragraphs illustrate the audiovisual multiple recording/replaying mode implementor which records a 1st audiovisual data received from a TV broadcast center, replays said 1st audiovisual data, wherein said 1st audiovisual data is capable to be replayed while the data is being recorded, a 1st recorded location data which indicates the geographic location at which the 1st audiovisual data is recorded is produced, a 1st replayed location data which indicates the geographic location at which the 1st audiovisual data is replayed is produced, and said 1st recorded location data and said 1st replayed location data are indicated on a map data displayed on said display, and said audiovisual multiple recording/replaying mode implementor further records a 2nd audiovisual data received from the TV broadcast center, replays said 2nd audiovisual data, wherein said 2nd audiovisual data is capable to be replayed while the data is being recorded, a 2nd recorded location data which indicates the geographic location at which the 2nd audiovisual data is recorded is produced, a 2nd replayed location data which indicates the geographic location at which the 2nd audiovisual data is replayed is produced, said 2nd recorded location data and said 2nd replayed location data are indicated on the map data displayed on said display, and all of which are performed simultaneously.

This paragraph illustrates the storage area included in Host H. In this embodiment, Host H includes Audiovisual Multiple Recording/Replaying Information Storage Area H630a of which the data and the software program(s) stored therein are described hereinafter.

This paragraph illustrates the storage area(s) included in Audiovisual Multiple Recording/Replaying Information Storage Area H630a. In this embodiment, Audiovisual Multiple Recording/Replaying Information Storage Area H630a includes Audiovisual Multiple Recording/Replaying Data Storage Area H630b and Audiovisual Multiple Recording/Replaying Software Storage Area H630c. Audiovisual Multiple Recording/Replaying Data Storage Area H630b stores the data necessary to implement the present function on the side of Host H, such as the one(s) described hereinafter.

Audiovisual Multiple Recording/Replaying Software Storage Area H630c stores the software program(s) necessary to implement the present function on the side of Host H, such as the one(s) described hereinafter.

This paragraph illustrates the storage area(s) included in Audiovisual Multiple Recording/Replaying Data Storage Area H630b. In this embodiment, Audiovisual Multiple Recording/Replaying Data Storage Area H630b includes Multiple Audiovisual Data Storage Area H630b1, Multiple Recorded Location Data Storage Area H630b2, Multiple Replayed Location Data Storage Area H630b3, Current Location Data Storage Area H630b4, Map Data Storage Area H630b5, Multiple Recorded Icon Data Storage Area H630b6, Multiple Replayed Icon Data Storage Area H630b7, and Work Area H630b8. Multiple Audiovisual Data Storage Area H630b1 stores the data described hereinafter. Multiple Recorded Location Data Storage Area H630b2 stores the data described hereinafter. Multiple Replayed Location Data Storage Area H630b3 stores the data described hereinafter. Current Location Data Storage Area H630b4 stores the current location data which indicates the current geographic location of Communication Device 200 in (x,y,z) format. Map Data Storage Area H630b5 stores the map data which is the image data indicating a map. Multiple Recorded Icon Data Storage Area H630b6 stores the data described hereinafter. Multiple Replayed Icon Data Storage Area H630b7 stores the data described hereinafter. Work Area H630b8 is utilized as a work area to perform calculation and temporarily store data.

This paragraph illustrates the storage area(s) included in Multiple Audiovisual Data Storage Area H630b1. In this embodiment, Multiple Audiovisual Data Storage Area H630b1 includes 1st Audiovisual Data Storage Area H630b1a and 2nd Audiovisual Data Storage Area H630b1b. 1st Audiovisual Data Storage Area H630b1a stores the 1st audiovisual data which is the audiovisual data indicating a TV program received from a TV broadcast center (not shown). Assuming that the 1st audiovisual data is currently in the recording process. 2nd Audiovisual Data Storage Area H630b1b stores the 2nd audiovisual data which is the audiovisual data indicating a TV program received from the TV broadcast center (not shown). Assuming that the 2nd audiovisual data is currently in the recording process.

This paragraph illustrates the storage area(s) included in Multiple Recorded Location Data Storage Area H630b2. In this embodiment, Multiple Recorded Location Data Storage Area H630b2 includes 1st Recorded Location Data Storage Area H630b2a and 2nd Recorded Location Data Storage Area H630b2b. 1st Recorded Location Data Storage Area H630b2a stores the 1st recorded location data which indicates the geographic location at which the 1st audiovisual data is recorded. 2nd Recorded Location Data Storage Area H630b2b stores the 2nd recorded location data which indicates the geographic location at which the 2nd audiovisual data is recorded.

This paragraph illustrates the storage area(s) included in Multiple Replayed Location Data Storage Area H630b3. In this embodiment, Multiple Replayed Location Data Storage Area H630b3 includes 1st Replayed Location Data Storage Area H630b3a and 2nd Replayed Location Data Storage Area H630b3b. 1st Replayed Location Data Storage Area H630b3a stores the 1st replayed location data which indicates the geographic location at which the 1st audiovisual data is replayed. 2nd Replayed Location Data Storage Area H630b3b stores the 2nd replayed location data which indicates the geographic location at which the 2nd audiovisual data is replayed.

This paragraph illustrates the storage area(s) included in Multiple Recorded Icon Data Storage Area H630b6. In this embodiment, Multiple Recorded Icon Data Storage Area H630b6 includes 1st Recorded Icon Data Storage Area H630b6a and 2nd Recorded Icon Data Storage Area H630b6b. 1st Recorded Icon Data Storage Area H630b6a stores the 1st recorded icon data which is the image of the icon utilized to indicate the 1st recorded location data on the map data. 2nd Recorded Icon Data Storage Area H630b6b stores the 2nd recorded icon data which is the image of the icon utilized to indicate the 2nd recorded location data on the map data.

This paragraph illustrates the storage area(s) included in Multiple Replayed Icon Data Storage Area H630b7. In this embodiment, Multiple Replayed Icon Data Storage Area H630b7 includes 1st Replayed Icon Data Storage Area H630b7a and 2nd Replayed Icon Data Storage Area H630b7b. 1st Replayed Icon Data Storage Area H630b7a stores the 1st replayed icon data which is the image of the icon utilized to indicate the 1st replayed location data on the map data. 2nd Replayed Icon Data Storage Area H630b7b stores the 2nd replayed icon data which is the image of the icon utilized to indicate the 2nd replayed location data on the map data.

This paragraph illustrates the software program(s) stored in Audiovisual Multiple Recording/Replaying Software Storage Area H630c. In this embodiment, Audiovisual Multiple Recording/Replaying Software Storage Area H630c stores Current Location Data Producing Software H630c1, 1st Audiovisual Data Recording Software H630c2, 1st Audiovisual Data Replaying Software H630c3, 1st Audiovisual Data Recording/Replaying Software H630c4, 2nd Audiovisual Data Recording Software H630c5, 2nd Audiovisual Data Replaying Software H630c6, and 2nd Audiovisual Data Recording/Replaying Software H630c7. Current Location Data Producing Software H630c1 is the software program described hereinafter. 1st Audiovisual Data Recording Software H630c2 is the software program described hereinafter. 1st Audiovisual Data Replaying Software H630c3 is the software program described hereinafter. 1st Audiovisual Data Recording/Replaying Software H630c4 is the software program described hereinafter. 2nd Audiovisual Data Recording Software H630c5 is the software program described hereinafter. 2nd Audiovisual Data Replaying Software H630c6 is the software program described hereinafter. 2nd Audiovisual Data Recording/Replaying Software H630c7 is the software program described hereinafter.

This paragraph illustrates the storage area included in RAM 206 (FIG. 1) of Communication Device 200. In this embodiment, RAM 206 includes Audiovisual Multiple Recording/Replaying Information Storage Area 206630a of which the data and the software program(s) stored therein are described hereinafter.

The data and/or the software program(s) necessary to implement the present function may be downloaded from Host H to Communication Device 200.

This paragraph illustrates the storage area(s) included in Audiovisual Multiple Recording/Replaying Information Storage Area 206630a. In this embodiment, Audiovisual Multiple Recording/Replaying Information Storage Area 206630a includes Audiovisual Multiple Recording/Replaying Data Storage Area 206630b and Audiovisual Multiple Recording/Replaying Software Storage Area 206630c. Audiovisual Multiple Recording/Replaying Data Storage Area 206630b stores the data necessary to implement the present function on the side of Communication Device 200, such as the one(s) described hereinafter. Audiovisual Multiple Recording/Replaying Software Storage Area 206630c stores the software program(s) necessary to implement the present function on the side of Communication Device 200, such as the one(s) described hereinafter.

This paragraph illustrates the storage area(s) included in Audiovisual Multiple Recording/Replaying Data Storage Area 206630b. In this embodiment, Audiovisual Multiple Recording/Replaying Data Storage Area 206630b includes Multiple Audiovisual Data Storage Area 206630b1, Multiple Recorded Location Data Storage Area 206630b2, Multiple Replayed Location Data Storage Area 206630b3, Current Location Data Storage Area 206630b4, Map Data Storage Area 206630b5, Multiple Recorded Icon Data Storage Area 206630b6, Multiple Replayed Icon Data Storage Area 206630b7, and Work Area 206630b8. Multiple Audiovisual Data Storage Area 206630b1 stores the data described hereinafter. Multiple Recorded Location Data Storage Area 206630b2 stores the data described hereinafter. Multiple Replayed Location Data Storage Area 206630b3 stores the data described hereinafter. Current Location Data Storage Area 206630b4 stores the current location data which indicates the current geographic location of Communication Device 200 in (x,y,z) format. Map Data Storage Area 206630b5 stores the map data which is the image data indicating a map. Multiple Recorded Icon Data Storage Area 206630b6 stores the data described hereinafter. Multiple Replayed Icon Data Storage Area 206630b7 stores the data described hereinafter. Work Area 206630b8 is utilized as a work area to perform calculation and temporarily store data.

This paragraph illustrates the storage area(s) included in Multiple Audiovisual Data Storage Area 206630b1. In this embodiment, Multiple Audiovisual Data Storage Area 206630b1 includes 1st Audiovisual Data Storage Area 206630b1a and 2nd Audiovisual Data Storage Area 206630b1b. 1st Audiovisual Data Storage Area 206630b1a stores the 1st audiovisual data which is the audiovisual data indicating a TV program received from a TV broadcast center (not shown). Assuming that the 1st audiovisual data is currently in the recording process. 2nd Audiovisual Data Storage Area 206630b1b stores the 2nd audiovisual data which is the audiovisual data indicating a TV program received from the TV broadcast center (not shown). Assuming that the 2nd audiovisual data is currently in the recording process.

This paragraph illustrates the storage area(s) included in Multiple Recorded Location Data Storage Area 206630b2. In this embodiment, Multiple Recorded Location Data Storage Area 206630b2 includes 1st Recorded Location Data Storage Area 206630b2a and 2nd Recorded Location Data Storage Area 206630b2b. 1st Recorded Location Data Storage Area 206630b2a stores the 1st recorded location data which indicates the geographic location at which the 1st audiovisual data is recorded. 2nd Recorded Location Data Storage Area 206630b2b stores the 2nd recorded location data which indicates the geographic location at which the 2nd audiovisual data is recorded.

This paragraph illustrates the storage area(s) included in Multiple Replayed Location Data Storage Area 206630b3. In this embodiment, Multiple Replayed Location Data Storage Area 206630b3 includes 1st Replayed Location Data Storage Area 206630b3a and 2nd Replayed Location Data Storage Area 206630b3b. 1st Replayed Location Data Storage Area 206630b3a stores the 1st replayed location data which indicates the geographic location at which the 1st audiovisual data is replayed. 2nd Replayed Location Data Storage Area 206630b3b stores the 2nd replayed location data which indicates the geographic location at which the 2nd audiovisual data is replayed.

This paragraph illustrates the storage area(s) included in Multiple Recorded Icon Data Storage Area 206630b6. In this embodiment, Multiple Recorded Icon Data Storage Area 206630b6 includes 1st Recorded Icon Data Storage Area 206630b6a and 2nd Recorded Icon Data Storage Area 206630b6b. 1st Recorded Icon Data Storage Area 206630b6a stores the 1st recorded icon data which is the image of the icon utilized to indicate the 1st recorded location data on the map data. 2nd Recorded Icon Data Storage Area 206630b6b stores the 2nd recorded icon data which is the image of the icon utilized to indicate the 2nd recorded location data on the map data.

This paragraph illustrates the storage area(s) included in Multiple Replayed Icon Data Storage Area 206630b7. In this embodiment, Multiple Replayed Icon Data Storage Area 206630b7 includes 1st Replayed Icon Data Storage Area 206630b7a and 2nd Replayed Icon Data Storage Area 206630b7b. 1st Replayed Icon Data Storage Area 206630b7a stores the 1st replayed icon data which is the image of the icon utilized to indicate the 1st replayed location data on the map data. 2nd Replayed Icon Data Storage Area 206630b7b stores the 2nd replayed icon data which is the image of the icon utilized to indicate the 2nd replayed location data on the map data.

This paragraph illustrates the software program(s) stored in Audiovisual Multiple Recording/Replaying Software Storage Area 206630c. In this embodiment, Audiovisual Multiple Recording/Replaying Software Storage Area 206630c stores Current Location Data Producing Software 206630c1, 1st Audiovisual Data Recording Software 206630c2, 1st Audiovisual Data Replaying Software 206630c3, 1st Audiovisual Data Recording/Replaying Software 206630c4, 2nd Audiovisual Data Recording Software 206630c5, 2nd Audiovisual Data Replaying Software 206630c6, and 2nd Audiovisual Data Recording/Replaying Software 206630c7. Current Location Data Producing Software 206630c1 is the software program described hereinafter. 1st Audiovisual Data Recording Software 206630c2 is the software program described hereinafter. 1st Audiovisual Data Replaying Software 206630c3 is the software program described hereinafter. 1st Audiovisual Data Recording/Replaying Software 206630c4 is the software program described hereinafter. 2nd Audiovisual Data Recording Software 206630c5 is the software program described hereinafter. 2nd Audiovisual Data Replaying Software 206630c6 is the software program described hereinafter. 2nd Audiovisual Data Recording/Replaying Software 206630c7 is the software program described hereinafter.

This paragraph illustrate(s) Current Location Data Producing Software H630c1 of Host H and Current Location Data Producing Software 206630c1 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H630b4 (S3). The foregoing sequence is repeated periodically.

This paragraph illustrate(s) 1st Audiovisual Data Recording Software H630c2 of Host H and 1st Audiovisual Data Recording Software 206630c2 of Communication Device 200, which record(s) the 1st audiovisual data. In this embodiment, Host H retrieves the current location data from Current Location Data Storage Area H630b4 (S1). Host H stores the current location data retrieved in the previous step as the 1st recorded location data in 1st Recorded Location Data Storage Area H630b2a (S2). Host H retrieves the map data from Map Data Storage Area H630b5 and sends the data to Communication Device 200 (S3). CPU 211 (FIG. 1) receives the map data from Host H in a wireless fashion and displays the data on LCD 201 (FIG. 1) (S4). Host H retrieves the 1st recorded location data from 1st Recorded Location Data Storage Area H630b2a and sends the data to Communication Device 200 (S5). CPU 211 (FIG. 1) receives the 1st recorded location data from Host H in a wireless fashion (S6). Host H retrieves the 1st recorded icon data from 1st Recorded Icon Data Storage Area H630b6a and sends the data to Communication Device 200 (S7). CPU 211 (FIG. 1) receives the 1st recorded icon data from Host H in a wireless fashion (S8). CPU 211 (FIG. 1) displays the 1st recorded icon data received in the previous step at the location corresponding to the 1st recorded location data received in S6 on the map data displayed in S4 (S9). Host H receives the 1st audiovisual data from a TV broadcast center (not shown) (S10). Host H stores the 1st audiovisual data received in the previous step in 1st Audiovisual Data Storage Area H630b1a (S11). The sequence of S10 and Sll is repeated until a specific time arrives.

This paragraph illustrate(s) 1st Audiovisual Data Replaying Software H630c3 of Host H and 1st Audiovisual Data Replaying Software 206630c3 of Communication Device 200, which replay(s) the 1st audiovisual data. In this embodiment, the user of Communication Device 200 inputs, by utilizing Input Device 210 (FIG. 1) or via voice recognition system, the 1st audiovisual data replaying command (S1). Here, the 1st audiovisual data replaying command is the command to replay the 1st audiovisual data. CPU 211 (FIG. 1) sends the 1st audiovisual data replaying command input in the previous step to Host H in a wireless fashion (S2). Host H receives the 1st audiovisual data replaying command from Communication Device 200 (S3). Host H retrieves the current location data from Current Location Data Storage Area H630b4 (S4). Host H stores the current location data retrieved in the previous step as the 1st replayed location data in 1st Replayed Location Data Storage Area H630b3a (S5). Host H retrieves the map data from Map Data Storage Area H630b5 and sends the data to Communication Device 200 (S6). CPU 211 (FIG. 1) receives the map data from Host H in a wireless fashion and displays the data on LCD 201 (FIG. 1) (S7). Host H retrieves the 1st replayed location data from 1st Replayed Location Data Storage Area H630b3a and sends the data to Communication Device 200 (S8). CPU 211 (FIG. 1) receives the 1st replayed location data from Host H in a wireless fashion (S9). Host H retrieves the 1st replayed icon data from 1st Replayed Icon Data Storage Area H630b7a and sends the data to Communication Device 200 (S10). CPU 211 (FIG. 1) receives the 1st replayed icon data from Host H in a wireless fashion (S11). CPU 211 (FIG. 1) displays the 1st replayed icon data received in the previous step at the location corresponding to the 1st replayed location data received in S9 on the map data displayed in S7 (S 12). Host H retrieves the 1st audiovisual data from 1st Audiovisual Data Storage Area H630b1a from the beginning thereof and sends the data to Communication Device 200 (S13). CPU 211 (FIG. 1) receives the 1st audiovisual data from Host H in a wireless fashion and outputs the data from Speaker 216 (FIG. 1) and LCD 201 (FIG. 1) (S14). The sequence of S13 and S14 is repeated until end of the 1st audiovisual data.

This paragraph illustrate(s) 1st Audiovisual Data Recording/Replaying Software H630c4of Host H and 1st Audiovisual Data Recording/Replaying Software 206630c4 of Communication Device 200, which replay(s) the 1st audiovisual data while recording the data. In this embodiment, the user of Communication Device 200 inputs, by utilizing Input Device 210 (FIG. 1) or via voice recognition system, the 1st audiovisual data recording/replaying command (S1). Here, the 1st audiovisual data replaying command is the command to replay the 1st audiovisual data while recording the data. CPU 211 (FIG. 1) sends the 1st audiovisual data recording/replaying command input in the previous step to Host H in a wireless fashion (S2). Host H receives the 1st audiovisual data recording/replaying command from Communication Device 200 (S3). Host H retrieves the current location data from Current Location Data Storage Area H630b4 (S4). Host H stores the current location data retrieved in the previous step as the 1st recorded location data in 1st Recorded Location Data Storage Area H630b2a (S5). Host H stores the current location data retrieved in S4 as the 1st replayed location data in 1st Replayed Location Data Storage Area H630b3a (S6). Host H retrieves the map data from Map Data Storage Area H630b5 and sends the data to Communication Device 200 (S7) (FIG. 1) receives the map data from Host H in a wireless fashion and displays the data on LCD 201 (FIG. 1) (S8). Host H retrieves the 1st recorded location data from 1st Recorded Location Data Storage Area H630b2a and sends the data to Communication Device 200 (S9). CPU 211 (FIG. 1) receives the 1st recorded location data from Host H in a wireless fashion (S10). Host H retrieves the 1st recorded icon data from 1st Recorded Icon Data Storage Area H630b6a and sends the data to Communication Device 200 (S11). CPU 211 (FIG. 1) receives the 1st recorded icon data from Host H in a wireless fashion (S12). CPU 211 (FIG. 1) displays the 1st recorded icon data received in the previous step at the location corresponding to the 1st recorded location data received in S10 on the map data displayed in S8 (S13). Host H retrieves the 1st replayed location data from 1st Replayed Location Data Storage Area H630b3a and sends the data to Communication Device 200 (S 14). CPU 211 (FIG. 1) receives the 1st replayed location data from Host H in a wireless fashion (S15). Host H retrieves the 1st replayed icon data from 1st Replayed Icon Data Storage Area H630b7a and sends the data to Communication Device 200 (S16). CPU 211 (FIG. 1) receives the 1st replayed icon data from Host H in a wireless fashion (S17). CPU 211 (FIG. 1) displays the 1st replayed icon data received in the previous step at the location corresponding to the 1st replayed location data received in S15 on the map data displayed in S8 (S18). Host H receives the 1st audiovisual data from a TV broadcast center (not shown) (S19). Host H stores the 1st audiovisual data received in the previous step in 1st Audiovisual Data Storage Area H630b1a (S20). Host H retrieves the 1st audiovisual data from 1st Audiovisual Data Storage Area H630b1a from the beginning thereof and sends the data to Communication Device 200 (S21). CPU 211 (FIG. 1) receives the 1st audiovisual data from Host H in a wireless fashion and outputs the data from Speaker 216 (FIG. 1) and LCD 201 (FIG. 1) (S22). The sequence of S19 and S20 is repeated until a specific time arrives. The sequence of S21 and S22 is repeated until end of the 1st audiovisual data.

This paragraph illustrate(s) 2nd Audiovisual Data Recording Software H630c5 of Host H and 2nd Audiovisual Data Recording Software 206630c5 of Communication Device 200, which record(s) the 2nd audiovisual data. In this embodiment, Host H retrieves the current location data from Current Location Data Storage Area H630b4 (S1). Host H stores the current location data retrieved in the previous step as the 2nd recorded location data in 2nd Recorded Location Data Storage Area H630b2b (S2). Host H retrieves the map data from Map Data Storage Area H630b5and sends the data to Communication Device 200 (S3). CPU 211 (FIG. 1) receives the map data from Host H in a wireless fashion and displays the data on LCD 201 (FIG. 1) (S4). Host H retrieves the 2nd recorded location data from 2nd Recorded Location Data Storage Area H630b2b and sends the data to Communication Device 200 (S5). CPU 211 (FIG. 1) receives the 2nd recorded location data from Host H in a wireless fashion (S6). Host H retrieves the 2nd recorded icon data from 2nd Recorded Icon Data Storage Area H630b6b and sends the data to Communication Device 200 (S7). CPU 211 (FIG. 1) receives the 2nd recorded icon data from Host H in a wireless fashion (S8). CPU 211 (FIG. 1) displays the 2nd recorded icon data received in the previous step at the location corresponding to the 2nd recorded location data received in S6 on the map data displayed in S4 (S9). Host H receives the 2nd audiovisual data from a TV broadcast center (not shown) (S10). Host H stores the 2nd audiovisual data received in the previous step in 2nd Audiovisual Data Storage Area H630b1b (S11). The sequence of S10 and Sll is repeated until a specific time arrives.

This paragraph illustrate(s) 2nd Audiovisual Data Replaying Software H630c6 of Host H and 2nd Audiovisual Data Replaying Software 206630c6 of Communication Device 200, which replay(s) the 2nd audiovisual data. In this embodiment, the user of Communication Device 200 inputs, by utilizing Input Device 210 (FIG. 1) or via voice recognition system, the 2nd audiovisual data replaying command (S1). Here, the 2nd audiovisual data replaying command is the command to replay the 2nd audiovisual data. CPU 211 (FIG. 1) sends the 2nd audiovisual data replaying command input in the previous step to Host H in a wireless fashion (S2). Host H receives the 2nd audiovisual data replaying command from Communication Device 200 (S3). Host H retrieves the current location data from Current Location Data Storage Area H630b4 (S4). Host H stores the current location data retrieved in the previous step as the 2nd replayed location data in 2nd Replayed Location Data Storage Area H630b3b (S5). Host H retrieves the map data from Map Data Storage Area H630b5 and sends the data to Communication Device 200 (S6). CPU 211 (FIG. 1) receives the map data from Host H in a wireless fashion and displays the data on LCD 201 (FIG. 1) (S7). Host H retrieves the 2nd replayed location data from 2nd Replayed Location Data Storage Area H630b3b and sends the data to Communication Device 200 (S8). CPU 211 (FIG. 1) receives the 2nd replayed location data from Host H in a wireless fashion (S9). Host H retrieves the 2nd replayed icon data from 2nd Replayed Icon Data Storage Area H630b7b and sends the data to Communication Device 200 (S10). CPU 211 (FIG. 1) receives the 2nd replayed icon data from Host H in a wireless fashion (S11). CPU 211 (FIG. 1) displays the 2nd replayed icon data received in the previous step at the location corresponding to the 2nd replayed location data received in S9 on the map data displayed in S7 (S12). Host H retrieves the 2nd audiovisual data from 2nd Audiovisual Data Storage Area H630b1b from the beginning thereof and sends the data to Communication Device 200 (S13). CPU 211 (FIG. 1) receives the 2nd audiovisual data from Host H in a wireless fashion and outputs the data from Speaker 216 (FIG. 1) and LCD 201 (FIG. 1) (S14). The sequence of S13 and S14 is repeated until end of the 2nd audiovisual data.

This paragraph illustrate(s) 2nd Audiovisual Data Recording/Replaying Software H630c7 of Host H and 2nd Audiovisual Data Recording/Replaying Software 206630c7 of Communication Device 200, which replay(s) the 2nd audiovisual data while recording the data. In this embodiment, the user of Communication Device 200 inputs, by utilizing Input Device 210 (FIG. 1) or via voice recognition system, the 2nd audiovisual data recording/replaying command (S1). Here, the 2nd audiovisual data replaying command is the command to replay the 2nd audiovisual data while recording the data. CPU 211 (FIG. 1) sends the 2nd audiovisual data recording/replaying command input in the previous step to Host H in a wireless fashion (S2). Host H receives the 2nd audiovisual data recording/replaying command from Communication Device 200 (S3). Host H retrieves the current location data from Current Location Data Storage Area H630b4 (S4). Host H stores the current location data retrieved in the previous step as the 2nd recorded location data in 2nd Recorded Location Data Storage Area H630b2b (S5). Host H stores the current location data retrieved in S4 as the 2nd replayed location data in 2nd Replayed Location Data Storage Area H630b3b (S6). Host H retrieves the map data from Map Data Storage Area H630b5 and sends the data to Communication Device 200 (S7). CPU 211 (FIG. 1) receives the map data from Host H in a wireless fashion and displays the data on LCD 201 (FIG. 1) (S8). Host H retrieves the 2nd recorded location data from 2nd Recorded Location Data Storage Area H630b2b and sends the data to Communication Device 200 (S9). CPU 211 (FIG. 1) receives the 2nd recorded location data from Host H in a wireless fashion (S10). Host H retrieves the 2nd recorded icon data from 2nd Recorded Icon Data Storage Area H630b6b and sends the data to Communication Device 200 (S11). CPU 211 (FIG. 1) receives the 2nd recorded icon data from Host H in a wireless fashion (S12). CPU 211 (FIG. 1) displays the 2nd recorded icon data received in the previous step at the location corresponding to the 2nd recorded location data received in S10 on the map data displayed in S8 (S13). Host H retrieves the 2nd replayed location data from 2nd Replayed Location Data Storage Area H630b3b and sends the data to Communication Device 200 (S14). CPU 211 (FIG. 1) receives the 2nd replayed location data from Host H in a wireless fashion (S15). Host H retrieves the 2nd replayed icon data from 2nd Replayed Icon Data Storage Area H630b7b and sends the data to Communication Device 200 (S16). CPU 211 (FIG. 1) receives the 2nd replayed icon data from Host H in a wireless fashion (S17). CPU 211 (FIG. 1) displays the 2nd replayed icon data received in the previous step at the location corresponding to the 2nd replayed location data received in S15 on the map data displayed in S8 (S18). Host H receives the 2nd audiovisual data from a TV broadcast center (not shown) (S19). Host H stores the 2nd audiovisual data received in the previous step in 2nd Audiovisual Data Storage Area H630b1b (S20). Host H retrieves the 2nd audiovisual data from 2nd Audiovisual Data Storage Area H630b1b from the beginning thereof and sends the data to Communication Device 200 (S21). CPU 211 (FIG. 1) receives the 2nd audiovisual data from Host H in a wireless fashion and outputs the data from Speaker 216 (FIG. 1) and LCD 201 (FIG. 1) (S22). The sequence of S19 and S20 is repeated until a specific time arrives. The sequence of S21 and S22 is repeated until end of the 2nd audiovisual data.

The following paragraphs illustrate another embodiment wherein Communication Device 200 plays the major role in implementing the present function.

This paragraph illustrate(s) Current Location Data Producing Software 206630c1 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206630b4 (S3). The foregoing sequence is repeated periodically.

This paragraph illustrate(s) 1st Audiovisual Data Recording Software 206630c2 of Communication Device 200, which record(s) the 1st audiovisual data. In this embodiment, CPU 211 (FIG. 1) retrieves the current location data from Current Location Data Storage Area 206630b4 (S1). CPU 211 (FIG. 1) stores the current location data retrieved in the previous step as the 1st recorded location data in 1st Recorded Location Data Storage Area 206630b2a (S2). CPU 211 (FIG. 1) retrieves the map data from Map Data Storage Area 206630b5 (S3). CPU 211 (FIG. 1) displays the map data retrieved in the previous step on LCD 201 (FIG. 1) (S4). CPU 211 (FIG. 1) retrieves the 1st recorded location data from 1st Recorded Location Data Storage Area 206630b2a (S5). CPU 211 (FIG. 1) retrieves the 1st recorded icon data from 1st Recorded Icon Data Storage Area 206630b6a (S6). CPU 211 (FIG. 1) displays the 1st recorded icon data retrieved in the previous step at the location corresponding to the 1st recorded location data retrieved in S5 on the map data displayed in S4 (S7). CPU 211 (FIG. 1) receives the 1st audiovisual data from a TV broadcast center (not shown) (S8). CPU 211 (FIG. 1) stores the 1st audiovisual data received in the previous step in 1st Audiovisual Data Storage Area 206630b1a (S9). The sequence of S8 and S9 is repeated until a specific time arrives.

This paragraph illustrate(s) 1st Audiovisual Data Replaying Software 206630c3 of Communication Device 200, which replay(s) the 1st audiovisual data. In this embodiment, the user of Communication Device 200 inputs, by utilizing Input Device 210 (FIG. 1) or via voice recognition system, the 1st audiovisual data replaying command (S1). Here, the 1st audiovisual data replaying command is the command to replay the 1st audiovisual data. CPU 211 (FIG. 1) retrieves the current location data from Current Location Data Storage Area 206630b4 (S2). CPU 211 (FIG. 1) stores the current location data retrieved in the previous step as the 1st replayed location data in 1st Replayed Location Data Storage Area 206630b3a (S3). CPU 211 (FIG. 1) retrieves the map data from Map Data Storage Area 206630b5 (S4). CPU 211 (FIG. 1) displays the map data retrieved in the previous step on LCD 201 (FIG. 1) (S5). CPU 211 (FIG. 1) retrieves the 1st replayed location data from 1st Replayed Location Data Storage Area 206630b3a (S6). CPU 211 (FIG. 1) retrieves the 1st replayed icon data from 1st Replayed Icon Data Storage Area 206630b7a (S7). CPU 211 (FIG. 1) displays the 1st replayed icon data retrieved in the previous step at the location corresponding to the 1st replayed location data retrieved in S6 on the map data displayed in S5 (S8). CPU 211 (FIG. 1) retrieves the 1st audiovisual data from 1st Audiovisual Data Storage Area 206630b1a from the beginning thereof (S9). CPU 211 (FIG. 1) outputs the 1st audiovisual data retrieved in the previous step from Speaker 216 (FIG. 1) and LCD 201 (FIG. 1) (S10). The sequence of S9 and S10 is repeated until end of the 1st audiovisual data.

This paragraph illustrate(s) 1st Audiovisual Data Recording/Replaying Software 206630c4 of Communication Device 200, which replay(s) the 1st audiovisual data while recording the data. In this embodiment, the user of Communication Device 200 inputs, by utilizing Input Device 210 (FIG. 1) or via voice recognition system, the 1st audiovisual data recording/replaying command (S1). Here, the 1st audiovisual data replaying command is the command to replay the 1st audiovisual data while recording the data. CPU 211 (FIG. 1) retrieves the current location data from Current Location Data Storage Area 206630b4 (S2). CPU 211 (FIG. 1) stores the current location data retrieved in the previous step as the 1st recorded location data in 1st Recorded Location Data Storage Area 206630b2a (S3). CPU 211 (FIG. 1) stores the current location data retrieved in S2 as the 1st replayed location data in 1st Replayed Location Data Storage Area 206630b3a (S4). CPU 211 (FIG. 1) retrieves the map data from Map Data Storage Area 206630b5 (S5). CPU 211 (FIG. 1) displays the map data retrieved in the previous step on LCD 201 (FIG. 1) (S6). CPU 211 (FIG. 1) retrieves the 1st recorded location data from 1st Recorded Location Data Storage Area 206630b2a (S7). CPU 211 (FIG. 1) retrieves the 1st recorded icon data from 1st Recorded Icon Data Storage Area 206630b6a (S8). CPU 211 (FIG. 1) displays the 1st recorded icon data retrieved in the previous step at the location corresponding to the 1st recorded location data retrieved in S7 on the map data displayed in S6 (S9). CPU 211 (FIG. 1) retrieves the 1st replayed location data from 1st Replayed Location Data Storage Area 206630b3a (S10). CPU 211 (FIG. 1) retrieves the 1st replayed icon data from 1st Replayed Icon Data Storage Area 206630b7a (S11). CPU 211 (FIG. 1) displays the 1st replayed icon data retrieved in the previous step at the location corresponding to the 1st replayed location data retrieved in S10 on the map data displayed in S6 (S12). CPU 211 (FIG. 1) receives the 1st audiovisual data from a TV broadcast center (not shown) (S13). CPU 211 (FIG. 1) stores the 1st audiovisual data received in the previous step in 1st Audiovisual Data Storage Area 206630b1a (S14). CPU 211 (FIG. 1) retrieves the 1st audiovisual data from 1st Audiovisual Data Storage Area 206630b1a from the beginning thereof (S15). CPU 211 (FIG. 1) outputs the 1st audiovisual data retrieved in the previous step from Speaker 216 (FIG. 1) and LCD 201 (FIG. 1) (S16). The sequence of S13 and S14 is repeated until a specific time arrives. The sequence of S15 and S16 is repeated until end of the 1st audiovisual data.

This paragraph illustrate(s) 2nd Audiovisual Data Recording Software 206630c5 of Communication Device 200, which record(s) the 2nd audiovisual data. In this embodiment, CPU 211 (FIG. 1) retrieves the current location data from Current Location Data Storage Area 206630b4(S1). CPU 211 (FIG. 1) stores the current location data retrieved in the previous step as the 2nd recorded location data in 2nd Recorded Location Data Storage Area 206630b2b (S2). CPU 211 (FIG. 1) retrieves the map data from Map Data Storage Area 206630b5 (S3). CPU 211 (FIG. 1) displays the map data retrieved in the previous step on LCD 201 (FIG. 1) (S4). CPU 211 (FIG. 1) retrieves the 2nd recorded location data from 2nd Recorded Location Data Storage Area 206630b2b (S5). CPU 211 (FIG. 1) retrieves the 2nd recorded icon data from 2nd Recorded Icon Data Storage Area 206630b6b (S6). CPU 211 (FIG. 1) displays the 2nd recorded icon data retrieved in the previous step at the location corresponding to the 2nd recorded location data retrieved in S5 on the map data displayed in S4 (S7). CPU 211 (FIG. 1) receives the 2nd audiovisual data from a TV broadcast center (not shown) (S8). CPU 211 (FIG. 1) stores the 2nd audiovisual data received in the previous step in 2nd Audiovisual Data Storage Area 206630b1b (S9). The sequence of S8 and S9 is repeated until a specific time arrives.

This paragraph illustrate(s) 2nd Audiovisual Data Replaying Software 206630c6 of Communication Device 200, which replay(s) the 2nd audiovisual data. In this embodiment, the user of Communication Device 200 inputs, by utilizing Input Device 210 (FIG. 1) or via voice recognition system, the 2nd audiovisual data replaying command (S1). Here, the 2nd audiovisual data replaying command is the command to replay the 2nd audiovisual data. CPU 211 (FIG. 1) retrieves the current location data from Current Location Data Storage Area 206630b4 (S2). CPU 211 (FIG. 1) stores the current location data retrieved in the previous step as the 2nd replayed location data in 2nd Replayed Location Data Storage Area 206630b3b (S3). CPU 211 (FIG. 1) retrieves the map data from Map Data Storage Area 206630b5 (S4). CPU 211 (FIG. 1) displays the map data retrieved in the previous step on LCD 201 (FIG. 1) (S5). CPU 211 (FIG. 1) retrieves the 2nd replayed location data from 2nd Replayed Location Data Storage Area 206630b3b (S6). CPU 211 (FIG. 1) retrieves the 2nd replayed icon data from 2nd Replayed Icon Data Storage Area 206630b7b (S7). CPU 211 (FIG. 1) displays the 2nd replayed icon data retrieved in the previous step at the location corresponding to the 2nd replayed location data retrieved in S6 on the map data displayed in S5 (S8). CPU 211 (FIG. 1) retrieves the 2nd audiovisual data from 2nd Audiovisual Data Storage Area 206630b1b from the beginning thereof (S9). CPU 211 (FIG. 1) outputs the 2nd audiovisual data retrieved in the previous step from Speaker 216 (FIG. 1) and LCD 201 (FIG. 1) (S10). The sequence of S9 and S10 is repeated until end of the 2nd audiovisual data.

This paragraph illustrate(s) 2nd Audiovisual Data Recording/Replaying Software 206630c7 of Communication Device 200, which replay(s) the 2nd audiovisual data while recording the data. In this embodiment, the user of Communication Device 200 inputs, by utilizing Input Device 210 (FIG. 1) or via voice recognition system, the 2nd audiovisual data recording/replaying command (S1). Here, the 2nd audiovisual data replaying command is the command to replay the 2nd audiovisual data while recording the data. CPU 211 (FIG. 1) retrieves the current location data from Current Location Data Storage Area 206630b4 (S2). CPU 211 (FIG. 1) stores the current location data retrieved in the previous step as the 2nd recorded location data in 2nd Recorded Location Data Storage Area 206630b2b (S3). CPU 211 (FIG. 1) stores the current location data retrieved in S2 as the 2nd replayed location data in 2nd Replayed Location Data Storage Area 206630b3b S4. CPU 211 F 1 retrieves the map data from Map Data Storage Area 206630b5(S5). CPU 211 (FIG. 1) displays the map data retrieved in the previous step on LCD 201 (FIG. 1) (S6). CPU 211 (FIG. 1) retrieves the 2nd recorded location data from 2nd Recorded Location Data Storage Area 206630b2b (S7). CPU 211 (FIG. 1) retrieves the 2nd recorded icon data from 2nd Recorded Icon Data Storage Area 206630b6b (S8). CPU 211 (FIG. 1) displays the 2nd recorded icon data retrieved in the previous step at the location corresponding to the 2nd recorded location data retrieved in S7 on the map data displayed in S6 (S9). CPU 211 (FIG. 1) retrieves the 2nd replayed location data from 2nd Replayed Location Data Storage Area 206630b3b (S10). CPU 211 (FIG. 1) retrieves the 2nd replayed icon data from 2nd Replayed Icon Data Storage Area 206630b7b (S 11). CPU 211 (FIG. 1) displays the 2nd replayed icon data retrieved in the previous step at the location corresponding to the 2nd replayed location data retrieved in S10 on the map data displayed in S6 (S12). CPU 211 (FIG. 1) receives the 2nd audiovisual data from a TV broadcast center (not shown) (S13). CPU 211 (FIG. 1) stores the 2nd audiovisual data received in the previous step in 2nd Audiovisual Data Storage Area 206630b1b (S14). CPU 211 (FIG. 1) retrieves the 2nd audiovisual data from 2nd Audiovisual Data Storage Area 206630b1b from the beginning thereof (S15). CPU 211 (FIG. 1) outputs the 2nd audiovisual data retrieved in the previous step from Speaker 216 (FIG. 1) and LCD 201 (FIG. 1) (S16). The sequence of S13 and S14 is repeated until a specific time arrives. The sequence of S15 and S16 is repeated until end of the 2nd audiovisual data.

<<Map Editing Function>>

The following paragraphs illustrate the map editing mode implementor which displays a map data, wherein a 1st icon, a 2nd icon, and a 3rd icon are displayed on said map data, when said 1st icon is selected by utilizing said input device, a text document data corresponding thereto is retrieved from a data storage area and displayed on said display, when said 2nd icon is selected by utilizing said input device, an audiovisual data corresponding thereto is retrieved from said data storage area and output from said speaker and said display, and said 3rd icon indicates the current geographic location of said communication device.

This paragraph illustrates the storage area included in Host H. In this embodiment, Host H includes Map Editing Information Storage Area H631a of which the data and the software program(s) stored therein are described hereinafter.

This paragraph illustrates the storage area(s) included in Map Editing Information Storage Area H631a. In this embodiment, Map Editing Information Storage Area H631a includes Map Editing Data Storage Area H631b and Map Editing Software Storage Area H631c. Map Editing Data Storage Area H631b stores the data necessary to implement the present function on the side of Host H, such as the one(s) described hereinafter. Map Editing Software Storage Area H631c stores the software program(s) necessary to implement the present function on the side of Host H, such as the one(s) described hereinafter.

This paragraph illustrates the storage area(s) included in Map Editing Data Storage Area H631b. In this embodiment, Map Editing Data Storage Area H631b includes Map Data Storage Area H631b1, Current Location Data Storage Area H631b2, Pasted Text Data Storage Area H631b3, Pasted Audiovisual Data Storage Area H631b4, Multiple Icon Image Data Storage Area H631b5, Multiple Icon Location Data Storage Area H631b6, and Work Area H631b7. Map Data Storage Area H631b1 stores the map data which is the image data indicating a map. Current Location Data Storage Area H631b2 stores the current location data which indicates the current geographic location of Communication Device 200 in (x,y,z) format. Pasted Text Data Storage Area H631b3 stores the pasted text data which is the text data including alphanumeric data pasted on the map data. Pasted Audiovisual Data Storage Area H631b4 stores the pasted audiovisual data which is the audiovisual data pasted on the map data. Multiple Icon Image Data Storage Area H631b5 stores the data described hereinafter. Multiple Icon Location Data Storage Area H631b6 stores the data described hereinafter. Work Area H631b7 is utilized as a work area to perform calculation and temporarily store data.

This paragraph illustrates the storage area(s) included in Multiple Icon Image Data Storage Area H631b5. In this embodiment, Multiple Icon Image Data Storage Area H631b5 includes Pasted Text Icon Image Data Storage Area H631b5a, Pasted Audiovisual Icon Image Data Storage Area H631b5b, and Current Location Icon Image Data Storage Area H631b5c. Pasted Text Icon Image Data Storage Area H631b5a stores the pasted text icon image data which is the image of the icon utilized to indicate the pasted text data. Pasted Audiovisual Icon Image Data Storage Area H631b5b stores the pasted audiovisual icon image data which is the image of the icon utilized to indicate the pasted audiovisual data. Current Location Icon Image Data Storage Area H631b5c stores the current location icon image data which is the image of the icon utilized to indicate the current location data on the map data.

This paragraph illustrates the storage area(s) included in Multiple Icon Location Data Storage Area H631b6. In this embodiment, Multiple Icon Location Data Storage Area H631b6 includes Pasted Text Icon Location Data Storage Area H631b6a and Pasted Audiovisual Icon Location Data Storage Area H631b6b. Pasted Text Icon Location Data Storage Area H631b6a stores the pasted text icon location data which indicates the location of the pasted text icon image displayed on the map data in (x,y) format. Pasted Audiovisual Icon Location Data Storage Area H631b6b stores the pasted audiovisual icon location data which indicates the location of the pasted audiovisual icon image displayed on the map data in (x,y) format.

This paragraph illustrates the software program(s) stored in Map Editing Software Storage Area H631c. In this embodiment, Map Editing Software Storage Area H631c stores Pasted Text Data Producing Software H631c1, Pasted Audiovisual Data Producing Software H631c2, Pasted Text Icon Location Data Producing Software H631c3, Pasted Audiovisual Icon Location Data Producing Software H631c4 Current Location Data Producing Software H631c5 Multiple Icon Data Displaying Software H631c6, Pasted Text Data Displaying Software H631c7, and Pasted Audiovisual Data Outputting Software H631c8. Pasted Text Data Producing Software H631c1 is the software program described hereinafter. Pasted Audiovisual Data Producing Software H631c2 is the software program described hereinafter. Pasted Text Icon Location Data Producing Software H631c3 is the software program described hereinafter. Pasted Audiovisual Icon Location Data Producing Software H631c4 is the software program described hereinafter. Current Location Data Producing Software H631c5 is the software program described hereinafter. Multiple Icon Data Displaying Software H631c6 is the software program described hereinafter. Pasted Text Data Displaying Software H631c7 is the software program described hereinafter. Pasted Audiovisual Data Outputting Software H631c8 is the software program described hereinafter.

This paragraph illustrates the storage area included in RAM 206 (FIG. 1) of Communication Device 200. In this embodiment, RAM 206 includes Map Editing Information Storage Area 206631a of which the data and the software program(s) stored therein are described hereinafter.

The data and/or the software program(s) necessary to implement the present function may be downloaded from Host H to Communication Device 200.

This paragraph illustrates the storage area(s) included in Map Editing Information Storage Area 206631a. In this embodiment, Map Editing Information Storage Area 206631a includes Map Editing Data Storage Area 206631b and Map Editing Software Storage Area 206631c. Map Editing Data Storage Area 206631b stores the data necessary to implement the present function on the side of Communication Device 200, such as the one(s) described hereinafter. Map Editing Software Storage Area 206631c stores the software program(s) necessary to implement the present function on the side of Communication Device 200, such as the one(s) described hereinafter.

This paragraph illustrates the storage area(s) included in Map Editing Data Storage Area 206631b. In this embodiment, Map Editing Data Storage Area 206631b includes Map Data Storage Area 206631b1, Current Location Data Storage Area 206631b2, Pasted Text Data Storage Area 206631b3, Pasted Audiovisual Data Storage Area 206631b4, Multiple Icon Image Data Storage Area 206631b5, Multiple Icon Location Data Storage Area 206631b6, and Work Area 206631b7. Map Data Storage Area 206631b1 stores the map data which is the image data indicating a map. Current Location Data Storage Area 206631b2 stores the current location data which indicates the current geographic location of Communication Device 200 in (x,y,z) format. Pasted Text Data Storage Area 206631b3 stores the pasted text data which is the text data including alphanumeric data pasted on the map data. Pasted Audiovisual Data Storage Area 206631b4 stores the pasted audiovisual data which is the audiovisual data pasted on the map data. Multiple Icon Image Data Storage Area 206631b5 stores the data described hereinafter. Multiple Icon Location Data Storage Area 206631b6 stores the data described hereinafter. Work Area 206631b7 is utilized as a work area to perform calculation and temporarily store data.

This paragraph illustrates the storage area(s) included in Multiple Icon Image Data Storage Area 206631b5. In this embodiment, Multiple Icon Image Data Storage Area 206631b5 includes Pasted Text Icon Image Data Storage Area 206631b5a, Pasted Audiovisual Icon Image Data Storage Area 206631b5b, and Current Location Icon Image Data Storage Area 206631b5c. Pasted Text Icon Image Data Storage Area 206631b5a stores the pasted text icon image data which is the image of the icon utilized to indicate the pasted text data. Pasted Audiovisual Icon Image Data Storage Area 206631b5b stores the pasted audiovisual icon image data which is the image of the icon utilized to indicate the pasted audiovisual data. Current Location Icon Image Data Storage Area 206631b5c stores the current location icon image data which is the image of the icon utilized to indicate the current location data on the map data.

This paragraph illustrates the storage area(s) included in Multiple Icon Location Data Storage Area 206631b6. In this embodiment, Multiple Icon Location Data Storage Area 206631b6 includes Pasted Text Icon Location Data Storage Area 206631b6a and Pasted Audiovisual Icon Location Data Storage Area 206631b6b. Pasted Text Icon Location Data Storage Area 206631b6a stores the pasted text icon location data which indicates the location of the pasted text icon image displayed on the map data in (x,y) format. Pasted Audiovisual Icon Location Data Storage Area 206631b6b stores the pasted audiovisual icon location data which indicates the location of the pasted audiovisual icon image displayed on the map data in (x,y) format.

This paragraph illustrates the software program(s) stored in Map Editing Software Storage Area 206631c. In this embodiment, Map Editing Software Storage Area 206631c stores Pasted Text Data Producing Software 206631c1, Pasted Audiovisual Data Producing Software 206631c2, Pasted Text Icon Location Data Producing Software 206631c3, Pasted Audiovisual Icon Location Data Producing Software 206631c4, Current Location Data Producing Software 206631c5, Multiple Icon Data Displaying Software 206631c6, Pasted Text Data Displaying Software 206631c7, and Pasted Audiovisual Data Outputting Software 206631c8. Pasted Text Data Producing Software 206631c1 is the software program described hereinafter. Pasted Audiovisual Data Producing Software 206631c2 is the software program described hereinafter. Pasted Text Icon Location Data Producing Software 206631c3 is the software program described hereinafter. Pasted Audiovisual Icon Location Data Producing Software 206631c4 is the software program described hereinafter. Current Location Data Producing Software 206631c5 is the software program described hereinafter. Multiple Icon Data Displaying Software 206631c6 is the software program described hereinafter. Pasted Text Data Displaying Software 206631c7 is the software program described hereinafter. Pasted Audiovisual Data Outputting Software 206631c8 is the software program described hereinafter.

This paragraph illustrate(s) Pasted Text Data Producing Software H631c1 of Host H and Pasted Text Data Producing Software 206631c1 of Communication Device 200, which produce(s) the pasted text data. In this embodiment, the user of Communication Device 200 inputs, by utilizing Input Device 210 (FIG. 1) or via voice recognition system, alphanumeric data (S1). CPU 211 (FIG. 1) produces the pasted text data by utilizing the alphanumeric data input in the previous step and sends the data to Host H in a wireless fashion (S2).

Host H receives the pasted text data from Communication Device 200 and stores the data in Pasted Text Data Storage Area H631b3 (S3).

This paragraph illustrate(s) Pasted Audiovisual Data Producing Software H631c2 of Host H and Pasted Audiovisual Data Producing Software 206631c2 of Communication Device 200, which produce(s) the pasted audiovisual data. In this embodiment, CPU 211 (FIG. 1) retrieves audiovisual data from Microphone 215 (FIG. 1) and CCD Unit 214 (FIG. 1) (S1). CPU 211 (FIG. 1) produces the pasted audiovisual data by utilizing the audiovisual data retrieved in the previous step and sends the data to Host H in a wireless fashion (S2). Host H receives the pasted audiovisual data from Communication Device 200 and stores the data in Pasted Audiovisual Data Storage Area H631b4 (S3).

This paragraph illustrate(s) Pasted Text Icon Location Data Producing Software H631c3 of Host H and Pasted Text Icon Location Data Producing Software 206631c3 of Communication Device 200, which produce(s) the pasted text icon location data. In this embodiment, Host H retrieves the map data from Map Data Storage Area H631b1 and sends the data to Communication Device 200 (S1). CPU 211 (FIG. 1) receives the map data from Host H in a wireless fashion and displays the data on LCD 201 (FIG. 1) (S2). CPU 211 (FIG. 1) identifies the certain location on the map data displayed in the previous step identified by the input signal input via Input Device 210 (FIG. 1) (S3). CPU 211 (FIG. 1) produces the pasted text icon location data by referring to the certain location identified in the previous step and sends the data to Host H in a wireless fashion (S4). Host H receives the pasted text icon location data from Communication Device 200 and stores the data in Pasted Text Icon Location Data Storage Area H631b6a (S5).

This paragraph illustrate(s) Pasted Audiovisual Icon Location Data Producing Software H631c4 of Host H and Pasted Audiovisual Icon Location Data Producing Software 206631c4 of Communication Device 200, which produce(s) the pasted audiovisual icon location data. In this embodiment, Host H retrieves the map data from Map Data Storage Area H631b1 and sends the data to Communication Device 200 (S1). CPU 211 (FIG. 1) receives the map data from Host H in a wireless fashion and displays the data on LCD 201 (FIG. 1) (S2). CPU 211 (FIG. 1) identifies the certain location on the map data displayed in the previous step identified by the input signal input via Input Device 210 (FIG. 1) (S3). CPU 211 (FIG. 1) produces the pasted audiovisual icon location data by referring to the certain location identified in the previous step and sends the data to Host H in a wireless fashion (S4). Host H receives the pasted audiovisual icon location data from Communication Device 200 and stores the data in Pasted Audiovisual Icon Location Data Storage Area H631b6b (S5).

This paragraph illustrate(s) Current Location Data Producing Software H631c5 of Host H and Current Location Data Producing Software 206631c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step and sends the data to Host H in a wireless fashion (S2). Host H receives the current location data from Communication Device 200 and stores the data in Current Location Data Storage Area H631b2 (S3). The foregoing sequence is repeated periodically.

This paragraph illustrate(s) Multiple Icon Data Displaying Software H631c6 of Host H and Multiple Icon Data Displaying Software 206631c6 of Communication Device 200, which display(s) the icons on the map data. In this embodiment, Host H retrieves the map data from Map Data Storage Area H631b1 and sends the data to Communication Device 200 (S1). CPU 211 (FIG. 1) receives the map data from Host H in a wireless fashion and displays the data on LCD 201 (FIG. 1) (S2). Host H retrieves the pasted text icon image data from Pasted Text Icon Image Data Storage Area H631b5a and sends the data to Communication Device 200 (S3). CPU 211 (FIG. 1) receives the pasted text icon image data from Host H in a wireless fashion (S4). Host H retrieves the pasted text icon location data from Pasted Text Icon Location Data Storage Area H631b6a and sends the data to Communication Device 200 (S5). CPU 211 (FIG. 1) receives the pasted text icon location data from Host H in a wireless fashion (S6). (FIG. 1 displays the pasted text icon ima e data received in S4 at the location indicated by the pasted text icon location data received in the previous step on the map data displayed in S2 (S7). Host H retrieves the pasted audiovisual icon image data from Pasted Audiovisual Icon Image Data Storage Area H631b5b and sends the data to Communication Device 200 (S8). CPU 211 (FIG. 1) receives the pasted audiovisual icon image data from Host H in a wireless fashion (S9). Host H retrieves the pasted audiovisual icon location data from Pasted Audiovisual Icon Location Data Storage Area H631b6b and sends the data to Communication Device 200 (S10). CPU 211 (FIG. 1) receives the pasted audiovisual icon location data from Host H in a wireless fashion (S11). CPU 211 (FIG. 1) displays the pasted audiovisual icon image data received in S9 at the location indicated by the pasted audiovisual icon location data received in the previous step on the map data displayed in S2 (S12). Host H retrieves the current location icon image data from Current Location Icon Image Data Storage Area H631b5c and sends the data to Communication Device 200 (S13). CPU 211 (FIG. 1) receives the current location icon image data from Host H in a wireless fashion (S14). Host H retrieves the current location data from Current Location Data Storage Area H631b2 and sends the data to Communication Device 200 (S15). CPU 211 (FIG. 1) receives the current location data from Host H in a wireless fashion (S16). CPU 211 (FIG. 1) displays the current location icon image data received in S14 at the location corresponding to the current location data received in the previous step on the map data displayed in S2 (S17). The foregoing sequence is repeated periodically.

This paragraph illustrate(s) Pasted Text Data Displaying Software H631c7 of Host H and Pasted Text Data Displaying Software 206631c7 of Communication Device 200, which display(s) the pasted text data. In this embodiment, the user of Communication Device 200 inputs, by utilizing Input Device 210 (FIG. 1) or via voice recognition system, the pasted text data displaying command (S1). Here, the pasted text data displaying command is the command to display the pasted text data. CPU 211 (FIG. 1) sends the pasted text data displaying command input in the previous step to Host H in a wireless fashion (S2). Host H receives the pasted text data displaying command from Communication Device 200 (S3). Host H retrieves the pasted text data from Pasted Text Data Storage Area H631b3 and sends the data to Communication Device 200 (S4). CPU 211 (FIG. 1) receives the pasted text data from Host H in a wireless fashion and displays the data on LCD 201 (FIG. 1) (S5).

This paragraph illustrate(s) Pasted Audiovisual Data Outputting Software H631c8 of Host H and Pasted Audiovisual Data Outputting Software 206631c8 of Communication Device 200, which output(s) the pasted audiovisual data. In this embodiment, the user of Communication Device 200 inputs, by utilizing Input Device 210 (FIG. 1) or via voice recognition system, the pasted audiovisual data displaying command (S1). Here, the pasted audiovisual data displaying command is the command to output the pasted audiovisual data. CPU 211 (FIG. 1) sends the pasted audiovisual data displaying command input in the previous step to Host H in a wireless fashion (S2). Host H receives the pasted audiovisual data displaying command from Communication Device 200 (S3). Host H retrieves the pasted audiovisual data from Pasted Audiovisual Data Storage Area H631b4and sends the data to Communication Device 200 (S4). CPU 211 (FIG. 1) receives the pasted audiovisual data from Host H in a wireless fashion and outputs the data from Speaker 216 (FIG. 1) and LCD 201 (FIG. 1) (S5).

The following paragraphs illustrate another embodiment wherein Communication Device 200 plays the major role in implementing the present function.

This paragraph illustrate(s) Pasted Text Data Producing Software 206631c1 of Communication Device 200, which produce(s) the pasted text data. In this embodiment, the user of Communication Device 200 inputs, by utilizing Input Device 210 (FIG. 1) or via voice recognition system, alphanumeric data (S1). CPU 211 (FIG. 1) produces the pasted text data by utilizing the alphanumeric data input in the previous step (S2). CPU 211 (FIG. 1) stores the pasted text data produced in the previous step in Pasted Text Data Storage Area 206631b3 (S3).

This paragraph illustrate(s) Pasted Audiovisual Data Producing Software 206631c2 of Communication Device 200, which produce(s) the pasted audiovisual data. In this embodiment, CPU 211 (FIG. 1) retrieves audiovisual data from Microphone 215 (FIG. 1) and CCD Unit 214 (FIG. 1) (S1). CPU 211 (FIG. 1) produces the pasted audiovisual data by utilizing the audiovisual data retrieved in the previous step (S2). CPU 211 (FIG. 1) stores the pasted audiovisual data produced in the previous step in Pasted Audiovisual Data Storage Area 206631b4 (S3).

This paragraph illustrate(s) Pasted Text Icon Location Data Producing Software 206631c3 of Communication Device 200, which produce(s) the pasted text icon location data. In this embodiment, CPU 211 (FIG. 1) retrieves the map data from Map Data Storage Area 206631b1 (S1). CPU 211 (FIG. 1) displays the map data retrieved in the previous step on LCD 201 (FIG. 1) (S2). CPU 211 (FIG. 1) identifies the certain location on the map data displayed in the previous step identified by the input signal input via Input Device 210 (FIG. 1) (S3). CPU 211 (FIG. 1) produces the pasted text icon location data by referring to the certain location identified in the previous step (S4). CPU 211 (FIG. 1) stores the pasted text icon location data produced in the previous step in Pasted Text Icon Location Data Storage Area 206631b6a (S5).

This paragraph illustrate(s) Pasted Audiovisual Icon Location Data Producing Software 206631c4 of Communication Device 200, which produce(s) the pasted audiovisual icon location data. In this embodiment, CPU 211 (FIG. 1) retrieves the map data from Map Data Storage Area 206631b1 (S1). CPU 211 (FIG. 1) displays the map data retrieved in the previous step on LCD 201 (FIG. 1) (S2). CPU 211 (FIG. 1) identifies the certain location on the map data displayed in the previous step identified by the input signal input via Input Device 210 (FIG. 1) (S3). CPU 211 (FIG. 1) produces the pasted audiovisual icon location data by referring to the certain location identified in the previous step (S4). CPU 211 (FIG. 1) stores the pasted audiovisual icon location data produced in the previous step in Pasted Audiovisual Location Image Data Storage Area 206631b6b (S5).

This paragraph illustrate(s) Current Location Data Producing Software 206631c5 of Communication Device 200, which produce(s) the current location data. In this embodiment, CPU 211 (FIG. 1) identifies the current location of Communication Device 200 (S1). CPU 211 (FIG. 1) produces the current location data by referring to the current location identified in the previous step (S2). CPU 211 (FIG. 1) stores the current location data produced in the previous step in Current Location Data Storage Area 206631b2 (S3). The foregoing sequence is repeated periodically.

This paragraph illustrate(s) Multiple Icon Data Displaying Software 206631c6 of Communication Device 200, which display(s) the icons on the map data. In this embodiment, CPU 211 (FIG. 1) retrieves the map data from Map Data Storage Area 206631b1 (S1). CPU 211 (FIG. 1) displays the map data retrieved in the previous step on LCD 201 (FIG. 1) (S2). CPU 211 (FIG. 1) retrieves the pasted text icon image data from Pasted Text Icon Image Data Storage Area 206631b5a (S3). CPU 211 (FIG. 1) retrieves the pasted text icon location data from Pasted Text Icon Location Data Storage Area 206631b6a (S4). CPU 211 (FIG. 1) displays the pasted text icon image data retrieved in S3 at the location indicated by the pasted text icon location data retrieved in the previous step on the map data displayed in S2 (S5). CPU 211 (FIG. 1) retrieves the pasted audiovisual icon image data from Pasted Audiovisual Icon Image Data Storage Area 206631b5b (S6). CPU 211 (FIG. 1) retrieves the pasted audiovisual icon location data from Pasted Audiovisual Icon Location Data Storage Area 206631b6b (S7). CPU 211 (FIG. 1) displays the pasted audiovisual icon image data retrieved in S6 at the location indicated by the pasted audiovisual icon location data retrieved in the previous step on the map data displayed in S2 (S8). CPU 211 (FIG. 1) retrieves the current location icon image data from Current Location Icon Image Data Storage Area 206631b5c (S9). CPU 211 (FIG. 1) retrieves the current location data from Current Location Data Storage Area 206631b2 (S10). CPU 211 (FIG. 1) displays the current location icon image data retrieved in S9 at the location corresponding to the current location data retrieved in the previous step on the map data displayed in S2 (S 11). The foregoing sequence is repeated periodically.

This paragraph illustrate(s) Pasted Text Data Displaying Software 206631c7 of Communication Device 200, which display(s) the pasted text data. In this embodiment, the user of Communication Device 200 inputs, by utilizing Input Device 210 (FIG. 1) or via voice recognition system, the pasted text data displaying command (S1). Here, the pasted text data displaying command is the command to display the pasted text data. CPU 211 (FIG. 1) retrieves the pasted text data from Pasted Text Data Storage Area 206631b3 (S2). CPU 211 (FIG. 1) displays the pasted text data retrieved in the previous step on LCD 201 (FIG. 1) (S3).

This paragraph illustrate(s) Pasted Audiovisual Data Outputting Software 206631c8 of Communication Device 200, which output(s) the pasted audiovisual data. In this embodiment, the user of Communication Device 200 inputs, by utilizing Input Device 210 (FIG. 1) or via voice recognition system, the pasted audiovisual data displaying command (S1). Here, the pasted audiovisual data displaying command is the command to output the pasted audiovisual data. CPU 211 (FIG. 1) retrieves the pasted audiovisual data from Pasted Audiovisual Data Storage Area 206631b4 (S2). CPU 211 (FIG. 1) outputs the pasted audiovisual data retrieved in the previous step from Speaker 216 (FIG. 1) and LCD 201 (FIG. 1) (S3).

<<Incorporation By Reference>>

All paragraphs and drawings described in U.S. Ser. No. 11/774,571, filed Jul. 7, 2007, are incorporated to this application by reference, particularly the following: the preamble described in paragraph [2149 ](no drawings); Communication Device 200 (Voice Communication Mode) described in paragraphs [2150] through [2155] (FIGS. 1 through 2c); Voice Recognition System described in paragraphs [2156] through [2188] Positioning System described in paragraphs [2189] through [2220] (FIGS. 20a through 32e); Auto Backup System described in paragraphs [2221] through [2230] (FIGS. 33 through 37); Signal Amplifier described in paragraphs [2231] through [2236] (FIG. 38); Audio/Video Data Capturing System described in paragraphs [8 2237] through [2249] (FIGS. 39 through 44b); Digital Mirror Function (1) described in paragraphs [2250] through [2258] (FIGS. 44c through 44e); Caller ID System described in paragraphs [2259] through [2266] (FIGS. 45 through 47); Stock Purchasing Function described in paragraphs [2267] through [2276] (FIGS. 48 through 52); Timer Email Function described in paragraphs [2277] through [2283] (FIGS. 53a and 53b); Call Blocking Function described in paragraphs [2284] through [2297] (FIGS. 54 through 59); Online Payment Function described in paragraphs [2298] through [2307] (FIGS. 60 through 64); Navigation System described in paragraphs [2308] through [2330] (FIGS. 65 through 74a); Remote Controlling System described in paragraphs [2331] through [2349] (FIGS. 75 through 85); Auto Emergency Calling System described in paragraphs [2350] through [2358] (FIGS. 86 and 87); Cellular TV Function described in paragraphs [2359] through [2443] (FIGS. 88 through 135); 3D Video Game Function described in paragraphs [2444] through [2456] (FIGS. 136 through 144); Digital Mirror Function (2) described in paragraphs [2457] through [2466] (FIGS. 145 through 155); Voice Recognition Sys—E-mail (2) described in paragraphs [2467] through [2475] (FIGS. 156 through 160); Positioning System—GPS Search Engine described in paragraphs [2476] through [2518] (FIGS. 161 through 182); Mobile Ignition Key Function described in paragraphs [2519] through [2541] (FIGS. 183 through 201); Voice Print Authentication System described in paragraphs [2542] through [2552] (FIGS. 202 through 211); Fingerprint Authentication System described in paragraphs [2553] through [2565] (FIGS. 212 through 221); Auto Time Adjust Function described in paragraphs [2566] through [2570] (FIGS. 222 through 224); Video/Photo Mode described in paragraphs [2571] through [2599] (FIGS. 225 through 242); Call Taxi Function described in paragraphs [2600] through [2640] (FIGS. 243 through 269); Shooting Video Game Function described in paragraphs [2641] through [2657] (FIGS. 270 through 283); Driving Video Game Function described in paragraphs [2658] through [2671] (FIGS. 284 through 294); Address Book Updating Function described in paragraphs [2672] through [2692] (FIGS. 295 through 312); Batch Address Book Updating Function—With Host described in paragraphs [2693] through [2714] (FIGS. 313 through 329); Batch Address Book Updating Function—Peer-To-Peer Connection described in paragraphs [2715] through [2719] (FIGS. 329a through 329c); Batch Scheduler Updating Function—With Host described in paragraphs [2720] through [2743] (FIGS. 330 through 350); Batch Scheduler Updating Function—Peer-To-Peer Connection described in paragraphs [2744] through [2748] (FIGS. 351 and 352); Calculator Function described in paragraphs [2749] through [2754] (FIGS. 353 through 356); Spreadsheet Function described in paragraphs [2755] through [2762] (FIGS. 357 through 360); Word Processing Function described in paragraphs [2763] through [2778] (FIGS. 361 through 373); TV Remote Controller Function described in paragraphs [2779] through [2801] (FIGS. 374 through 394); CD/PC Inter-communicating Function described in paragraphs [2802] through [2826] (FIGS. 413 through 427); PDWR Sound Selecting Function described in paragraphs [2827] through [2863] (FIGS. 428 through 456); Start Up Software Function described in paragraphs [2864] through [2880] (FIGS. 457 through 466); Another Embodiment Of Communication Device 200 described in paragraphs [2881] through [2885] (FIGS. 467a through 467d); Stereo Audio Data Output Function described in paragraphs [2886] through [2905] (FIGS. 468 through 479); Stereo Visual Data Output Function described in paragraphs [2906] through [2925] (FIGS. 480 through 491); Multiple Signal Processing Function described in paragraphs [2926] through [2998] (FIGS. 492 through 529); Positioning System—Pin-pointing Function described in paragraphs [2999] through [3032] (FIGS. 530 through 553); Artificial Satellite Host described in paragraphs [3033] through [3051] (FIGS. 554 through 567); CCD Bar Code Reader Function described in paragraphs [3052] through [3073] (FIGS. 568 through 579); Online Renting Function described in paragraphs [3074] through [3151] (FIGS. 580 through 633); SOS Calling Function described in paragraphs [3152] through [3172] (FIGS. 634 through 645); Input Device described in paragraphs [3173] through [3178] (FIGS. 646 through 650); PC Remote Controlling Function described in paragraphs [3179] through [3214] (FIGS. 651 through 670); PC Remote Downloading Function described in paragraphs [3215] through [3264] (FIGS. 671 through 701); Audiovisual Playback Function described in paragraphs [3265] through [3290] (FIGS. 702 through 716); Audio Playback Function described in paragraphs [3291] through [3315] (FIGS. 717 through 731); Ticket Purchasing Function described in paragraphs [3316] through [3345] (FIGS. 732 through 753); Remote Data Erasing Function described in paragraphs [3346] through [3375](FIGS. 754 through 774); Business Card Function described in paragraphs [3376] through [3392] (FIGS. 775 through 783); Game Vibrating Function described in paragraphs [3393] through [3403](FIGS. 784 through 786); Part-time Job Finding Function described in paragraphs [3404] through [3424] (FIGS. 787 through 801); Parking Lot Finding Function described in paragraphs [3425] through [3464] (FIGS. 802 through 832); Parts Upgradable Communication Device described in paragraphs [3465] through [3490] (FIGS. 833a through 833x); On Demand TV Function described in paragraphs [3491] through [3521] (FIGS. 834 through 855); Inter-communicating TV Function described in paragraphs [3522] through [3556] (FIGS. 856 through 882); Display Controlling Function described in paragraphs [3557] through [3574] (FIGS. 883 through 894); Multiple Party Communicating Function described in paragraphs [3575] through [3608] (FIGS. 894a through 917); Display Brightness Controlling Function described in paragraphs [3609] through [3618] (FIGS. 918 through 923); Multiple Party Pin-pointing Function described in paragraphs [3619] through [3666](FIGS. 924 through 950f) Digital Camera Function described in paragraphs [3667] through [3694] (FIGS. 951 through 968); Phone Number Linking Function described in paragraphs [3695] through [3718](FIGS. 968a through 983); Multiple Window Displaying Function described in paragraphs [3719] through [3737] (FIGS. 984 through 995); Mouse Pointer Displaying Function described in paragraphs [3738] through [3775] (FIGS. 996 through 1021); House Item Pin-pointing Function described in paragraphs [3776] through [3935] (FIGS. 1022 through 1152); Membership Administrating Function described in paragraphs [3936] through [3978] (FIGS. 1153 through 1188); Keyword Search Timer Recording Function described in paragraphs [3979] through [4070] (FIGS. 1189 through 1254); Weather Forecast Displaying Function described in paragraphs [4071] through [4112] (FIGS. 1255 through 1288); Multiple Language Displaying Function described in paragraphs [4113] through [4170] (FIGS. 1289 through 1331); Caller's Information Displaying Function described in paragraphs [4171] through [4224] (FIGS. 1332 through 1375); Communication Device Remote Controlling Function (By Phone) described in paragraphs [4225] through [4265] (FIGS. 1394 through 1415); Communication Device Remote Controlling Function (By Web) described in paragraphs [4266] through [4306] (FIGS. 1416 through 1437); Shortcut Icon Displaying Function described in paragraphs [4307] through [4334] (FIGS. 1438 through 1455); Task Tray Icon Displaying Function described in paragraphs [4335] through [4357] (FIGS. 1456 through 1470); Multiple Channel Processing Function described in paragraphs [4358] through [4405] (FIGS. 1471 through 1498); Solar Battery Charging Function described in paragraphs [4406] through [4419 ](FIGS. 1499 through 1509); OS Updating Function described in paragraphs [4420] through [4487 ](FIGS. 1510 through 1575); Device Managing Function described in paragraphs [4488] through [4505 ](FIGS. 1576 through 1587); Automobile Controlling Function described in paragraphs [4506] through [4554] (FIGS. 1588 through 1627); OCR Function described in paragraphs [4555] through [4590 ](FIGS. 1628 through 1652); Real-time GPS Function described in paragraphs [4591] through [4660 ](FIGS. 1653 through 1712); CCD Video Stabilizing Function described in paragraphs [4661] through [4692] (FIGS. 1713 through 1736); DVD Remote Controlling Function described in paragraphs [4693] through [4731] (FIGS. 1737 through 1757); Dual Frame Buffer Implementing Function described in paragraphs [4732] through [4748] (FIGS. 1758 through 1767); Mouse Pointer Image Auto Changing Function described in paragraphs [4749] through [4762] (FIGS. 1768 through 1774); Dual CCD Camera Function described in paragraphs [4763] through [4783] (FIGS. 1775a through 1786); Radio Tuner Function described in paragraphs [4784] through [4814] (FIGS. 1787 through 1812); Registered Voice Recognizing Function described in paragraphs [4815] through [4854 ](FIGS. 1813 through 1842); Host's TV Resolution Converting Function described in paragraphs [4855] through [4884] (FIGS. 1843 through 1864); Voice Shortcut Recognizing Function described in paragraphs [4885] through [4919] (FIGS. 1865 through 1889); Vital Sign Monitoring Function described in paragraphs [4920] through [5009] (FIGS. 1890a through 1954); Three-Dimensional Map described in (FIGS. 2 and 3); Auto Collision Avoiding Function described in (FIGS. 4 through 7); Remote Controlling System described in (FIGS. 8a through FIG. 10); Emergency Landing System described in (FIGS. 11 through FIG. 12b); Connection Between Host H And Carrier 300 described in (FIG. 13); 3D Map Data Updating Function described in (FIGS. 16 through 30); Auto Collision Avoiding Function—Other Embodiments described in (FIGS. 31 through 34); Satellite TV Function described in (FIGS. 35 through 50); Wireless Communication Facilitating System described in (FIGS. 51 through 64b); Three-Dimensional Map described in (??); Attached File Emailing Function described in paragraphs [5009.1] through [5009.13] (FIGS. 1955 through 1961); Movie eTicket Function described in paragraphs [5009.14] through [5009.66] (FIGS. 1962 through 2002); Carrier Prepaid eCard Function described in paragraphs [5009.67] through [5009.104] (FIGS. 2003 through 2032); Carrier ePass Function described in paragraphs [5009.105] through [5009.144] (FIGS. 2033 through 2061b); Communication Device 200 Installed In Carrier described in paragraphs [5009.145] and [5009.146] (FIG. 2062); Wireless Communication Facilitating System described in paragraphs [5009.147] through [5009.176] (FIGS. 2063 through 2076b); In-Carrier Notifying Function described in paragraphs [5009.177] through [5009.207] (FIGS. 2077 through 2093); Station Name Notifying Function described in paragraphs [5009.208] through [5009.237] (FIGS. 2094 through 2110); Restaurant eMenu Function described in paragraphs [5009.238] through [5009.280] (FIGS. 2111 through 2144); Geographic Location Recording Function described in paragraphs [5009.281] through [5009.322] (FIGS. 2145 through 2176b); CCD Dictionary Function described in paragraphs [5009.323] through [5009.347] (FIGS. 2177 through 2195b); Schedule Notifying Function described in paragraphs [5009.348] through [5009.374] (FIGS. 2196 through 2215); Customized Device Purchasing System described in paragraphs [5009.375] through [5009.415] (FIGS. 2216 through 2250); Multiple Type TV Program Distributing System described in paragraphs [5009.416] through [5009.446] (FIGS. 2251 through 2274); Multiple TV Screen Displaying Function described in paragraphs [5009.447] through [5009.478] (FIGS. 2275 through 2297); Touch Panel Function described in paragraphs [5009.479] through [5009.504] (FIGS. 2298 through 2315); Communication Device Finding Function described in paragraphs [5009.505] through [5009.516] (FIGS. 2316 through 2322); Carrier Safety Measure Controlling Function described in paragraphs [5009.517] through [5009.551] (FIGS. 2323 through 2342); Product Information Retrieving Function (CCD) described in paragraphs [5009.552] through [5009.580] (FIGS. 2343 through 2360); Product Information Stored Chip Function described in paragraphs [5009.581] through [5009.618] (FIGS. 2361 through 2385); Karaoke Playing Function described in paragraphs [5009.619] through [5009.647] (FIGS. 2386 through 2406); Performing Pattern Identifying Anti-Virus Function described in paragraphs [5009.648] through [5009.670] (FIGS. 2407 through 2421); Continue Enabled Video Game Function described in paragraphs [5009.671] through [5009.693] (FIGS. 2422 through 2436); Resume Enabled Video Game Function described in paragraphs [5009.694] through [5009.716] (FIGS. 2437 through 2451); Signal Forwarding Function described in paragraphs [5009.717] through [5009.745] (FIGS. 2452 through 2472); In-Carrier Auto Implementing Mode Function described in paragraphs [5009.746] through [5009.775] (FIGS. 2473 through 2492); Voice Message Displaying Function described in paragraphs [5009.776] through [5009.796] (FIGS. 2493 through 2503c); Human Toes Displaying Function described in paragraphs [5009.797] through [5009.814] (FIGS. 2504 through 2521); Wrinkles/Muscles Displaying Function described in paragraphs [5009.815] through [5009.856] (FIGS. 2522a through 2552e); Protruded Body Part Displaying Function described in paragraphs [5009.857] through [5009.876] (FIGS. 2553 through 2566b); Satellite TV Program Displaying Function described in paragraphs [5009.877] through [5009.921 ](FIGS. 2567 through 2601); Definition of Communication Device 200 described in paragraphs [5009.922] and [5009.923] (no drawings); Remote Parameter Setting Function described in paragraphs [5009.924] through [5009.1017] (FIGS. 2602 through 2682); Multiple Sender's Email Address Function described in paragraphs [5009.1018] through [5009.1035] (FIGS. 2683 through 2695); Multiple Phone Number Function described in paragraphs [5009.1036] through [5009.1055] (FIGS. 2696 through 2709); TV Commercial Customizing Function described in paragraphs [5009.1056] through [5009.1085] (FIGS. 2710 through 2732c); Common Video Game Platform Function described in paragraphs [5009.1086] through [5009.1102] (FIGS. 2733 through 2741); Directory Displaying Function described in paragraphs [5009.1103] through

[5009.1130] (FIGS. 2742 through 2761); Directory Customizing Function described in paragraphs [5009.1131] through [5009.1186] (FIGS. 2762 through 2807); Host's Directory Customizing Function described in paragraphs [5009.1187] through [5009.1246] (FIGS. 2808 through 2853); Trash Can Function described in paragraphs [5009.1247] through [5009.1295] (FIGS. 2854 through 28950; Motion Character Displaying Function described in paragraphs [5009.1296] through [5009.1318] (FIGS. 2896 through 2909); Bookmark Displaying Function described in paragraphs [5009.1319] through [5009.1374] (FIGS. 2910 through 2955); CCD/LCD Function described in paragraphs [5009.1375] through [5009.1387] (FIGS. 2956 through 2959b); Pop Up Window Blocking Function described in paragraphs [5009.1388] through [5009.1401] (FIGS. 2960 through 2965); Map Heading Up Function described in paragraphs [5009.1402] through [5009.1421] (FIGS. 2966 through 2976); Copy Once Function described in paragraphs [5009.1422] through [5009.1443] (FIGS. 2977 through 2991); Copy Restricted Software Integrated Data described in paragraphs [5009.1444] through [5009.1457] (FIGS. 2992 through 2998); Folder Sharing Function described in paragraphs [5009.1458] through [5009.1508] (FIGS. 2999 through 3038c); Email Folder Managing Function described in paragraphs [5009.1509] through [5009.1577] (FIGS. 3039 through 3092e); Power On Auto Software Executing Function described in paragraphs [5009.1578] through [5009.1594] (FIGS. 3093 through 3103); Enhanced TV Remote Controlling Function described in paragraphs [5009.1595] through [5009.1639] (FIGS. 3104 through 3137c); 3 CCD Unit Function described in paragraphs [5009.1640] through [5009.1660] (FIGS. 3138 through 3150c); Multiple Direction Scrolling Function described in paragraphs [5009.1661] through [5009.1762] (FIGS. 3151 through 3238); Radio Frequency Soft Handover Function described in paragraphs [5009.1763] through [5009.1793] (FIGS. 3239 through 3262); Inter Com Function described in paragraphs [5009.1794] through [5009.1816] (FIGS. 3263 through 3277c); Website History Recording Function described in paragraphs [5009.1817] through [5009.1870] (FIGS. 3278 through 3324); Motion Picture Thumbnail Displaying Function described in paragraphs [5009.1871] through [5009.1908] (FIGS. 3325 through 3353b); 2D/3D Map Displaying Function described in paragraphs [5009.1909] through [5009.1952] (FIGS. 3354 through 3380b); Remote Schedule Notifying Function described in paragraphs [5009.1953] through [5009.1975] (FIGS. 3381 through 3393); Remote Email Notifying Function described in paragraphs [5009.1976] through [5009.2000] (FIGS. 3394 through 3406); Remote Document Printing Function described in paragraphs [5009.2001] through [5009.2022] (FIGS. 3407 through 3419b); Anti-virus Protection Identifying Function described in paragraphs [5009.2023] through [5009.2043] (FIGS. 3420 through 3431c); Alphanumeric Phone Number Dialing Function described in paragraphs [5009.2044] through [5009.2076] (FIGS. 3432 through 3453b); Automobile License Number Dialing Function described in paragraphs [5009.2077] through [5009.2109] (FIGS. 3454 through 3475b); Point Card Function described in paragraphs [5009.2110] through [5009.2147] (FIGS. 3476 through 3504c); Display Sharing Function described in paragraphs [5009.2148] through [5009.2169] (FIGS. 3505 through 3516); Email Filtering Function described in paragraphs [5009.2170] through [5009.2212] (FIGS. 3517 through 3549); Received Email Auto Sorting Function described in paragraphs [5009.2213] through [5009.2238] (FIGS. 3550 through 3565b); Sent Email Auto Sorting Function described in paragraphs [5009.2239] through [5009.2264] (FIGS. 3566 through 3581b); Country Name Displaying Function described in paragraphs [5009.2265] through [5009.2286] (FIGS. 3582 through 3595); Email Attached File Splitting Function described in paragraphs [5009.2287] through [5009.2300] (FIGS. 3596 through 3603c); Auto TV Starting Function described in paragraphs [5009.2301] through [5009.2329] (FIGS. 3604 through 3623); Enhanced TV Program Replaying Function (Communication Device 200) described in paragraphs [5009.2330] through [5009.2361] (FIGS. 3624 through 3648b); Enhanced TV Program Replaying Function (Host H) described in paragraphs [5009.2362] through [5009.2400] (FIGS. 3649 through 3680b); Enhanced TV Program Replaying Function (Devices A and B) described in paragraphs [5009.2401] through [5009.2440] (FIGS. 3681 through 3712b); Enhanced TV Program Replaying Function (Host H, and Devices A and B) described in paragraphs [5009.2441] through [5009.2491] (FIGS. 3713 through 3754b); TV Commercial Skipping Function described in paragraphs [5009.2492] through [5009.2516] (FIGS. 3755 through 3772); Timer Schedule Auto Changing Function described in paragraphs [5009.2517] through [5009.2542] (FIGS. 3773 through 3789); Remote Alarm Setting Function described in paragraphs [5009.2543] through [5009.2585] (FIGS. 3789a through 3817b); Current Location Non-notifying Function described in paragraphs [5009.2586] through [5009.2612 ](FIGS. 3818 through 3833); Device Remotely Locking Function described in paragraphs [5009.2613] through [5009.2644] (FIGS. 3834 through 3857); EZ Macro Function described in paragraphs [5009.2645] through [5009.2668] (FIGS. 3858 through 3873b); Alcohol Level Identifying Function described in paragraphs [5009.2669] through [5009.2694] (FIGS. 3874 through 3889b); Displayed Visual Data Size Modifying Function described in paragraphs [5009.2695] through [5009.2729] (FIGS. 3890 through 3915); Button Size Changing Function described in paragraphs [5009.2730] through [5009.2758] (FIGS. 3916 through 3937); Epayment Sound Selecting Function described in paragraphs [5009.2759] through [5009.2778] (FIGS. 3938 through 3950c); Multiple TV Program Recording Function described in paragraphs [5009.2779] through [5009.2823] (FIGS. 3951 through 3988); TV Program Data Trashcan Function described in paragraphs [5009.2824] through [5009.2856] (FIGS. 3989 through 4010b); Ereceipt Producing Function described in paragraphs [5009.2857] through [5009.2888] (FIGS. 4011 through 4033); Memo Sharing Function described in paragraphs [5009.2889] through [5009.2930] (FIGS. 4034 through 4064); Selected Function Remotely Freezing Function described in paragraphs [5009.2931] through [5009.2964] (FIGS. 4065 through 4085); Selected Software Remotely Activating Function described in paragraphs [5009.2965] through [5009.2998] (FIGS. 4086 through 4106); Selected Function Remotely Activating Function described in paragraphs [5009.2999] through [5009.3032] (FIGS. 4107 through 4127); Selected Software Remotely Freezing Function described in paragraphs [5009.3033] through [5009.3066] (FIGS. 4128 through 4148); Selected Data Remotely Deleting Function described in paragraphs [5009.3067] through [5009.3100] (FIGS. 4149 through 4169); Web Cash Memory Function described in paragraphs [5009.3101] through [5009.3122] (FIGS. 4170 through 4183b); Keypad Auto Unlocking Function described in paragraphs [5009.3123] through [5009.3145] (FIGS. 4184 through 4199); Voice Recog Sys Auto Unlocking Function described in paragraphs [5009.3146] through [5009.3168] (FIGS. 4200 through 4215); Upgraded Voice Recog Sys Auto Unlocking Function described in paragraphs [5009.3169] through [5009.3192] (FIGS. 4216 through 4231); TV Program Information Displaying Function described in paragraphs [5009.3193] through [5009.3215] (FIGS. 4232 through 4247b); Best Signal Auto Selecting Function described in paragraphs [5009.3216] through [5009.3269] (FIGS. 4248 through 4291); Software Timer Activating Function described in paragraphs [5009.3270] through [5009.3295] (FIGS. 4292 through 4305b); Software Timer Terminating Function described in paragraphs [5009.3296] through [5009.3321] (FIGS. 4306 through 4319b); Software Timer Deleting Function described in paragraphs [5009.3322] through [5009.3347] (FIGS. 4320through 4333b); TV Phone Recording Function described in paragraphs [5009.3348] through [5009.3381] (FIGS. 4334 through 4358b); Hybrid GPS Function described in paragraphs [5009.3382] through [5009.3421] (FIGS. 4359 through 4381); Elevator Controlling Function described in paragraphs [5009.3422] through [5009.3447] (FIGS. 4382 through 4397); Device Migrat in Function described in paragraphs [5009.3448] through [5009.3509] (FIGS. 4398 through 4445b); Cordless Phone Connecting Function described in paragraphs [5009.3510] through [5009.3547] (FIGS. 4446 through 4474b); Cash Deposit Function described in paragraphs [5009.3548] through [5009.3585] (FIGS. 4475 through 4497d); Highway Fee Auto Paying Function described in paragraphs [5009.3586] through [5009.3616] (FIGS. 4498 through 4518f); By Distance Auto Action Function described in paragraphs [5009.3617] through [5009.3639] (FIGS. 4519 through 4532); Emoney Transferring Function described in paragraphs [5009.3640] through [5009.3666] (FIGS. 4533 through 4548c); Coupon Disposing Function described in paragraphs [5009.3667] through [5009.3698] (FIGS. 4549 through 4569); Multiple Device Searching Function described in paragraphs [5009.3699] through [5009.3717] (FIGS. 4570 through 4581b); Battery Meter Notifying Function described in paragraphs [5009.3718] through [5009.3737] (FIGS. 4582 through 4593b); Software Infrared Transmitting Function described in paragraphs [5009.3738] through [5009.3759] (FIGS. 4594 through 4606); Electronic Key Function described in paragraphs [5009.3760] through [5009.3824] (FIGS. 4607 through 4647b); Automobile Status Monitoring Function described in paragraphs [5009.3825] through [5009.3885] (FIGS. 4648 through 4691); Enhanced Business Card Transferring Function described in paragraphs [5009.3886] through [5009.3928] (FIGS. 4692 through 4720c); Removal Media Data Transferring Function described in paragraphs [5009.3929] through [5009.3954] (FIGS. 4721 through 4737c); Audiovisual Data Sharing Function described in paragraphs [5009.3955] through [5009.3992] (FIGS. 4738 through 4763b); Email Attachment Supplementing Function described in paragraphs [5009.3993] through [5009.4012] (FIGS. 4764 through 4775c); Other Device File Emailing Function described in paragraphs [5009.4013] through [5009.4043] (FIGS. 4776 through 4799b); Slide Authoring Function described in paragraphs [5009.4044] through [5009.4082] (FIGS. 4800 through 4828); Remote/Local Credit Card Transaction Function described in paragraphs [5009.4083] through [5009.4119] (FIGS. 4829 through 4855d); Unread Email Sorting Function described in paragraphs [5009.4120] through [5009.4166] (FIGS. 4856 through 4890); TV Program Replying Function described in paragraphs [5009.4167] through [5009.4200] (FIGS. 4891 through 4914); PC Keyboard Function described in paragraphs [5009.4201] through [5009.4212] (FIGS. 4915 through 4920b); Antenna Mark Displaying Function described in paragraphs [5009.4213] through [5009.4228] (FIGS. 4921 through 4928b); Enhanced Caller ID Displaying Function described in paragraphs [5009.4229] through [5009.4264] (FIGS. 4929 through 4951c); Enhanced Call Waiting Function described in paragraphs [5009.4265] through [5009.4300] (FIGS. 4952 through 4974c); Phonebook Auto Icon Displaying Function described in paragraphs [5009.4301] through [5009.4332] (FIGS. 4975 through 4996); One Click Call Back Function described in paragraphs [5009.4333] through [5009.4357] (FIGS. 4997 through 5014); Phone Conversation Storing Function described in paragraphs [5009.4358] through [5009.4386] (FIGS. 5015 through 5031c); Caller ID Requesting Function described in paragraphs [5009.4387] through [5009.4410] (FIGS. 5032 through 5045c); Phone Call Audio Notifying Function described in paragraphs [5009.4411] through [5009.4433] (FIGS. 5046 through 5059c); Entry Phone Function described in paragraphs [5009.4434] through [5009.4459] (FIGS. 5060 through 5074b); FAX Sending/Receiving Function described in paragraphs [5009.4460] through [5009.4505] (FIGS. 5075 through 5108b); Other Device's Phone Book Utilizing Function described in paragraphs [5009.4506] through [5009.4536] (FIGS. 5109 through 5128); Multiple Program Executing Function described in paragraphs [5009.4537] through [5009.4564] (FIGS. 5129 through 5148); Removal Medium Operating Function described in paragraphs [5009.4565] through [5009.4601] (FIGS. 5149 through 5178); Removal Medium Audiovisual Data Recording Function described in paragraphs [5009.4602] through [5009.4629] (FIGS. 5178a through 5199) Nearest Printer Selectin Function described in paragraphs [5009.4630] through [5009.4656] (FIGS. 5200 through 5216d); In-Cabin Com Function described in paragraphs [5009.4657] through [5009.4680] (FIGS. 5217 through 5233c); Carrier Current Condition Notifying Function described in paragraphs [5009.4681] through [5009.4710] (FIGS. 5234 through 5251b); Virtual Space Creating Function described in paragraphs [5009.4711] through [5009.4743] (FIGS. 5252 through 5274); Security Camera Function described in paragraphs [5009.4744] through [5009.4778] (FIGS. 5275 through 5295); Remote Camera Controlling Function described in paragraphs [5009.4779] through [5009.4820] (FIGS. 5296 through 5326); Day/Night Camera Function described in paragraphs [5009.4821] through [5009.4851] (FIGS. 5327 through 5346); Multiple Wireless Signal Handover Function described in paragraphs [5009.4852] through [5009.4897] (FIGS. 5347 through 5365); Multiple Tab Web Browsing Function described in paragraphs [5009.4898] through [5009.4926] (FIGS. 5366 through 5388); Multiple Tab Visual Data Viewing Function described in paragraphs [5009.4927] through [5009.4955] (FIGS. 5389 through 5411); Multiple Tab Document Data Viewing Function described in paragraphs [5009.4956] through [5009.4984] (FIGS. 5412 through 5434); Multiple Tab Email Data Viewing Function described in paragraphs [5009.4985] through [5009.5013] (FIGS. 5435 through 5457); Convenient TV Remote Controlling Function described in paragraphs [5009.5014] through [5009.5034] (FIGS. 5458 through 5471); Form Auto Filling Function described in paragraphs [5009.5035] through [5009.5072] (FIGS. 5472 through 5495e); Hybrid Carrier Function described in paragraphs [5009.5073] through [5009.5105 ] (FIGS. 5496 through 5522b) Carrier Current Condition Monitoring Function described in paragraphs [5009.5106] through [5009.5141] (FIGS. 5523 through 5546c); Memory Defragmenting Function described in paragraphs

[5009.5142] through [5009.5175] (FIGS. 5547 through 5568); Memory Formatting Function described in paragraphs [5009.5176] through [5009.5209] (FIGS. 5569 through 5590); Memory Partitioning Function described in paragraphs [5009.5210] through [5009.5243] (FIGS. 5591 through 5612); TV Phone Pausing Function described in paragraphs [5009.5244] through [5009.5268] (FIGS. 5613 through 5629); Reflecting Object Displaying Function described in paragraphs [5009.5269] through [5009.5294] (FIGS. 5630 through 5648c) Alternative TV Program Receiving Function described in paragraphs [5009.5295] through [5009.5325 ](FIGS. 5649 through 5670c) Alternative Radio Program Receiving Function described in paragraphs [5009.5326] through [5009.5356] (FIGS. 5671 through 5692c); Audiovisual Auto Fading Function described in paragraphs [5009.5357] through [5009.5377] (FIGS. 5693 through 5706); Audio Auto Fading Function described in paragraphs [5009.5378] through [5009.5398] (FIGS. 5707 through 5720); Video-In-Video Displaying Function described in paragraphs [5009.5399] through [5009.5431] (FIGS. 5721 through 5747b); Pre-Installed Item Purchasing Function described in paragraphs [5009.5432] through [5009.5470] (FIGS. 5748 through 5775b); Multiple CPU Function described in paragraphs [5009.5471] through [5009.5476] (FIGS. 5776 and 5777); Radio Music Downloading Function described in paragraphs [5009.5477 ]through [5009.5516] (FIGS. 5778 through 5807); File Auto Saving Function described in paragraphs [5009.5517] through [5009.5559] (FIGS. 5808 through 5837b); TV Tuner Function described in paragraphs [5009.5560] through [5009.5600] (FIGS. 5838 through 5866); GPS Receiver's Log Function described in paragraphs [5009.5601] through [5009.5629] (FIGS. 5867 through 5884b); Remote Room Light Controlling Function described in paragraphs [5009.5630] through [5009.5662] (FIGS. 5885 through 5906b); Remote Kitchen Stove Controlling Function described in paragraphs [5009.5663] through [5009.5695] (FIGS. 5907 through 5928b); Remote Refrigerator Controlling Function described in paragraphs [5009.5696] through [5009.5728] (FIGS. 5929 through 5950b); Remote Washing Machine Controlling Function described in paragraphs [5009.5729] through [5009.5761] (FIGS. 5951 through 5972b); Remote Faucet Controlling Function described in paragraphs [5009.5762] through [5009.5794] (FIGS. 5973 through 5994b); Remote Door Lock Controlling Function described in paragraphs [5009.5795] through [5009.5827] (FIGS. 5995 through 6016b); Remote Air Conditioner Controlling Function described in paragraphs [5009.5828] through [5009.5860] (FIGS. 6017 through 6038b); Remote Vending Machine Controlling Function described in paragraphs [5009.5861] through [5009.5893] (FIGS. 6039 through 6060b); Remote Video Recorder Controlling Function described in paragraphs [5009.5894] through [5009.5926] (FIGS. 6061 through 6082b); Remote Printer Controlling Function described in paragraphs [5009.5927] through [5009.5959 ](FIGS. 6083 through 6104b); Remote Camera Controlling Function described in paragraphs [5009.5960] through [5009.5992] (FIGS. 6105 through 6126b); Remote TV Tuner Controlling Function described in paragraphs [5009.5993] through [5009.6025] (FIGS. 6127 through 6148b); Remote Radio Tuner Controlling Function described in paragraphs [5009.6026] through [5009.6058] (FIGS. 6149 through 6170b); Remote Computer Controlling Function described in paragraphs [5009.6059] through [5009.6091] (FIGS. 6171 through 6192b); Remote Carrier Controlling Function described in paragraphs [5009.6092] through [5009.6124] (FIGS. 6193 through 6214b); Remote Food Processor Controlling Function described in paragraphs [5009.6125] through [15009.6157] (FIGS. 6215 and 6236b); Remote Dryer Controlling Function described in paragraphs [5009.6158 ]through [5009.6190 ](FIGS. 6237 and 6258b) Remote Rice Cooker Controlling Function described in paragraphs [5009.6191] through [5009.6223] (FIGS. 6259 and 6280b); Remote Sound Outputting Device Controlling Function described in paragraphs [5009.6224] through [5009.6256] (FIGS. 6281 and 6302b); Remote Vacuum Cleaner Controlling Function described in paragraphs [5009.6257] through [5009.6289] (FIGS. 6303 and 6324b); Remote FAX Machine Controlling Function described in paragraphs [5009.6290] through [5009.6322] (FIGS. 6325 and 6346b); Remote Copying Machine Controlling Function described in paragraphs [5009.6323] through [5009.6355] (FIGS. 6347 and 6368b); Remote Coffee Maker Controlling Function described in paragraphs [5009.6356] through [5009.6388] (FIGS. 6369 and 6390b); Remote Scanner Controlling Function described in paragraphs [5009.6389] through [5009.6421 ](FIGS. 6391 and 6412b); Remote Clothes Iron Controlling Function described in paragraphs [5009.6422] through [5009.6454] (FIGS. 6413 and 6434b); Remote Escalator Controlling Function described in paragraphs [5009.6455] through [5009.6487] (FIGS. 6435 and 6456b); Vending Machine Accessing Function described in paragraphs [5009.6488] through [5009.6527] (FIGS. 6457 through 6485d); Audiovisual Data Shuffling Function described in paragraphs [5009.6528] through [5009.6551] (FIGS. 6486 through 6503b); Unknown File Icon Displaying Function described in paragraphs [5009.6552] through [5009.6575] (FIGS. 6504 through 6521c); Audiovisual Document Producing Function described in paragraphs [5009.6576] through [5009.6601] (FIGS. 6522 through 6539b); Audiovisual Data Searching Function described in paragraphs [5009.6602] through [5009.6626] (FIGS. 6540 through 6558b); Finger Print Log-on Function described in paragraphs [5009.6627] through [5009.6645] (FIGS. 6559 through 6571c); Voice Print Log-on Function described in paragraphs [5009.6646] through [5009.6663] (FIGS. 6572 through 6583c); Finger Print Screen Saver Deactivating Function described in paragraphs [5009.6664] through [5009.6682] (FIGS. 6584 through 6596c); Voice Print Screen Saver Deactivating Function described in paragraphs [5009.6683] through [5009.6700] (FIGS. 6597 through 6608c); Finger Print Folder Accessing Function described in paragraphs [5009.6701] through [5009.6719] (FIGS. 6609 through 6621c); Voice Print Folder Accessing Function described in paragraphs [5009.6720] through [5009.6737] (FIGS. 6622 through 6633c); Finger Print File Accessing Function described in paragraphs [5009.6738 ]through [5009.6756 ](FIGS. 6634 through 6646c) Voice Print File Accessing Function described in paragraphs [5009.6757] through [5009.6774] (FIGS. 6647 through 6658c); Finger Print Internet Accessing Function described in paragraphs [5009.6775] through [5009.6793] (FIGS. 6659 through 6671c); Voice Print Internet Accessing Function described in paragraphs [5009.6794] through [5009.6811] (FIGS. 6672 through 6683c); Finger Print PC Log-on Function described in paragraphs [5009.6812] through [5009.6838] (FIGS. 6684 through 6703b); Voice Print PC Log-on Function described in paragraphs [5009.6839] through [5009.6864] (FIGS. 6704 through 6722b); Finger Print PC Screen Saver Deactivating Function described in paragraphs [5009.6865] through [5009.6891] (FIGS. 6723 through 6742b); Voice Print PC Screen Saver Deactivating Function described in paragraphs [5009.6892] through [5009.6917] (FIGS. 6743 through 6761b); Finger Print PC Folder Accessing Function described in paragraphs [5009.6918] through [5009.6944] (FIGS. 6762 through 6781b); Voice Print PC Folder Accessing Function described in paragraphs [5009.6945] through [5009.6970] (FIGS. 6782 through 6800b); Finger Print PC File Accessing Function described in paragraphs [5009.6971] through [5009.6997] (FIGS. 6801 through 6820b); Voice Print PC File Accessing Function described in paragraphs [5009.6998] through [5009.7023] (FIGS. 6821 through 6839b); Finger Print PC Internet Accessing Function described in paragraphs [5009.7024 ]through [5009.7050 ]FIGS. 6840 through 6859b) Voice Print PC Internet Accessing Function described in paragraphs [5009.7051] through [5009.7076] (FIGS. 6860 through 6878b); Shock Proof Memory Function described in paragraphs [5009.7077] through [5009.7093] (FIGS. 6879 through 6889b); Remote Audiovisual Device Controlling Function described in paragraphs [5009.7094] through [5009.7133] (FIGS. 6890 through 6916); Direct TV-Audio Phone Switching Function described in paragraphs [5009.7134] through [5009.7157] (FIGS. 6917 through 6932b); Audiovisual Data Downloading Function described in paragraphs [5009.7158] through [5009.7218] (FIGS. 6933 through 6972); Audio Data Downloading Function described in paragraphs [5009.7219] through [5009.7279] (FIGS. 6973 through 7012); Self-Active Encrypted Image Reader Function described in paragraphs [5009.7280] through [5009.7301] (FIGS. 7013 through 7028c); Robot Remote Controlling Function described in paragraphs [5009.7302] through [5009.7371] (FIGS. 7029 through 7071b); Home Page Displaying Function described in paragraphs [5009.7372] through [5009.7396] (FIGS. 7072 through 7090); Multiple OS Operating Function described in paragraphs [5009.7397] through [5009.7442] (FIGS. 7091 through 7130c); Audiovisual Conversation Data Forwarding Function described in paragraphs [5009.7443] through [5009.7465] (FIGS. 7131 through 7146b); Audio Conversation Data Forwarding Function described in paragraphs [5009.7466] through [5009.7488] (FIGS. 7147 through 7162b); Phone Call Auto Forwarding Function described in paragraphs [5009.7489] through [5009.7514] (FIGS. 7163 through 7180c); Wireless Communication Method Switching Function described in paragraphs [5009.7515] through [5009.7535] (FIGS. 7181 through 7194e); Drafted Email Viewing Function described in paragraphs [5009.7536 ]through [5009.7585 ](FIGS. 7195 through 7236); Email Replying Function described in paragraphs [5009.7586] through [5009.7617] (FIGS. 7237 through 7262b); Attached File Editing Function described in paragraphs [5009.7618] through [5009.7649] (FIGS. 7263 through 7288b); Email Audiovisual Data Auto Blocking Function described in paragraphs [5009.7650] through [5009.7673] (FIGS. 7289 through 7306); HDD Stored TV Program Replaying Function described in paragraphs [5009.7674] through [5009.7695] (FIGS. 7307 through 7322b); Cooking Menu Auto Implementing Function described in paragraphs [5009.7696] through [5009.7722] (FIGS. 7323 through 7343b); Micro Wave Oven Auto Alarm Function described in paragraphs [5009.7723] through [5009.7776] (FIGS. 7344 through 7387b); Oven Temperature Remote Controlling Function described in paragraphs [5009.7777] through [5009.7830] (FIGS. 7388 through 7431c); Audio Amplifying Function described in paragraphs [5009.7831] through [5009.7848] (FIGS. 7432 through 7443b); Calorie Calculating Function described in paragraphs [5009.7849] through [5009.7868] (FIGS. 7444 through 7457b); Sickness Identifying Function described in paragraphs [5009.7869] through [5009.7902] (FIGS. 7458 through 7481b); Weather Hazard Auto Notifying Function described in paragraphs [5009.7903] through [5009.7955] (FIGS. 7482 through 7517d); Phone Call Auto Forwarding Function described in paragraphs [5009.7956] through [5009.7981] (FIGS. 7518 through 7535c); Multiple Massaging Function described in paragraphs [5009.7982] through [5009.8022] (FIGS. 7536 through 7566); Microscope Function described in paragraphs [5009.8023] through [5009.8097] (FIGS. 7567 through 7629); Door Auto Lock/Unlock Function described in paragraphs [5009.8097] through [5009.8139] (FIGS. 7630 through 7658b); Door Auto Close/Open Function described in paragraphs [5009.8140] through [5009.8181] (FIGS. 7659 through 7687b); Room Light Auto On/Off Function described in paragraphs [5009.8182] through [5009.8223] (FIGS. 7688 through 7716b); Air Conditioner Auto On/Off Function described in paragraphs [5009.8224] through [5009.8265] (FIGS. 7717 through 7745b); Heater Auto On/Off Function described in paragraphs [5009.8266] through [5009.8307] (FIGS. 7746 through 7774b); Faucet Auto On/Off Function described in paragraphs [5009.8308] through [5009.8349] (FIGS. 7775 through 7803b); Sound Outputting Device Auto On/Off Function described in paragraphs [5009.8350] through [15009.8391] (FIGS. 7804 through 7832b); Vein Print Log-on Function described in paragraphs [5009.8392] through [5009.8410] (FIGS. 7833 through 7845c); Vein Print Screen Saver Deactivating Function described in paragraphs [5009.8411] through [5009.8429] (FIGS. 7846 through 7858c); Vein Print Folder Accessing Function described in paragraphs [5009.8430] through [5009.8448] (FIGS. 7859 through 7871c); Vein Print File Accessing Function described in paragraphs [5009.8449] through [5009.8467] (FIGS. 7872 through 7884c); Vein Print Internet Accessing Function described in paragraphs [5009.8468] through [5009.8486] (FIGS. 7885 through 7897c); Vein Print PC Log-on Function described in paragraphs [5009.8487] through [5009.8513] (FIGS. 7898 through 7917b); Vein Print PC Screen Saver Deactivating Function described in paragraphs [5009.8514] through [15009.8540] (FIGS. 7918 through 7937b); Vein Print PC Folder Accessing Function described in paragraphs [5009.8541] through [5009.8567] (FIGS. 7938 through 7957b); Vein Print PC File Accessing Function described in paragraphs [5009.8568] through [5009.8594] (FIGS. 7958 through 7977b); Vein Print PC Internet Accessing Function described in paragraphs [5009.8595] through [5009.8621] (FIGS. 7978 through 7997b); Ringtone Auto Updating Function described in paragraphs [5009.8622] through [5009.8643] (FIGS. 7998 through 8013b); Time Limited Current Location Identifying Function described in paragraphs [5009.8644] through [5009.8673] (FIGS. 8014 through 8035b); In Carrier Message Inserting Function described in paragraphs [5009.8674] through [5009.8695 ]FIGS. 8036 through 8050b) Electric Cable Networking Function described in paragraphs [5009.8696 ]through [5009.8707 ](FIGS. 8051 through 8057) Shoe Sole Pressure Adjusting Function described in paragraphs [5009.8708] through [5009.8741] (FIGS. 8058 through 8080b); Finger Print Removal Media Accessing Function described in paragraphs [5009.8742] through [5009.8762] (FIGS. 8081 through 8095b); Voice Print Removal Media Accessing Function described in paragraphs [5009.8763] through [5009.8783] (FIGS. 8096 through 8110b); Vein Print Removal Media Accessing Function described in paragraphs [5009.8784] through [5009.8804] (FIGS. 8111 through 8125b); Finger Print PC Removal Media Accessing Function described in paragraphs [5009.8805 ]through [5009.8833 ]FIGS. 8126 through 8145b) Voice Print PC Removal Media Accessing Function described in paragraphs [5009.8834] through [5009.8862] (FIGS. 8146 through 8165b); Vein Print PC Removal Media Accessing Function described in paragraphs [5009.8863] through [5009.8891] (FIGS. 8166 through 8185b); Printer Function described in paragraphs [5009.8892] through [5009.8967] (FIGS. 8186 through 8245f); Scanner Function described in paragraphs [5009.8968] through [5009.9016] (FIGS. 8246 through 8284b); Multiple Signal Transferring Function described in paragraphs [5009.9017] through [5009.9205] (FIGS. 8285 through 8453); Free Access Point Function described in paragraphs [5009.9206] through [5009.9245] (FIGS. 8454 through 8482); Partial BCC Email Function described in paragraphs [5009.9246] through [5009.9273] (FIGS. 8483 through 8504b); Noise Reversing Function described in paragraphs [5009.9274] through [5009.9291] (FIGS. 8505 through 8516); Door Status Sensing Function described in paragraphs [5009.9292] through [5009.9345] (FIGS. 8517 through 8557); Drawer Status Sensing Function described in paragraphs [5009.9346] through [5009.9399] (FIGS. 8558 through 8598); Window Status Sensing Function described in paragraphs [5009.9400] through [5009.9453] (FIGS. 8599 through 8639); Curtain Status Sensing Function described in paragraphs [5009.9454] through [5009.9509] (FIGS. 8640 through 8680); Gate Status Sensing Function described in paragraphs [5009.9510] through [5009.9563] (FIGS. 8681 through 8721); Stop Watch Function described in paragraphs [5009.9564] through [5009.9584] (FIGS. 8722 through 8736b); Decrementing Time Function described in paragraphs [5009.9585] through [5009.9607] (FIGS. 8737 through 8753b); Energy Efficient Multiple CPU Function described in paragraphs [5009.9608] through [5009.9636] (FIGS. 8754 through 8776b); Content Notifying Function described in paragraphs [5009.9637] through [5009.9681] (FIGS. 8777 through 8809); Virtual Tilting Function described in paragraphs [5009.9682] through [5009.9720] (FIGS. 8810 through 8840); Virtual Vehicle Tilting Function described in paragraphs [5009.9721] through [5009.9758] (FIGS. 8841 through 8871); Device Approach Notifying Function described in paragraphs [5009.9759] through [5009.9801] (FIGS. 8872 through 8904); Clock Alarm Snooze Function described in paragraphs [5009.9802] through [5009.9829] (FIGS. 8905 through 8926); News Auto Outputting Function described in paragraphs [5009.9830] through [5009.9867] (FIGS. 8927 through 8958b); Advertisement Auto Outputting Function described in paragraphs [5009.9868] through [5009.9905] (FIGS. 8959 through 8990b); Online RPG Function described in paragraphs [5009.9906] through [5009.10028] (FIGS. 8991 through 9098b); Inter Device Distance Notifying Function described in paragraphs [5009.10029] through [5009.10065] (FIGS. 9099 through 9126); Link Embedded Motion Picture Displaying Function described in paragraphs [5009.10066] through [5009.10089] (FIGS. 9127 through 9141); Audiovisual Meta Data Producing Function described in paragraphs [5009.10090] through [5009.10128] (FIGS. 9142 through 9171c); Audiovisual Highlight Producing Function described in paragraphs [5009.10129] through [5009.10163] (FIGS. 9172 through 9197); Enhanced Audiovisual Highlight Producing Function described in paragraphs [5009.10164] through [5009.10196] (FIGS. 9198 through 9221); Wireless Power Off Function described in paragraphs [5009.10197] through [5009.10227] (FIGS. 9222 through 9240); Screen Layout Changing Function described in paragraphs [5009.10228] through [5009.10255] (FIGS. 9241 through 9258b); Face Feature Log-on Function described in paragraphs [5009.10256] through [5009.10273] (FIGS. 9259 through 9270c); Face Feature Screen Saver Deactivating Function described in paragraphs [5009.10274] through [5009.10291] (FIGS. 9271 through 9282c); Face Feature Folder Accessing Function described in paragraphs [5009.10292] through [5009.10309] (FIGS. 9283 through 9294c); Face Feature File Accessing Function described in paragraphs [5009.10310] through [5009.10327] (FIGS. 9295 through 9306c); Face Feature Internet Accessing Function described in paragraphs [5009.10328] through [5009.10345] (FIGS. 9307 through 9318c); Face Feature PC Log-on Function described in paragraphs [5009.10346] through [5009.10371] (FIGS. 9319 through 9337b); Face Feature PC Screen Saver Deactivating Function described in paragraphs [5009.10372] through [5009.10397] (FIGS. 9338 through 9356b); Face Feature PC Folder Accessing Function described in paragraphs [5009.10398] through [5009.10423] (FIGS. 9357 through 9375b); Face Feature PC File Accessing Function described in paragraphs [5009.10424] through [5009.10449] (FIGS. 9376 through 9394b); Face Feature PC Internet Accessing Function described in paragraphs [5009.10450] through [5009.10475] (FIGS. 9395 through 9413b); Face Feature Removal Media Accessing Function described in paragraphs [5009.10476] through [5009.10496] (FIGS. 9414 through 9428b); Face Feature PC Removal Media Accessing Function described in paragraphs [5009.10497] through [5009.10524 ]FIGS. 9429 through 9448b) Security Formatted Removal Media Function described in paragraphs [5009.10525] through [5009.10545] (FIGS. 9449 through 9463b); Lite Security Formatted Removal Media Function described in paragraphs [5009.10546] through [5009.10568] (FIGS. 9464 through 9480b); Security Formatted Folder Function described in paragraphs [5009.10569] through [5009.10605] (FIGS. 9481 through 9509b); Host Host Security Formatted Folder Function described in paragraphs [5009.10606] through [5009.10631] (FIGS. 9510 through 9528); Email Security Formatted Folder Function described in paragraphs [5009.10632] through [5009.10668] (FIGS. 9529 through 9557b); Host Email Security Formatted Folder Function described in paragraphs [5009.10669] through [5009.10694] (FIGS. 9558 through 9576); Secured Email Sending Function described in paragraphs [5009.10695] through [5009.10726] (FIGS. 9577through 9599c); Secured Email Receiving Function described in paragraphs [5009.10727] through [5009.10746] (FIGS. 9600 through 9613); Received Email Security Auto Sorting Function described in paragraphs [5009.10747] through [5009.10770] (FIGS. 9614 through 9629b); Secured Email Opening Function described in paragraphs [5009.10771] through [5009.10793] (FIGS. 9630 through 9645b); Secured Email Attached File Opening Function described in paragraphs [5009.10794] through [5009.10818] (FIGS. 9646 through 9663b); Secured Email Attached File Deleting Function described in paragraphs [5009.10819] through [5009.10845] (FIGS. 9664 through 9679b); Unsafe Email Host Handled Function described in paragraphs [5009.10846] through [5009.10873] (FIGS. 9680 through 9701b); Unsafe Attached File Host Handled Function described in paragraphs [5009.10874] through [5009.10901] (FIGS. 9702 through 9723c); Com Stored Email Viewing Function described in paragraphs [5009.10902] through [5009.10925] (FIGS. 9724 through 9741c); Non-secured Email Forwarding Function described in paragraphs [5009.10926] through [5009.10950] (FIGS. 9742 through 9759b); Electronic Money Transferring Function described in paragraphs [5009.10951] through [5009.10993] (FIGS. 9760 through 9790b); Electronic Money Time Identified Transferring Function described in paragraphs [5009.10994] through [5009.11051] (FIGS. 9791 through 9835b); Electronic Money Repeatedly Transferring Function described in paragraphs [5009.11052] through [5009.11117] (FIGS. 9836 through 9888b); Electronic Money Transfer Canceling Function described in paragraphs [5009.11118] through [5009.11194] (FIGS. 9889 through 9952b); Electronic Money Email Transferring Function described in paragraphs [5009.11195] through [5009.11238] (FIGS. 9953 through 9985c); Money Email Time Identified Transferring Function described in paragraphs [5009.11239] through [5009.11286] (FIGS. 9986 through 10022c); Money Email Repeatedly Transferring Function described in paragraphs [5009.11287] through [5009.11338] (FIGS. 10023 through 10063c); Electronic Money Email Transfer Canceling Function described in paragraphs [5009.11339] through [5009.11405] (FIGS. 10064 through 10119c); Address Book Administrating Function described in paragraphs [5009.11406] through [5009.11451] (FIGS. 10120 through 10152b); File Synchronizing Function described in paragraphs [5009.11452] through [5009.11578] (FIGS. 10153 through 10263b); Folder Synchronizing Function described in paragraphs [5009.11579] through [5009.11671] (FIGS. 10264 through 10342b); Area Dependent Software Activating Function described in paragraphs [5009.11672] through [5009.11702] (FIGS. 10343 through 10366b); Area Dependent Message Displaying Function described in paragraphs [5009.11703] through [5009.11730] (FIGS. 10367 through 10388); Visible Light Schedule Communicating Function described in paragraphs [5009.11731] through [5009.11796] (FIGS. 10389 through 10437b); Visible Light Web Address Communicating Function described in paragraphs [5009.11797] through [5009.11862] (FIGS. 10438 through 10486b); Visible Light Software Program Communicating Function described in paragraphs [5009.11863] through [5009.11928] (FIGS. 10487 through 10535b); Visible Light Restaurant Menu Communicating Function described in paragraphs [5009.11929] through [5009.11994] (FIGS. 10536 through 10584b); Visible Light TV Listing Communicating Function described in paragraphs [5009.11995] through [5009.12060] (FIGS. 10585 through 10633b); Visible Light Movie Listing Communicating Function described in paragraphs [5009.12061] through [5009.12126] (FIGS. 10634 through 10682b); Visible Light Product Advertisement Communicating Function described in paragraphs [5009.12127] through [5009.12192] (FIGS. 10683 through 10731b); Visible Light Message Communicating Function described in paragraphs [5009.12193] through [5009.12258] (FIGS. 10732 through 10780b); Visible Light Visual Clip Communicating Function described in paragraphs [5009.12259] through [5009.12324] (FIGS. 10781 through 10829b); Visible Light Weather Forecast Communicating Function described in paragraphs [5009.12325] through [5009.12390] (FIGS. 10830 through 10878b); Visible Light News Clip Communicating Function described in paragraphs [5009.12391] through [5009.12456] (FIGS. 10879 through 10927b); Visible Light Map Clip Communicating Function described in paragraphs [5009.12457] through [5009.12522] (FIGS. 10928 through 10976b); File Thumbnail Preview Function described in paragraphs [5009.12523] through [5009.12555] (FIGS. 10977 through 11002b); Taxi Fare Credit Card Payment Function described in paragraphs [5009.12556] through [5009.12632] (FIGS. 11003 through 11067); Taxi Fare Electronic Money Payment Function described in paragraphs [5009.12633] through [5009.12712] (FIGS. 11068 through 11132); Taxi Destination Identifying Function described in paragraphs [5009.12713] through [5009.12783] (FIGS. 11133 through 11194); Taxi Destination Map Displaying Function described in paragraphs [5009.12784] through [5009.12860] (FIGS. 11195 through 11262); QR Code Schedule Communicating Function described in paragraphs [5009.12861] through [5009.12906] (FIGS. 11263 through 11298b); QR Code Web Address Communicating Function described in paragraphs [5009.12907] through [5009.12952] (FIGS. 11299 through 11334b); QR Code Software Program Communicating Function described in paragraphs [5009.12953] through [5009.12998] (FIGS. 11335 through 11370b); QR Code Restaurant Menu Communicating Function described in paragraphs [5009.12999] through [5009.13044] (FIGS. 11371 through 11406b); QR Code TV Listing Communicating Function described in paragraphs [5009.13045] through [5009.13090] (FIGS. 11407 through 11442b); QR Code Movie Listing Communicating Function described in paragraphs [5009.13091] through [5009.13136] (FIGS. 11443 through 11478b); QR Code Product Advertisement Communicating Function described in paragraphs [5009.13137] through [5009.13182] (FIGS. 11479 through 11514b); QR Code Message Communicating Function described in paragraphs [5009.13183] through [5009.13228] (FIGS. 11515 through 11550b); QR Code Visual Clip Communicating Function described in paragraphs [5009.13229] through [5009.13274] (FIGS. 11551 through 11586b); QR Code Weather Forecast Communicating Function described in paragraphs [5009.13275 ]through [5009.13320 ](FIGS. 11587 through 11622b) OR Code News Clip Communicating Function described in paragraphs [5009.13321] through [5009.13366] (FIGS. 11623through 11658b); QR Code Map Clip Communicating Function described in paragraphs [5009.13367] through [5009.13412] (FIGS. 11659 through 11694b); QR Code Software Activating Function described in paragraphs [5009.13413] through [5009.13458] (FIGS. 11695 through 11730b); RFID Schedule Communicating Function described in paragraphs [5009.13459] through [5009.13508] (FIGS. 11731 through 11770b); RFID Web Address Communicating Function described in paragraphs [5009.13509] through [5009.13558] (FIGS. 11771 through 11810b); RFID Software Program Communicating Function described in paragraphs [5009.13559] through [5009.13608] (FIGS. 11811 through 11850b); RFID Restaurant Menu Communicating Function described in paragraphs [5009.13609] through [5009.13658] (FIGS. 11851 through 11890b); RFID TV Listing Communicating Function described in paragraphs [5009.13659] through [5009.13708] (FIGS. 11891 through 11930b); RFID Movie Listing Communicating Function described in paragraphs [5009.13709] through [5009.13758] (FIGS. 11931 through 11970b); RFID Product Advertisement Communicating Function described in paragraphs [5009.13759] through [5009.13808] (FIGS. 11971 through 12010b); RFID Message Communicating Function described in paragraphs [5009.13809] through [5009.13858] (FIGS. 12011 through 12050b); RFID Visual Clip Communicating Function described in paragraphs [5009.13859] through [5009.13908] (FIGS. 12051 through 12090b); RFID Weather Forecast Communicating Function described in paragraphs [5009.13909] through [5009.13958] (FIGS. 12091 through 12130b); RFID News Clip Communicating Function described in paragraphs [5009.13959] through [5009.14008] (FIGS. 12131 through 12170b); RFID Map Clip Communicating Function described in paragraphs [5009.14009] through [5009.14058] (FIGS. 12171 through 12210b); RFID Software Activating Function described in paragraphs [5009.14059] through [5009.14108] (FIGS. 12211 through 12250b); RFID Software Auto Activating Function described in paragraphs [5009.14109] through [5009.14158] (FIGS. 12251 through 12290b); Carrier Arrival Time Displaying Function described in paragraphs [5009.14159] through

[5009.14283] (FIGS. 12291 through 12401); Multiple Audio Outputting Function described in paragraphs [5009.14284] through [5009.14310] (FIGS. 12402 through 12419); Closest Device Notifying Function described in paragraphs [5009.14311] through [5009.14416] (FIGS. 12420 through 12515); Print Screen Function described in paragraphs [5009.14417] through [5009.14474] (FIGS. 12516 through 12559b); Caller Answering Machine Activating Function described in paragraphs [5009.14475] through [5009.14513] (FIGS. 12560 through 12587); Audiovisual Answering Machine Function described in paragraphs [5009.14514] through [5009.14546] (FIGS. 12588 through 12611); Answering Machine Message Forwarding Function described in paragraphs [5009.14547] through [5009.14607] (FIGS. 12612 through 12657); Area Map Displaying Function described in paragraphs [5009.14608] through [5009.14679] (FIGS. 12658 through 12721b); Road Map Displaying Function described in paragraphs [5009.14680] through [5009.14752] (FIGS. 12722 through 12785b); Email Reading Function described in paragraphs [5009.14753] through [5009.14781] (FIGS. 12786 through 12805c); Stand Alone Email Function described in paragraphs [5009.14782] through [5009.14850] (FIGS. 12806 through 12857b); TV Seamless Viewing Function described in paragraphs [5009.14851] through [5009.14896] (FIGS. 12858 through 12895); Multiple Movable Tab Web Browsing Function described in paragraphs [5009.14897] through [5009.14975] (FIGS. 12896 through 12966); Multiple Movable Tab Visual Data Viewing Function described in paragraphs [5009.14976] through [5009.15054] (FIGS. 12967 through 13037); Multiple Movable Tab Document Data Viewing Function described in paragraphs [5009.15055] through [5009.15133] (FIGS. 13038 through 13108); Multiple Movable Tab Email Data Viewing Function described in paragraphs [5009.15134] through [5009.15212] (FIGS. 13109 through 13179); Lost Com Device Memory Erasing/Rescuing Function described in paragraphs [5009.15213] through [5009.15275] (FIGS. 13180 through 13231c); Lost Com Device Beaconing Function described in paragraphs [5009.15276] through [5009.15353] (FIGS. 13232 through 13296); Area&Country Name Displaying Function described in paragraphs [5009.15354] through [5009.15437] (FIGS. 13297 through 13371); 3D Desktop Function described in paragraphs [5009.15438] through [5009.15536] (FIGS. 13372 through 13457); Carrier Auto Announcing Function described in paragraphs [5009.15537] through [5009.15586] (FIGS. 13458 through 13497b); Virtual Folder Displaying Function described in paragraphs [5009.15587] through [5009.15647] (FIGS. 13498 through 13548b); In-carrier Location Notifying Function described in paragraphs [5009.15648] through [5009.15703] (FIGS. 13549 through 13595c); Address Map Auto Displaying Function described in paragraphs [5009.15704] through [5009.15771] (FIGS. 13596 through 13650c); Brain Wave Device Controlling Function described in paragraphs [5009.15772] through [5009.15806] (FIGS. 13651 through 13679b); Brain Wave Sentence Composing Function described in paragraphs [5009.15807] through [5009.15829] (FIGS. 13680 through 13696); Wheel Standing Function described in paragraphs [5009.15830] through [5009.15858] (FIGS. 13697 through 13719); Robot Body Balancing Function described in paragraphs [5009.15859] through [5009.15905] (FIGS. 13720 through 13760); Robot Leg Balancing Function described in paragraphs [5009.15906] through[5009.159521 (FIGS. 13761 through 13801); Robot Head Balancing Function described in paragraphs [5009.15953] through [5009.15999] (FIGS. 13802 through 13842); Robot Upper Body Balancing Function described in paragraphs [5009.16000] through [5009.16045] (FIGS. 13843 through 13883); Digital Television Function described in paragraphs [5009.16046] through [5009.16075] (FIGS. 13884 through 13906); Total Price Calculating Function described in paragraphs [5009.16076] through [5009.16166] (FIGS. 13907 through 13985c); Brain Wave Carrier Controlling Function described in paragraphs [5009.16167] through [5009.16202] (FIGS. 13986 through 14015b); Electronic Billboard Controlling Function described in paragraphs [5009.16203] through [5009.16323] (FIGS. 14016 through 14123e); Common Phone Number Function described in paragraphs [5009.16324] through [5009.16424] (FIGS. 14124 through 14212c); Hybrid Common Phone Number Function described in paragraphs [5009.16425] through [5009.16525] (FIGS. 14213 through 14301c); Ringtone Volume Auto Adjusting Function described in paragraphs [5009.16526] through [5009.16547] (FIGS. 14302 through 14317b); Ringtone Type Auto Selecting Function described in paragraphs [5009.16548] through [5009.16575] (FIGS. 14318 through 14339b); Television Chatting Function described in paragraphs [5009.16576] through [5009.16650] (FIGS. 14340 through 14405); Device Battery Charging Function described in paragraphs [5009.16651] through [5009.16726] (FIGS. 14406 through 14471b); Hybrid Battery Solar Operating Function described in paragraphs [5009.16727] through [5009.16829] (FIGS. 14472 through 14561); Backup Solar Battery Operating Function described in paragraphs [5009.16830] through [5009.16932] (FIGS. 14562 through 14651); Hybrid Access Point Function described in paragraphs [5009.16933] through [5009.17169] (FIGS. 14652 through 14878g); Earphone Location Identifying Function described in paragraphs [5009.17170] through [5009.17266] (FIGS. 14879 through 14961); Microphone Location Identifying Function described in paragraphs [5009.17267] through [5009.17355] (FIGS. 14962 through 15036); Event Triggered Auto Audiovisual Recording Function described in paragraphs [5009.17356] through [5009.17402] (FIGS. 15037 through 15072b); Event Triggered Auto Audio Recording Function described in paragraphs [5009.17403] through [5009.17449] (FIGS. 15073 through 15108b); Audiovisual Message Bulk Transferring Function described in paragraphs [5009.17450] through [5009.17501] (FIGS. 15109 through 15150b); Multiple Party Conversing Function described in paragraphs [5009.17502] through [5009.17670] (FIGS. 15151 through 15299); Window Monitoring Function described in paragraphs [5009.17671] through [5009.17700] (FIGS. 15300 through 15321b); Window Status Monitoring Function described in paragraphs [5009.17701] through [5009.17730] (FIGS. 15322 through 15343b); Door Monitoring Function described in paragraphs [5009.17731] through [5009.17760] (FIGS. 15344 through 15365b); Door Monitoring Function described in paragraphs [5009.17761] through [5009.17790] (FIGS. 15366 through 15387b); Push-To-Talk Function described in paragraphs [5009.17791] through [5009.18008] (FIGS. 15388 through 15586cPush-To-T); Door Open Monitoring Function described in paragraphs [5009.18009] through [5009.18065] (FIGS. 15587 through 15633b); Window Open Monitoring Function described in paragraphs [5009.18066] through [5009.18122] (FIGS. 15634 through 15680b); Lock Open Monitoring Function described in paragraphs [5009.18123] through [5009.18179] (FIGS. 15681 through 15727b); Destination Proceeding Function described in paragraphs [5009.18180] through [5009.18265] (FIGS. 15728 through 15803d); Driver's Eye Monitoring Safety Function described in paragraphs [5009.18266] through [5009.18316] (FIGS. 15804 through 15845); Driver's Head Monitoring Safety Function described in paragraphs [5009.18317] through [5009.18365] (FIGS. 15846 through 15885); Drawer Open Monitoring Function described in paragraphs [5009.18366] through [5009.18422] (FIGS. 15886 through 15932b); Curtain Open Monitoring Function described in paragraphs [5009.18423] through [5009.18479] (FIGS. 15933 through 15979b); Gate Open Monitoring Function described in paragraphs [5009.18480] through [5009.18536] (FIGS. 15980 through 16026b); Faucet Open Monitoring Function described in paragraphs [5009.18537] through [5009.18593] (FIGS. 16027 through 16073b); Hybrid Refrigerator Function described in paragraphs [5009.18594] through [5009.18695] (FIGS. 16074 through 16159b); Multiple Purpose Chamber Function described in paragraphs [5009.18696] through [5009.18869] (FIGS. 16160 through 16312c); Audiovisual Quality Auto Adjusting Function described in paragraphs [5009.18870] through [5009.18930] (FIGS. 16313 through 16363b); Audio Quality Auto Adjusting Function described in paragraphs [5009.18931] through [5009.18991] (FIGS. 16364 through 16414b); TV Phone Quality Auto Adjusting Function described in paragraphs [5009.18992] through [5009.19100] (FIGS. 16415 through 16512); Voice Phone Quality Auto Adjusting Function described in paragraphs [15009.19101] through [5009.19209] (FIGS. 16513 through 16610); Television Related Audiovisual Downloading Function described in paragraphs [5009.19210] through [5009.19299] (FIGS. 16611 through 16687); Radio Related Audio Downloading Function described in paragraphs [5009.19300] through [5009.19389] (FIGS. 16688 through 16764); Header Displaying Function described in paragraphs [5009.19390] through [5009.19464] (FIG. 16765 through FIG. 16826b); Footer Displaying Function described in paragraphs [5009.19465] through [5009.19539] (FIG. 16827 through FIG. 16888b); Location Scheduled Notifying Function described in paragraphs [5009.19540] through [5009.19602] (FIG. 16889 through FIG. 16941e); Zone Leaving Notifying Function described in paragraphs [5009.19603] through [5009.19675] (FIG. 16942 through FIG. 17005d); Zone Entering Notifying Function described in paragraphs [5009.19676] through [5009.19748] (FIG. 17006 through FIG. 17069d); Power Off Notifying Function described in paragraphs [5009.19749] through [5009.19794] (FIG. 17070 through FIG. 17106d); Power On Notifying Function described in parphs [5009.19795] through [5009.19840] (FIG. 17107 through 17143d); Security Alarm On Notifying Function described in paragraphs [5009.19841] through [5009.19886] (FIG. 17144 through FIG. 17180d); Security Alarm Off Notifying Function described in paragraphs [5009.19887] through [5009.19932] (FIG. 17181 through FIG. 17217d); Email Transfer Notifying Function described in paragraphs [5009.19933] through [5009.19978] (FIG. 17218 through FIG. 17254d); Email Reception Notifying Function described in paragraphs [5009.19979] through [5009.20024] (FIG. 17255 through FIG. 17291d); Making Phone Call Notifying Function described in paragraphs [5009.20025] through [5009.20070] (FIG. 17292 through FIG. 17328d); Phone Call Reception Notifying Function described in paragraphs [5009.20071] through [5009.20116] (FIG. 17329 through FIG. 17365d); Key Pressed Notifying Function described in paragraphs [5009.20117] through [5009.20162] (FIG. 17366 through FIG. 17402d); Software Activation Notifying Function described in paragraphs [5009.20163] through [5009.20208] (FIG. 17403 through FIG. 17439d); Document Opening Notifying Function described in paragraphs [5009.20209] through [5009.20254] (FIG. 17440 through FIG. 17476d); Specified Event Notifying Function described in paragraphs [5009.20255] through [5009.20315] (FIG. 17477 through FIG. 17527d); Television Phone Auto Backup Function described in paragraphs [5009.20316] through [5009.20447] (FIG. 17528 through FIG. 17645b); File Auto Saving Function described in paragraphs [5009.20448] through [5009.20495] (FIG. 17646 through FIG. 17678b); File Compressing Function described in paragraphs [5009.20496] through [5009.20559] (FIG. 17679 through FIG. 17727e); Multiple Phone Number Billing Function described in paragraphs [5009.20560] through [5009.20609] (FIG. 17728 through FIG. 17771); Multiple Device Door Unlocking Function described in paragraphs [5009.20610] through [5009.20685 ](FIG. 17772 through FIG. 17832c); Multiple Device Door Locking Function described in paragraphs [5009.20686] through [5009.20761] (FIG. 17833 through FIG. 17893c); Phone Call Making Log Recording Function described in paragraphs [5009.20762] through [5009.20815] (FIG. 17894 through FIG. 17938d); Phone Call Receiving Log Recording Function described in paragraphs [5009.20816] through [5009.20867] (FIG. 17939 through FIG. 17981d); Phone Call Making Log Exporting Function described in paragraphs [5009.20868] through [5009.20917] (FIG. 17982 through FIG. 18022d); Phone Call Receiving Log Exporting Function described in paragraphs [5009.20918] through [5009.20967] (FIG. 18023 through FIG. 18063d); Phone Call Making Log Synchronizing Function described in paragraphs [5009.20968] through [5009.21021] (FIG. 18064 through FIG. 18106f); Phone Call Receiving Log Synchronizing Function described in paragraphs [5009.21022] through [5009.21075] (FIG. 18107 through FIG. 18149f); 3D Advertisement Displaying Function described in paragraphs [5009.21076] through [5009.21217] (FIG. 18150 through FIG. 18277); Audiovisual Location Capability Function described in paragraphs [5009.21218] through [5009.21276] (FIG. 18278 through FIG. 18325c); Location Audio Notifying Function described in paragraphs [5009.21277] through [5009.21319] (FIG. 18326 through FIG. 18359b); Answering Machine Location Recording Function described in paragraphs [5009.21320] through [5009.21388] (FIG. 18360 through FIG. 18417e); Visual Phone File Sharing Function described in paragraphs [5009.21389] through [5009.21526] (FIG. 18418 through FIG. 18540b); Visual Phone Magnifying Function described in paragraphs [5009.21527] through [5009.21629] (FIG. 18541 through FIG. 18631); Multiple Home Page Displaying Function described in paragraphs [15009.21630 ]through [5009.21700 ](FIG. 18632 through FIG. 18693b FIG. 18632 through FIG. 18693b); Multiple Visual Phone Party Location Identifying Function described in paragraphs [5009.21701] through [5009.21796] (FIG. 18694 through FIG. 18778g); Individual Party Conversation Replaying Function described in paragraphs [5009.21797] through [5009.21962] (FIG. 18779 through FIG. 18929d); Multiple Phone Notifying Function described in paragraphs [5009.21963] through [5009.22050] (FIG. 18930 through FIG. 19004i); Multiple Phone Dial Tone Function described in paragraphs [5009.22051] through [5009.22160] (FIG. 19005 through FIG. 19101f); Multiple Phone New Party Joining Function described in paragraphs [5009.22161] through [5009.22276] (FIG. 19102 through FIG. 19206j); Music Property Setting Function described in paragraphs [5009.22277] through [5009.22302] (FIG. 19207 through FIG. 19226b); Fore/Back round Audio Recording Function described in paragraphs [5009.22303] through [5009.22334] (FIGS. 19227 through 19248); Email Address Phone Calling Function described in paragraphs [5009.22335] through [5009.22392] (FIGS. 19249 through 19295c); Night Vision Displaying Carrier Function described in paragraphs [5009.22393] through [5009.22501] (FIGS. 19296 through 19386b); Phone Number Email Function described in paragraphs [5009.22502] through [5009.22561] (FIGS. 19387 through 19436c); No-Answer Auto Emailing Function described in paragraphs [5009.22562 ]through [5009.22634 ](FIGS. 19437 through 19499e) Linked Page Auto Downloading Function described in paragraphs [5009.22635] through [5009.22662] (FIGS. 19500 through 19519); Folder Auto Hiding Function described in paragraphs [5009.22663] through [5009.22692] (FIGS. 19520 through 19543); Folder Time Defined Hiding Function described in paragraphs [5009.22693] through [5009.22746] (FIGS. 19544 through 19591); Folder Time Defined Revealing Function described in paragraphs [5009.22747] through [5009.22800] (FIGS. 19592 through 19639); Common Phone Number Changing Function described in paragraphs [5009.22801] through [5009.22829] (FIGS. 19640 through 19658c); Common Email Address Changing Function described in paragraphs [5009.22830] through [5009.22858] (FIGS. 19659 through 19677c); Multiple Incrementing Counter Function described in paragraphs [5009.22859] through [5009.22896] (FIGS. 19678 through 19709); Multiple Decrementing Counter Function described in paragraphs [5009.22897] through [5009.22934] (FIGS. 19710 through 19741); Multiple Alarm Clock Function described in paragraphs [5009.22935] through [5009.22984] (FIGS. 19742 through 19783); Alarm Clock Current Location Notifying Function described in paragraphs [5009.22985] through [5009.23022] (FIG. 19784 through FIG. 19815b); Camcorder Auto Time Adjusting Function described in paragraphs [5009.23023] through [5009.23047] (FIG. 19816 through FIG. 19833b); Location Identified Device Information Displaying Function described in paragraphs [5009.23048] through [5009.23098] (FIG. 19834 through FIG. 19875b); Folder Message Displaying Function described in paragraphs [5009.23099] through [5009.23126] (FIG. 19876 through FIG. 19897); Folder Audiovisual Outputting Function described in paragraphs [5009.23127] through [5009.23154] (FIG. 19898 through FIG. 19919); Pistol Monitoring Function described in paragraphs [5009.23155] through [5009.23226] (FIG. 19920 through FIG. 19983b); Earthquake Auto Locking Function described in paragraphs [5009.23227] through [5009.23264] (FIG. 19984 through FIG. 20013); Television Resolution Auto Changing Function described in paragraphs [5009.23265] through [5009.23290] (FIG. 20014 through FIG. 20033); Shortcut Auto Creating Function described in paragraphs [5009.23291] through [5009.23312] (FIG. 20034 through FIG. 20049); Auto Zooming Function described in paragraphs [5009.23313] through [5009.23332] (FIG. 20050 through FIG. 20063b); Oxygen Tank Function described in paragraphs [5009.23333] through [5009.23384] (FIG. 20064 through FIG. 20107); In Carrier Server Function described in paragraphs [5009.23385] through [5009.234301 (FIG. 20108 through FIG. 20146); Silent Mode Auto Subtitle Displaying Function described in paragraphs [5009.23431] through [5009.23454] (FIG. 20147 through FIG. 20164b); Silent Mode Auto Answerphone Message Displaying Function described in paragraphs [5009.23455] through [5009.23476] (FIG. 20165 through FIG. 20180b); Midnight Auto Downloading Function described in paragraphs [5009.23477] through [5009.23498] (FIG. 20181 through FIG. 20196); Shortcut Link Auto Updating Function described in paragraphs [5009.23499] through [5009.23522] (FIG. 20197 through FIG. 20214); Web Page Auto Refreshing Function described in paragraphs [5009.23523] through [5009.23560] (FIG. 20215 through FIG. 20246); Vibrator Remote Activation Function described in paragraphs [5009.23561] through [5009.23584] (FIG. 20247 through FIG. 20263b); Scenario Accordance Vibrating Function described in paragraphs [5009.23585] through [5009.23608] (FIG. 20264 through FIG. 20281); Location Dependent Message Outputting Function described in paragraphs [5009.23609] through [5009.23640] (FIG. 20282 through FIG. 20307c); Location Dependent Program Activating Function described in paragraphs [5009.23641] through [5009.23670] (FIG. 20308 through FIG. 20333c); Multiple Answering Machine Function described in paragraphs [5009.23671] through [5009.23716] (FIG. 20334 through FIG. 20373b); Time Dependent Answering Machine Function described in paragraphs [5009.23717] through [5009.23750] (FIG. 20374 through FIG. 20401b); Television Program Data Storage Area Selecting Function described in paragraphs [5009.23751] through [5009.23799] (FIG. 20402 through FIG. 20444c); Street Address Icon Displaying Function described in paragraphs [5009.23800] through [5009.23829] (FIG. 20445 through FIG. 20468c); Audiovisual Multiple Recording/Replaying Function described in paragraphs [5009.23830] through [5009.23867] (FIG. 20469 through FIG. 20500d); Map Editing Function described in paragraphs [5009.23868] through [5009.23901] (FIG. 20501 through FIG. 20528); Enhanced Television Tuner Remote Controlling Function described in paragraphs [5009.23902] through [5009.23940] (FIG. 20529 through FIG. 20560b); Enhanced DVD Player Remote Controlling Function described in paragraphs [5009.23941] through [5009.24002] (FIG. 20561 through FIG. 20615b); Monetary Value Data Auto Charging Function described in paragraphs [5009.24003] through [5009.24030] (FIG. 20616 through FIG. 20637c); Site Viewing Remotely Prohibiting Function described in paragraphs [5009.24031] through [5009.24062] (FIG. 20638 through FIG. 20662d); Remotely Controlled Device Auto Selecting Function described in paragraphs [5009.24063] through [5009.24110] (FIG. 20663 through FIG. 20702d); Driver Alerting Function described in paragraphs [5009.24111] through [5009.24150] (FIG. 20703 through FIG. 20735b); Robot Controlling Macro Function described in paragraphs [5009.24151] through 15009.24224] (FIG. 20736 through FIG. 20799b); Robot Predetermined Location Proceeding Function described in paragraphs [5009.24225] through [5009.24290] (FIG. 20800 through FIG. 20858); Message Leaving Function described in paragraphs [5009.24291] through [5009.24350] (FIG. 20859 through FIG. 20911c); Unique Folder Icon Attaching Function described in paragraphs [5009.24351] through [5009.24380] (FIG. 20912 through FIG. 20935d); Unique File Icon Attaching Function described in paragraphs [5009.24381] through [5009.24410] (FIG. 20936 through FIG. 20959d); Unique Email Icon Attaching Function described in paragraphs [5009.24411] through [5009.24440] (FIG. 20960 through FIG. 20983d); Device Current Condition Notifying Function described in paragraphs [5009.24441] through [5009.24536] (FIG. 20984 through FIG. 21072d); Device Bulk Duplicating Function described in paragraphs [5009.24537] through [5009.24613] (FIG. 21073 through FIG. 21142c); Program Related Audiovisual Data Auto Downloading Function described in paragraphs [5009.24614] through [5009.24643] (FIG. 21143 through FIG. 21166c); Weather Dependent Program Executing Function described in paragraphs [5009.24644] through [5009.24702] (FIG. 21167 through FIG. 21218d); Audiovisual Outputting Function described in paragraphs [5009.24703] through [5009.24745] (FIG. 21219 through FIG. 21254e); Email Outputting Function described in paragraphs [5009.24746] through [5009.24788] (FIG. 21255 through FIG. 21290e); Document Outputting Function described in paragraphs [5009.24789] through [5009.24831] (FIG. 21291 through FIG. 21326e); Program Executing Function described in paragraphs [5009.24832] through [5009.24874] (FIG. 21327 through FIG. 21362e); Electronic Postit Function described in paragraphs [5009.24875] through [5009.24945] (FIG. 21363 through FIG. 21426d); Time Dependent Game Function described in paragraphs [5009.24946] through [5009.24965] (FIG. 21427 through FIG. 21440); Season Dependent Game Function described in paragraphs [5009.24966] through [5009.24985] (FIG. 21441 through FIG. 21454); Location Dependent Game Function described in paragraphs [5009.24986] through [5009.25007] (FIG. 21455 through FIG. 21470); Enhanced Time Dependent Game Function described in paragraphs [5009.25008] through [5009.25035] (FIG. 21471 through FIG. 21492); Enhanced Season Dependent Game Function described in paragraphs [5009.25036] through [5009.25063] (FIG. 21493 through FIG. 21514); Enhanced Location Dependent Game Function described in paragraphs [5009.25064] through [5009.25093] (FIG. 21515 through FIG. 21538); Specific Game Download Prohibiting Function described in paragraphs [5009.25094] through [5009.25141] (FIG. 21539 through FIG. 21579c); Location Dependent Phone Number Function described in paragraphs [5009.25142] through [5009.25206 ](FIG. 21580 through FIG. 21637e); Location Dependent Answering Machine Function described in paragraphs [5009.25207] through [5009.25228] (FIG. 21638 through FIG. 21653c); Auto Speaker Phone Function described in paragraphs [5009.25229] through [5009.25266] (FIG. 21654 through FIG. 21684); Object Location Identifying Function described in paragraphs [15009.25267] through [5009.25312] (FIG. 21685 through FIG. 21724c); Area Dependent Answering Machine Function described in paragraphs [5009.25313] through [5009.25332] (FIG. 21725 through FIG. 21738c); Area Dependent Call Receiving Function described in paragraphs [5009.25333] through [5009.25359] (FIG. 21739 through FIG. 21760c); Device Component Distance Searching Function described in paragraphs [5009.25360] through [5009.25377] (FIG. 21761 through FIG. 21772d); Device Component Location Searching Function described in paragraphs [5009.25378] through [5009.25422] (FIG. 21773 through FIG. 21810f) Component Connection Notifying Function described in paragraphs [5009.25423] through [5009.25446] (FIG. 21811 through FIG. 21828); Multiple Phone Number Busy Notifying Function described in paragraphs [5009.25447] through [5009.25478] (FIG. 21829 through FIG. 21854b); Time Identified Incoming Call Refusing Function described in paragraphs [5009.25479] through [5009.25504] (FIG. 21855 through FIG. 21874c); Email Location Log Recording Function described in paragraphs [5009.25505] through [5009.25540] (FIG. 21875 through FIG. 21904e); Rough Location Notifying Function described in paragraphs [5009.25541] through [5009.25598 ](FIG. 21905 through FIG. 21955b); Stalker Detecting Function described in paragraphs [5009.25599] through [5009.25638] (FIG. 21956 through FIG. 21989b); Location Indicating Scheduler Function described in paragraphs [5009.25639] through [5009.25742] (FIG. 21990 through FIG. 22086i); Device Program Sync Activating Function described in paragraphs [5009.25743] through [5009.25803] (FIG. 22087 through FIG. 22140c); User Dictionary Sync Function described in paragraphs [5009.25804] through [5009.25866] (FIG. 22141 through FIG. 22196d); Update Synchronizing Function described in paragraphs [5009.25867] through [5009.25916] (FIG. 22197 through FIG. 22241c); Material Viewing Location Notifying Function described in paragraphs [5009.25917] through [5009.25942] (FIG. 22242 through FIG. 22261b); Digital Data Edited Location Notifying Function described in paragraphs [5009.25943] through [5009.25982] (FIG. 22262 through FIG. 22295e); Remote Money Transferring Function described in paragraphs [5009.25983] through [5009.26046] (FIG. 22296 through FIG. 22352c); Remote Device Diagnosing Function described in paragraphs [5009.26047] through [5009.26180] (FIG. 22353 through FIG. 22479c); User Related Data Backuping Function described in paragraphs [5009.26181] through [5009.26249] (FIG. 22480 through FIG. 22542b); User Related Data Sharing Function described in paragraphs [5009.26250] through [5009.26319] (FIG. 22543 through FIG. 22605b); Location Dependent Pistol Controlling Function described in paragraphs [5009.26320] through [5009.26354] (FIG. 22606 through FIG. 22634); Direction Dependent Pistol Controlling Function described in paragraphs [5009.26355] through [5009.26429] (FIG. 22635 through FIG. 22702b); Dual Number Batch Switching Over Function described in paragraphs [5009.26430] through [5009.26485] (FIG. 22703 through FIG. 22752d); Dual Number Auto Switching Over Function described in paragraphs [5009.26486] through [5009.26553] (FIG. 22753 through FIG. 22814c); Audiovisual Text Retrieving Function described in paragraphs [5009.26554] through [5009.26591] (FIG. 22815 through FIG. 22846b); Prepaid Currency Auto Converting Function described in paragraphs [5009.26592] through [5009.26623] (FIG. 22847 through FIG. 22872d); Stereo Odor Sensing Function described in paragraphs [5009.26624] through [5009.26663] (FIG. 22873through FIG. 22907c); and Bone-Conduction Headphone Function described in paragraphs [5009.26664 ]through [5009.26763 ] (FIG. 22908 through FIG. 23000).

The invention claimed is:

1. A method for a communication device which is a handheld mobile device comprising an input device, a display, and an antenna, said method comprising:

a pin-point location notifying step, wherein a pin-point location of said communication device is notified to another device;

a geographic area notifying step, wherein a geographic area in which said communication device is located is notified to said another device;

a location dependent program activating step, wherein when said communication device is identified to be arrived at a first location, a first program is executed, and when said communication device is identified to be arrived at a second location, a second program is executed;

a multiple answering machine implementing step, wherein when a first phone call made to a first phone number is received and said first phone call is not answered within a certain period of time, a first caller's message data which indicates the message left by the caller of said first phone call and a first call received location data which indicates the geographic location of said communication at the time said first phone call is received are registered, and when a second phone call made to a second phone number is received and said second phone call is not answered within a certain period of time, a second caller's message data which indicates the message left by the caller of said second phone call and a second call received location data which indicates the geographic location of said communication at the time said second phone call is received are registered, wherein said first phone number and said second phone number are assigned to said communication device;

a time dependent answering machine implementing step, wherein a phone call is received and if not being answered within a predetermined period of time and if the current time is within a first time frame, a first auto replying message is transferred to the caller and if the current time is within a second time frame, a second auto replying message is transferred to the caller;

an audiovisual storage implementing step, wherein an audiovisual data transferred from a certain facility is recorded in either said communication device, a host computing system, or a removable media connected to said communication device in accordance with the user's selection and a recording location data is produced which indicates the geographic location of said communication device at the time said audiovisual data is recorded;

a street address icon display implementing step, wherein a street address and a map are displayed on said display, wherein an icon corresponding to said street address is displayed on said map; and an audiovisual multiple record/replay implementing step, wherein a first audiovisual data is operable to be replayed while being recorded and a first replayed location is produced which indicates the geographic location of said communication device at the time said first audiovisual data is replayed, and a second audiovisual data is operable to be replayed while being recorded and a second replayed location is produced which indicates the geographic location of said communication device at the time said second audiovisual data is replayed.

2. A system comprising:

a communication device which is a handheld mobile device comprising an input device, a display, and an antenna;

a pin-point location notifying implementer, wherein a pin-point location of said communication device is notified to another device;

a geographic area notifying implementer, wherein a geographic area in which said communication device is located is notified to said another device;

a location dependent program activating implementer, wherein when said communication device is identified to be arrived at a first location, a first program is executed, and when said communication device is identified to be arrived at a second location, a second program is executed;

a multiple answering machine implementer, wherein when a first phone call made to a first phone number is received and said first phone call is not answered within a certain period of time, a first caller's message data which indicates the message left by the caller of said first phone call and a first call received location data which indicates the geographic location of said communication at the time said first phone call is received are registered, and when a second phone call made to a second phone number is received and said second phone call is not answered within a certain period of time, a second caller's message data which indicates the message left by the caller of said second phone call and a second call received location data which indicates the geographic location of said communication at the time said second phone call is received are registered, wherein said first phone number and said second phone number are assigned to said communication device;

a time dependent answering machine implementer, wherein a phone call is received and if not being answered within a predetermined period of time and if the current time is within a first time frame, a first auto replying message is transferred to the caller and if the current time is within a second time frame, a second auto replying message is transferred to the caller;

an audiovisual storage implementer, wherein an audiovisual data transferred from a certain facility is recorded in either said communication device, a host computing system, or a removable media connected to said communication device in accordance with the user's selection and a recording location data is produced which indicates the geographic location of said communication device at the time said audiovisual data is recorded;

a street address icon displaying implementer, wherein a street address and a map are displayed on said display, wherein an icon corresponding to said street address is displayed on said map; and an audiovisual multiple recording/replaying implementer, wherein a first audiovisual data is operable to be replayed while being recorded and a first replayed location is produced which indicates the geographic location of said communication device at the time said first audiovisual data is replayed, and a second audiovisual data is operable to be replayed while being recorded and a second replayed location is produced which indicates the geographic location of said communication device at the time said second audiovisual data is replayed.

3. A communication device which is a handheld mobile device comprising:

an input device;

a display;

an antenna;

a pin-point location notifying implementer, wherein a pin-point location of said communication device is notified to another device;

a geographic area notifying implementer, wherein a geographic area in which said communication device is located is notified to said another device;

a location dependent program activating implementer, wherein when said communication device is identified to be arrived at a first location, a first program is executed, and when said communication device is identified to be arrived at a second location, a second program is executed;

a multiple answering machine implementer, wherein when a first phone call made to a first phone number is received and said first phone call is not answered within a certain period of time, a first caller's message data which indicates the message left by the caller of said first phone call and a first call received location data which indicates the geographic location of said communication at the time said first phone call is received are registered, and when a second phone call made to a second phone number is received and said second phone call is not answered within a certain period of time, a second caller's message data which indicates the message left by the caller of said second phone call and a second call received location data which indicates the geographic location of said communication at the time said second phone call is received are registered, wherein said first phone number and said second phone number are assigned to said communication device;

a time dependent answering machine implementer, wherein a phone call is received and if not being answered within a predetermined period of time and if the current time is within a first time frame, a first auto replying message is transferred to the caller and if the current time is within a second time frame, a second auto replying message is transferred to the caller;

an audiovisual storage implementer, wherein an audiovisual data transferred from a certain facility is recorded in either said communication device, a host computing system, or a removable media connected to said communication device in accordance with the user's selection and a recording location data is produced which indicates the geographic location of said communication device at the time said audiovisual data is recorded;

a street address icon displaying implementer, wherein a street address and a map are displayed on said display, wherein an icon corresponding to said street address is displayed on said map; and an audiovisual multiple recording/replaying implementer, wherein a first audiovisual data is operable to be replayed while being recorded and a first replayed location is produced which indicates the geographic location of said communication device at the time said first audiovisual data is replayed, and a second audiovisual data is operable to be replayed while being recorded and a second replayed location is produced which indicates the geographic location of said communication device at the time said second audiovisual data is replayed.

* * * * *